US008983975B2

(12) United States Patent
Kenton et al.

(10) Patent No.: US 8,983,975 B2

(45) Date of Patent: Mar. 17, 2015

(54) SYSTEMS AND METHODS FOR MEASURING AND MANAGING DISTRIBUTED ONLINE CONVERSATIONS

(76) Inventors: Christopher Kenton, Fairfax, CA (US); Terry Dean Blankers, Lexington Park, MD (US); Aria Haghighi, Canoga Park, CA (US)

( * ) Notice: Subject to any disclaimer, the term of this patent is extended or adjusted under 35 U.S.C. 154(b) by 0 days.

(21) Appl. No.: 12/918,279

(22) PCT Filed: Feb. 23, 2009

(86) PCT No.: PCT/US2009/001138

§ 371 (c)(1), (2), (4) Date: Aug. 18, 2010

(87) PCT Pub. No.: WO2009/105277

PCT Pub. Date: Aug. 27, 2009

(65) Prior Publication Data

US 2010/0325107 A1 Dec. 23, 2010

Related U.S. Application Data

(60) Provisional application No. 61/066,753, filed on Feb. 22, 2008.

(51) Int. Cl.

*G06F 17/30* (2006.01)

*G06Q 30/00* (2012.01)

(52) U.S. Cl.

CPC .................................... *G06Q 30/00* (2013.01)

USPC ........... 707/749; 707/722; 707/736; 707/758; 706/12; 706/14

(58) Field of Classification Search

None

See application file for complete search history.

(56) References Cited

U.S. PATENT DOCUMENTS

| | | | | |
|---|---|---|---|---|
| 7,249,123 | B2 * | 7/2007 | Elder et al. | 1/1 |
| 7,548,930 | B2 * | 6/2009 | Kobza et al. | 1/1 |
| 7,720,835 | B2 * | 5/2010 | Ward et al. | 707/710 |

(Continued)

FOREIGN PATENT DOCUMENTS

| | | |
|---|---|---|
| JP | 2007-122513 A | 5/2007 |
| JP | 2007-200119 A | 8/2007 |

(Continued)

OTHER PUBLICATIONS

Nancy Willard, "Educator's Guide to Cyberbullying and Cyberthreats", 2005.*

(Continued)

*Primary Examiner* — Hung Le

(74) *Attorney, Agent, or Firm* — Ice Miller LLP

(57) ABSTRACT

A system (10) for measuring and managing distributed online conversations accessible via a network (20) comprises memory (3812) and an online conversation monitoring system (12) communicatively coupled to the network and communicatively coupled to the memory and being configured to create and manage search topics and queries, to search sites on the network utilizing the search topics and queries to identify relevant online conversations related to an entity, to capture relevant online conversations related to the entity, to store in the memory each captured relevant online conversation as a discrete incident associated with the entity to which it is relevant, to score each discrete incident according to a set of metrics, and to present scored incidents to the entity to which relevant online conversation relates.

17 Claims, 41 Drawing Sheets

(56) References Cited

U.S. PATENT DOCUMENTS

| | | | | |
|---|---|---|---|---|
| 7,885,901 | B2 * | 2/2011 | Hull et al. | 705/319 |
| 7,895,049 | B2 * | 2/2011 | O'Sullivan et al. | 705/1.1 |
| 7,996,210 | B2 * | 8/2011 | Godbole et al. | 704/9 |
| 8,010,410 | B2 * | 8/2011 | Sundaresan et al. | 705/26.1 |
| 8,010,460 | B2 * | 8/2011 | Work et al. | 705/319 |
| 8,015,484 | B2 * | 9/2011 | Backer | 715/234 |
| 8,171,388 | B2 * | 5/2012 | Zaltzman et al. | 715/200 |
| 8,386,564 | B2 * | 2/2013 | Pennington | 709/204 |
| 8,417,713 | B1 * | 4/2013 | Blair-Goldensohn et al. | 707/751 |
| 8,515,828 | B1 * | 8/2013 | Wolf et al. | 705/26.7 |
| 8,682,723 | B2 * | 3/2014 | Parsons et al. | 705/14.52 |
| 2003/0208543 | A1 | 11/2003 | Enete et al. | |
| 2004/0107125 | A1 | 6/2004 | Guheen et al. | |
| 2004/0111479 | A1 * | 6/2004 | Borden et al. | 709/206 |
| 2005/0091038 | A1 * | 4/2005 | Yi et al. | 704/10 |
| 2005/0125216 | A1 * | 6/2005 | Chitrapura et al. | 704/1 |
| 2006/0009994 | A1 * | 1/2006 | Hogg et al. | 705/1 |
| 2006/0042483 | A1 * | 3/2006 | Work et al. | 101/91 |
| 2006/0129446 | A1 * | 6/2006 | Ruhl et al. | 705/10 |
| 2007/0130350 | A1 * | 6/2007 | Alperovitch et al. | 709/229 |
| 2007/0179834 | A1 * | 8/2007 | Carter et al. | 705/10 |
| 2007/0198646 | A1 | 8/2007 | Chen et al. | |
| 2007/0214097 | A1 * | 9/2007 | Parsons et al. | 706/12 |
| 2008/0004941 | A1 * | 1/2008 | Calabria | 705/10 |
| 2008/0028070 | A1 * | 1/2008 | Gupta | 709/224 |
| 2008/0114837 | A1 * | 5/2008 | Biggs et al. | 709/206 |
| 2008/0147487 | A1 * | 6/2008 | Hirshberg | 705/10 |
| 2008/0162157 | A1 * | 7/2008 | Daniluk | 705/1 |
| 2008/0177600 | A1 * | 7/2008 | McCarthy et al. | 705/7 |
| 2008/0270116 | A1 * | 10/2008 | Godbole et al. | 704/9 |
| 2009/0119173 | A1 * | 5/2009 | Parsons et al. | 705/14 |
| 2009/0199103 | A1 * | 8/2009 | Brantley et al. | 715/733 |
| 2010/0070485 | A1 * | 3/2010 | Parsons et al. | 707/709 |
| 2012/0036127 | A1 * | 2/2012 | Work et al. | 707/732 |
| 2012/0042386 | A1 * | 2/2012 | Backer | 726/26 |
| 2012/0046938 | A1 * | 2/2012 | Godbole et al. | 704/9 |
| 2013/0145323 | A1 * | 6/2013 | Ward et al. | 715/835 |

FOREIGN PATENT DOCUMENTS

| | | | |
|---|---|---|---|
| JP | 2008-003717 | A | 10/2008 |
| WO | WO 2007131213 | A2 * | 11/2007 |
| WO | WO2008/014011 | A2 | 1/2008 |

OTHER PUBLICATIONS

International Searching Authority, International Search Report, PCT/US09/01138, dated Apr. 3, 2009.

International Searching Authority (ISA), Written Opinion of the ISA, PCT/US09/01138, dated Apr. 3, 2009.

* cited by examiner

210

To Fig. 2B 211 212 213 214 215

| Incident List | | | | |
|---|---|---|---|---|
| Score | Incident | Type/Source | Sentiment | Posted |
| [–] | Intel Chip Set Flow {This is an incident group} | | | |
| 99 | Intel Hides Flaw | [M] NYT | | 3 hours ago |
| 86 | Intel Won't Come Clean | [B] Talking Points | – | – |
| 82 | Intel Refuses Recall | [B] ChipBlog | – | – |
| 64 | Intel Rebuffs Critic | [F] CompForm | – | – |
| 48 | Intel Out In the Cold | [B] Valley Wag | – | – |
| [–] | Cancer Benefit {This is an incident group} | | | |
| 33 | Cancer Benefit Next Week | [M] SJ Merc | + | + |
| 32 | Intel Benefit for Cancer | [B] ChipBlog | + | + |
| 28 | Good Move By Intel | [B] Valley Wag | + | + |

251 252 253 253

Fig. 2A 216 217 218 219 220

|  | Hits | Last Hit | Team | Owner | Response |
|---|---|---|---|---|---|
|  | 57 | 1 hour ago | Product A | J Taylor |  |
|  | 123 | 1 hour ago | Product A | J Taylor | watch |
|  | 72 | 56 mins ago | Product A | J Taylor |  |
|  | 24 | 2 hours ago | Product A | J Taylor | watch |
|  | 42 | 2 days ago | Product A | J Taylor | engage |
|  | 12 | 2 days ago | CorpComm | N Bosk | release |
|  | 21 | 23 hours ago | CorpComm | N Bosk | engage |
|  | 16 | 3 days ago | CorpComm | N Bosk | release |

240

230

From Fig. 2A

Fig. 2B

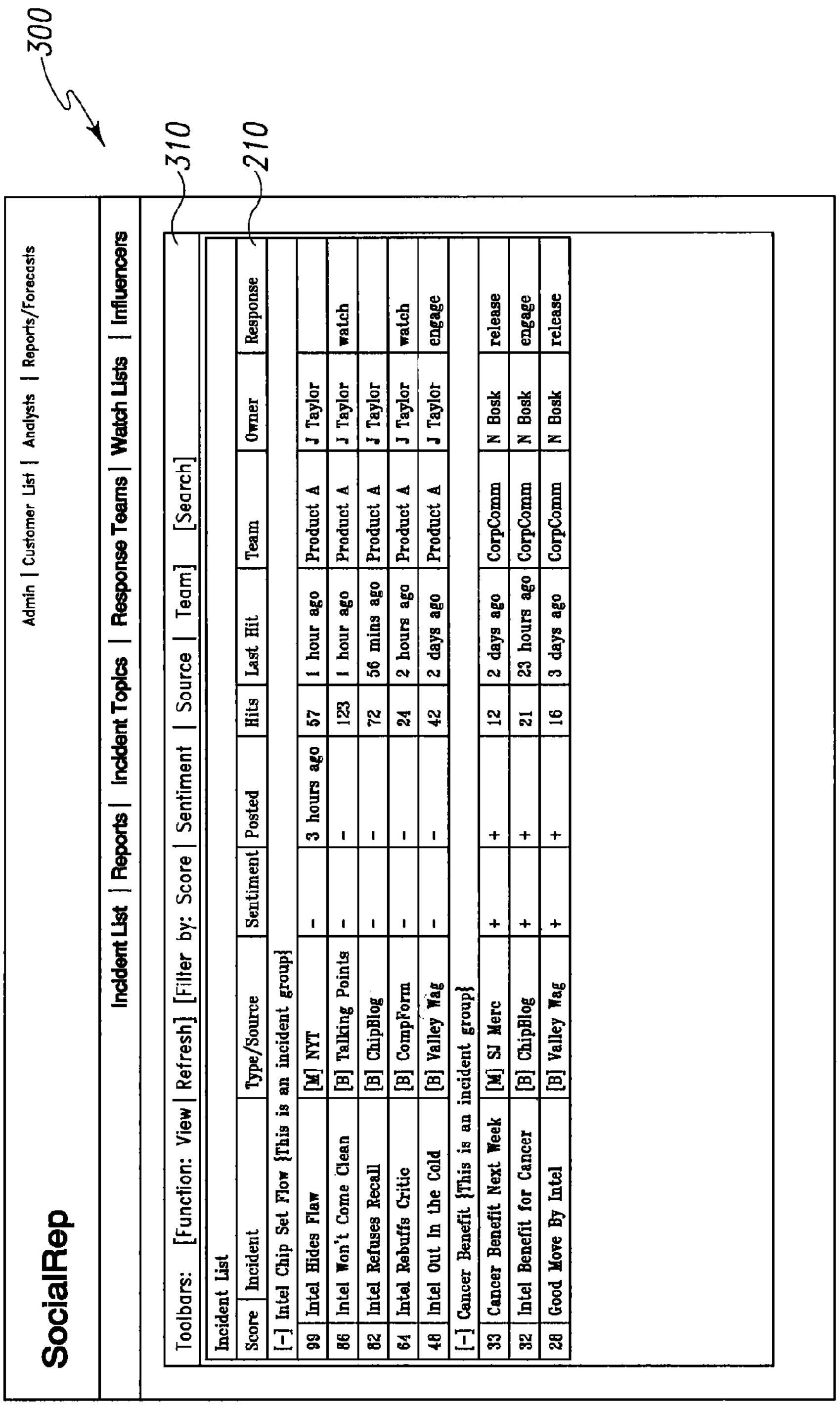

| Score | Incident | Type/Source | Sentiment | Posted | Hits | Last Hit | Team | Owner | Response |
|---|---|---|---|---|---|---|---|---|---|
| [-] Intel Chip Set Flow {This is an incident group} | | | | | | | | | |
| 99 | Intel Hides Flaw | [M] NYT | - | 3 hours ago | 57 | 1 hour ago | Product A | J Taylor | |
| 86 | Intel Won't Come Clean | [B] Talking Points | - | - | 123 | 1 hour ago | Product A | J Taylor | watch |
| 82 | Intel Refuses Recall | [B] ChipBlog | - | - | 72 | 56 mins ago | Product A | J Taylor | |
| 64 | Intel Rebuffs Critic | [B] CompForm | - | - | 24 | 2 hours ago | Product A | J Taylor | watch |
| 48 | Intel Out In the Cold | [B] Valley Wag | - | - | 42 | 2 days ago | Product A | J Taylor | engage |
| [-] Cancer Benefit {This is an incident group} | | | | | | | | | |
| 33 | Cancer Benefit Next Week | [M] SJ Merc | + | + | 12 | 2 days ago | CorpComm | N Bosk | release |
| 32 | Intel Benefit for Cancer | [B] ChipBlog | + | + | 21 | 23 hours ago | CorpComm | N Bosk | engage |
| 28 | Good Move By Intel | [B] Valley Wag | + | + | 16 | 3 days ago | CorpComm | N Bosk | release |

Fig. 3

1800

SocialRep

Admin | Customer List | Analysts | Reports/Forecasts

Incident List | Reports | Incident Topics | Response Teams | Watch Lists | Influencers

Source List

| ID | Source Name | Type | URI | Ad Network | Banners | TextAds | Sponsors | Reg | Partner | Incidents | Influence |
|---|---|---|---|---|---|---|---|---|---|---|---|
| 1 | MarketingRev | Blog | Marketingrev.com | Federated | x | x | x | x | x | 231 | 3 |
| 2 | YouTube | Video | Youtube.com | N/A | x | x | x | x | x | 3432 | 4 |
| 3 | ValleyWag | Blog | Valleywag.com | Blognet | x | x | x | x | x | 23 | 2 |
| 4 | Slate | News | Slate.com | Private | x | x | x | x | x | 3 | 4 |
| 5 | CRMToday | News | Crmtoday.com | Federated | x | x | x | x | x | 324 | 4 |
| 6 | MarkingRev | Blog | X | Federated | x | x | x | x | x | 231 | 3 |

Fig. 18

SYSTEMS AND METHODS FOR MEASURING AND MANAGING DISTRIBUTED ONLINE CONVERSATIONS

PRIORITY

The present application is related to, and claims the priority benefit of, International Patent Application Serial No. PCT/US2009/001138, filed Feb. 23, 2009, which is related to, and claims the priority benefit of, U.S. Provisional Patent Application Ser. No. 61/066,753, filed Feb. 22, 2008. The contents of each of these applications are hereby incorporated by reference in their entirety into this disclosure.

BACKGROUND AND SUMMARY

This invention relates to a system and method of identifying tracking, measuring and managing positive or negative comments published on the internet regarding an entity and more particularly a system and method whereby comments regarding an entity are identified and disclosed to the entity according to an anticipated priority in the need to address the comments.

Every day, thousands of bits of information are entered onto the Web that impact business by affecting the "social reputation" of an entity or an entity's products and services. Consumers write product reviews and talk about products and brands on customer forums. Bloggers write about companies and launch commenting streams. People in social networks discuss new products and trends. The media posts news on companies and products and invite users to respond. In the case of large companies, there may be hundreds or thousands, of such social media incidents every week that affect the company directly, its competitors, or the market at large. Some incidents are positive, some negative. Some are highly influential, some meaningless. The challenge for any company is to keep the important and relevant incidents on the radar at all times, and to deal with these issues effectively by tracking the incidents, measuring and prioritizing them, delegating them to trained employees for engagement, and tying in 3rd party experts, such as a PR firm, when necessary.

According to one aspect of the disclosure, a system for measuring and managing distributed online conversations accessible via a network comprises memory and an online conversation monitoring system communicatively coupled to the network and communicatively coupled to the memory. The online conversation monitoring system is configured to create and manage search topics and queries, to search sites on the network utilizing the search topics and queries to identify relevant online conversations related to an entity, to capture relevant online conversations related to the entity, to store in the memory each captured relevant online conversation as a discrete incident associated with the entity to which it is relevant, to score each discrete incident according to a set of metrics, and to present scored incidents to the entity to which relevant online conversation relates.

According to another aspect of the disclosure, a method of measuring and managing distributed online conversations accessible via a network includes creating search topics and queries to be utilized in searching media sites accessible via the internet to identify online conversations relating to an entity; storing the created search topics in memory accessible by a search device coupled to the internet; searching media sites on the interne utilizing the stored created search topics and queries to identify relevant online conversations related to the entity; capturing relevant online conversations related to the entity discovered in the searching step; storing in memory each captured relevant online conversation as a discrete incident associated with the entity to which it is relevant; accessing the memory in which each captured relevant online conversation is stored to score each discrete incident according to a set of metrics; and, presenting scored incidents to the entity to which relevant online conversation relates via a graphical user interface generated by a server communicatively coupled to the memory.

Some embodiments of the disclosed systems and methods of tracking online conversations provide the operational framework and technology to help entities track and effectively manage social media incidents. Reputation affecting social media incidents are one subset of "online conversations" and not the only one of importance. For example, trends in opinion about market direction may not impact "social reputation" but are nonetheless important. Some embodiments of the disclosed systems and methods of tracking online conversations gather and sift through thousands of incidents every day, filtering out the incidents that are relevant to entities, prioritizing those incidents that warrant attention, and routing them to the right people for tracking and resolution. Some embodiments of the disclosed systems and methods generate appropriate reports describing the social media incidents discovered for delivery to an impacted entity Some of the disclosed systems and methods of tracking online conversations rely on both technology and human intelligence. Computers excel in helping gather and track human communications. Some of the disclosed systems and methods of tracking social reputation utilize data processing technology to identify and organize media incidents. Analysts excel at decoding the subtleties of meaning of media incidents.

Additional features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The present invention is illustrated by way of example and not limitation in the figures of the accompanying drawings in which like references indicate similar elements and in which:

FIG. 2 is an incident table for providing information regarding incidents discovered by a online conversations monitoring system;

FIG. 3 is a screen shot of an initial landing page of a graphical user interface ("GUI") presented to users of the online conversations monitoring system displaying an interactive version of the incident table of FIG. 2;

FIG. 18 is a screen shot of a source list page of a graphical user interface generated by the online conversations monitoring system;

DETAILED DESCRIPTION

Figure 1:
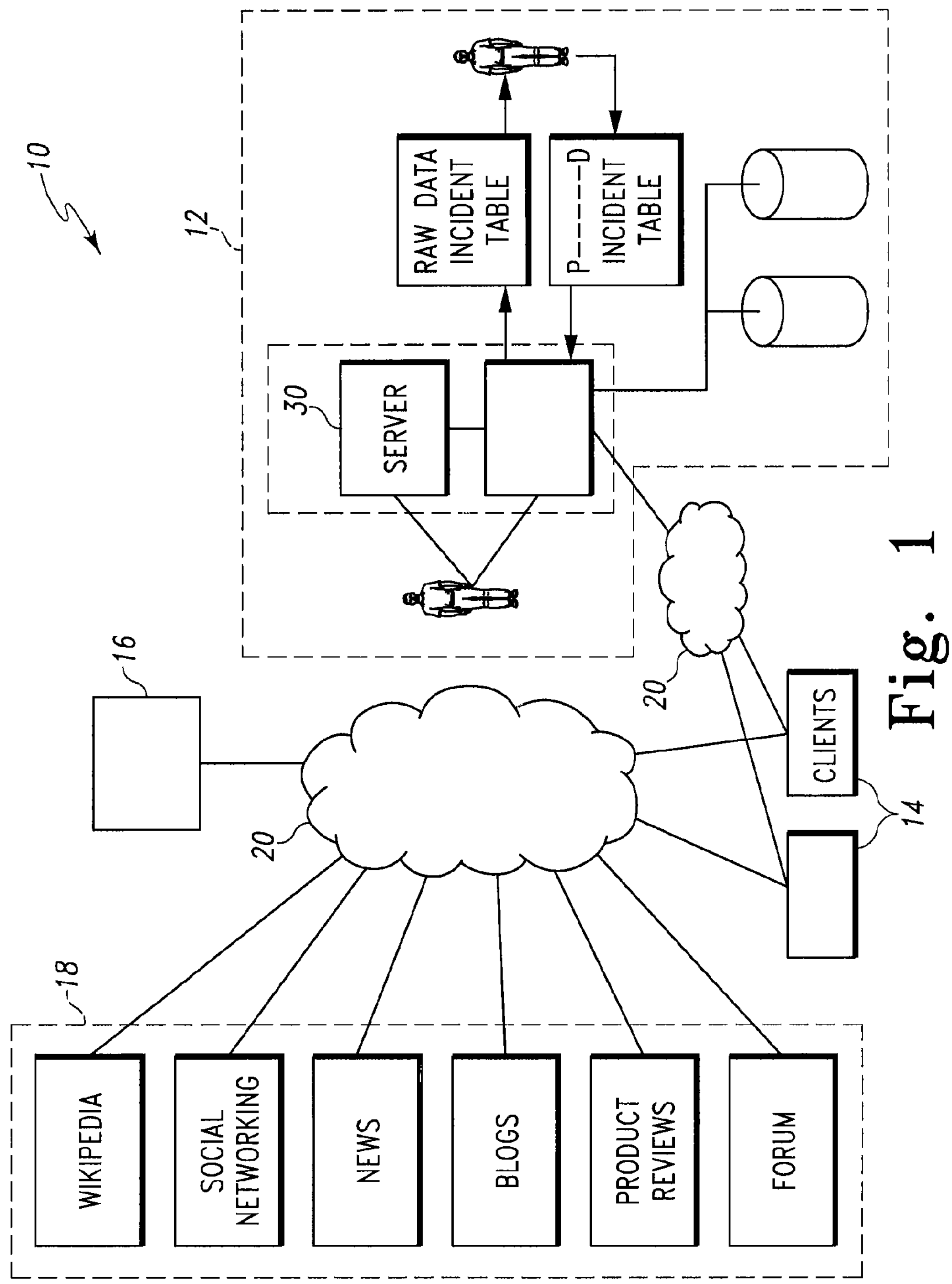
FIG. 1 is a block diagram of a system for tracking social reputation including a online conversations monitoring system, media sources on which media may incidents occur, entities who wish to track their social reputation, and a network.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present invention includes any alterations and modifications to the illustrated embodiments and includes further applications of the principles of the disclosure as would normally occur to one skilled in the art to which this invention pertains.

Some of the disclosed systems and methods of tracking online conversations utilize a data gathering stage, an information management stage and a reporting stage. In certain embodiments of the disclosed systems and methods each of the above stages is managed by a team of technologists and analysts. In the data gathering stage technologies that help gather and quickly sift through social media incidents are utilized. These technologies include search engines, feed aggregators, and even direct links into social networks that allow relevant data to be extracted.

In the information management stage a system for storing, scoring, prioritizing, routing and tracking incidents across multiple players and organizations is utilized. This system, in certain embodiments, includes components in the online conversations monitoring system, components in an entity's systems and components of a service providers' systems.

In the reporting stage the system generates metrics and dashboards for reporting on the status and performance of the entire social media management system.

As shown for example, in FIG. 1, one embodiment of the disclosed system for online conversations 10 includes an online conversations monitoring system 12, a plurality of entity (sometimes referred to herein as "customer") systems 14, a plurality of service provider systems 16, a plurality of media source sites 18 and a network 20 coupling each of the systems 12, 14, 16, 18. While shown as a single network 20 coupling all of the above described systems 12, 14, 16, 18, the network 20 may include one or more networks as appropriate. The online conversations monitoring system 12 typically includes a web server 30 coupled to the media source sites 18 via the internet. While the online conversations monitoring system 12 is shown in FIG. 1 as being coupled through the interne to the entity systems 14, it should be understood that other communication networks or other media of communication may couple the online conversations monitoring system 12 to the entity systems 14. For example, some communication between the online conversations monitoring system 12 may be through telephone calls placed over the telephone network, other communications may use the postal system network and yet other communication may be via the internet or some other computer network such as a LAN or WAN. The communication between the online conversations monitoring system 12 and the service provider systems 18 may be over the interne, over some other computer or communication network or may be via installation of software from the service provider on the online conversations monitoring system 12.

The online conversations monitoring system 12 includes not only computer devices and other communication devices but also individuals or teams of individuals that perform some aspects of the data gathering stage, the information management stage and/or the reporting stage. Among these individuals and/or teams are analysts, account directors, account managers and technicians.

In one example, for each entity that wishes to be apprised of postings on media source sites 18 that affect the entity's interests, an analyst or analyst team is appointed. The analyst or analyst team may be third party service providers, or may be part of the entity's own trained response team. Analysts are responsible for attempting to ensure that the online conversations monitoring system 12 has the latest access to data sources available from third party systems 16 and media sources 18. Data sources available from third party systems 16 may be feed aggregators and filters like Technorati and Compete.com, or customized sources to tap into networks like Facebook or LinkedIn. Media sources 18 include any source of content on the Web relevant to a client, including blogs, wikis, forums, widgets, and Web sites. Thus, analysts may include data analysts and media analysts to ensure that there is proper access by the online conversations monitoring system 12 to data sources and media sources 18.

Data analysts are responsible for the data gathering process, tracking incoming incident feeds, tuning search and scoring algorithms, identifying new sources for data, scoring and metrics, and contributing to the development and execution of account programs.

Media analysts are responsible for scoring incoming feeds, analyzing incident content, coordinating incident response, identifying new media sources, media networks, and influencers, analyzing industry trends, and contributing to the development and execution of account programs.

Account directors are the primary point of day-to-day contact between the organization operating the online conversations monitoring system 12 and the entities (also referred to herein as "customers" and/or "clients") 14. They are responsible for ensuring on that the business objectives of the entities are being effectively served by the online conversations monitoring system 12. In that role they provide direction for data and media analyst teams. Account directors maintain each customer's Search Topics, Query Definitions and Watchlists, manage the flow of information between the organization operating the online conversations monitoring system 12 and the entities 14, and track broader market trends across customer accounts.

Account executives drive the strategic direction and development of a group of customer accounts. They are responsible for providing market strategy insights to customers 14, and engaging with customers 14 to tune and grow the highest quality service offering for each account. Account Executives are both the primary business development driver for accounts in their group, and the primary product development interface between the market and the product team.

Technologists are members of the IT department of the provider of the online conversations monitoring system 12. Technologists are attached to project teams to ensure that the online conversations monitoring system 12 is capturing the most relevant and timely data. Technologists are able to create and customize data feeds and plug-ins that source data from external sites.

Analysts use the hardware and software of the online conversations monitoring system 12 (sometimes collectively referred to herein as the "technology") to search the Web and gather incidents relevant to each customer 14, including, for example, product reviews, blog postings, forum threads, wiki entries, social networking discussions and online news stories. Analysts are tasked not only with managing the technology that automatically finds these incidents day-to-day, but with scouring the Web to ensure that the technology is considering all relevant sources of information. Thus, analysts preferably maintain a high familiarity with the latest news and online resources where the customers of the online conversations monitoring system's customers 14 connect. In addition to tracking incidents, analysts also track the influencers who drive online discussion, and the influential sites where these conversations take place. An evolving profile is maintained for each customer, detailing the most influential resources and players in the ongoing market dialog.

As incidents are gathered every day, the technology of the online conversations monitoring system 12 preliminarily filters and organizes data according to a system of metrics to initially populate an incident table with an indication of the relevance, importance and immediacy of each incident to a customer. It is within the scope of the disclosure for the incident table to include other indicators which might reflect a customer's desire to address the incident. In one embodiment of the disclosed system and method, data for these metrics is gathered from publicly and privately available sources on the Web, including, for example, Comscore™, Compete™, Google™, Yahoo!™, ASk™, and other aggregators of web traffic and performance statistics. Analysts review the incidents logged in the incident table and possibly modify the table to generate a customer's Incident List, and adjust the prioritization of each incident by adding additional human measures of sensitivity, sentiment and relevance. One or more of the metrics or additional human measures may be based on a technology driven automated scoring algorithm implemented by the server. For instance, relevance, competitiveness and sensitivity, in one embodiment of the disclosed system and method, are based on a score that is automatically generated, in whole or in part, utilizing the server. For instance, in determining competitiveness of an online conversation, a computing device may be programmed to recognize the number of times a competitor of the entity for which the online incident is being managed, or a competitor's product, is mentioned in an online discussion and generate a competitiveness score based on that number. Additionally, a computer device may be programmed to recognize the presence of emotional words indicating praise argument or complaint in an online discussion and generate a sensitivity score for an online incident.

The result is a continuously evolving Incident List in which each logged incident receives a score. The score, along with keywords present in the incident, determines, according to rules predetermined with the customer, to whom the incident is routed for timely and effective response. While a low score may be managed by an internal team of sanctioned representatives, a high score may be immediately routed to a customer executive or response team with real time notifications, and may also request the input of a PR agency for expert advice on the response strategy. Thus, the customers of the online conversations monitoring system 12 are apprised of critical incidents near to real-time, while other incidents are handled appropriately without creating undue concern. How incidents are actually handled is determined by a set of rules of engagement.

As shown, for example in FIG. 2, an incident list 210 is generated. The incident list 210 is initially generated by the technology of the online conversations monitoring system 12. The illustrated incident list 210 is presented in rows and columns with each column containing a heading in which text indicative of the content of the column is presented. For instance, in the illustrated embodiment of the incident list 210 there is a score column with a score heading 211, an incident column with an incident heading 212, a type source column with a type/source heading 213, a sentiment column with a sentiment heading 214, a posted column with a posted heading 215, a hits column with a hits heading 216, a last hit column with a last hit heading 217, a team column with a team heading 218, an owner column with an owner heading 219, and a response column with a response heading 220. Each row that is not a subheading or heading includes data regarding a distinct incident. It is within the scope of the disclosure for the incident table 210 to include other columns and headings populated with appropriate material, descriptive text and/or data.

The illustrated incident list 210 when presented in a GUI format, as shown, for example, in FIG. 3, may be sorted by sources (by clicking on type/source heading 213), owner (by clicking on owner heading 219) and number of responses (by clicking on the response heading 220). It is within the scope of the disclosure for the incident list 210 to be sorted according to other criteria and for such sorting to be implemented in other manners than by clicking on a heading.

If the customer 14 wishes to track more than one incident, the incident table 210 may be split into incident groups. The disclosed incident list 210 is split into a positive sentiment table 230 and a negative sentiment table 240. The disclosed incident list 210 is also split into score category tables.

Incident lists 210 can group incidents by topic for convenience. In the illustrated incident list 210, an imaginary customer 14 is tracking two incident groups shown in separate incident tables 230, 240. The first incident group table 240 is about a chip flaw that has just become public (included in the negative sentiment table), the other incident group table 230 is about an upcoming benefit sponsored by the customer 14 (included in the positive sentiment table). The two group tables 230, 240 demonstrate a high-scoring group on top, signified by the high numbers in the left column with the score heading 212, and a low-scoring group on the bottom. It is within the scope of the disclosure for high numbers and low numbers to be color coded to bring additional attention to those numbers. In one embodiment, high numbers are color coded with warm colors while lower numbers are color coded with cool colors.

For each incident shown in the illustrated incident list 210, the column including the Type/Source heading 213 contains text 251 indicative of where the incident occurred on the web and an icon 252 (illustratively a single letter abbreviation contained in brackets) indicative of the type of media source in which the incident occurred. For example, the icon 252 indicating that the incident occurred in a: blog is [B]; in a media website is [M]; and in a forum is [F]. It is within the scope of the disclosure for different icons or identifiers to be utilized in the incident list and for additional icons or identifiers for other sources to be included in the incident list. The type/source column may be divided into separate columns within the scope of the disclosure.

For each incident in the illustrated incident table 210, the column including the sentiment heading 214 includes an icon 253 indicative of the composite sentiment for the incident, calculated from individual sentiment scores for that incident. In the illustrated incident table the icon for a positive sentiment is a plus sign (+) and the icon for a negative sentiment is a minus sign (−). It is within the scope of the disclosure for different icons or identifiers to be utilized in the incident list and for additional icons or identifiers for other sentiments, such as, for example, a neutral sentiment, to be included in the incident list.

For each incident in the illustrated incident table 210, the column including the hits heading 216 includes a number reflective of the engagement hits, meaning the number of responses the incident has generated, referred to occasionally herein as "posts" to distinguish from page hits which may only include viewing a post without commenting. For each incident in the illustrated incident table 210, the column including the last hit heading 217 includes a time stamp of the last generated post. It is within the scope of the disclosure for the number of posts or the time of the last post to be represented in some other appropriate manner.

For each incident in the illustrated incident table 210, the column including the owner heading 219 includes text indicating the name, or other identifier, of the person to whom the incident has been routed for response. Preferably the owner identification text will be presented in a font or some other manner which reflects whether the owner has acknowledged the incident. In one example, when an owner acknowledges the incident, the font color changes from an attention grabbing color, such as red (shown in semi-bold font); to another more standard color, such as black (shown in normal font), to provide a quick method of determining whether each incident has been acknowledged. The text in the column with the response header 220 signifies the action recommended by the analysts, either ignoring the incident with no further action, reading the incident, engaging the incident by commenting on the blog, monitoring the incident without engaging, or consulting with other parties about the incident with no immediate action. It should be noted that for each incident for which there is an indication in the response column that an action has been taken, the owner name for the incident is in a normal font (e.g. black font, whereas the owner name for incidents in which no text appears in the response column is in semi-bold (e.g. red font). In the case of engagement, the thread of discussion is captured and available for review by clicking on the linked incident text.

While the foregoing few paragraphs have described an incident table presented on a graphical user interface (the table can be drilled down into to reach lower levels) generated by the system, it is within the scope of the disclosure for an incident report to be presented in some other manner. Regardless of the manner in which incidents are reported to the entity 14 wishing to have relevant online conversations tracked, it is preferable that the incident report be presented and delivered in such a manner that the entities 14 utilizing the system are able to involve an appropriate person to address each incident at the right time and place to most effectively defuse negative incidents and maximize positive ones.

The disclosed systems and methods utilize rules of engagement to facilitate quick and effective response to any social media incident that requires response. The specific rules may change in some ways from one customer 14 to the next, but they are based on a simple framework that makes it easy for each individual customer's rules to be followed without mistakes.

One important rule of engagement is a rule whereby incidents are sorted, ranked or scored in a manner likely to indicate the need for a response on behalf of the entity 14 whose interests or reputation is affected by the incident. The disclosed systems and methods utilize a scoring system that is applied to each incident. The framework consists of a three-tiered threshold based on a score assigned to the incident, which in one embodiment is in the range 1 to 100. Based on the score assigned to each incident, the incident is assigned to either a bottom tier, middle tier or upper tier. Incidents are further divided into positive and negative incident categories, each of which have a three tier system.

The bottom tier is populated with incidents having been assigned a level of scoring that indicates that addressing the incident is non-urgent, and non-sensitive in relation to the interests of the customer 14. On an incident report or list, incidents assigned to the bottom tier may be represented in green or another appropriate color and are thus occasionally referred to herein as "Green zone" incidents. Incidents assigned to the bottom tier often can be managed by the operator of the online conversations monitoring system 12 with a report of each managed incident being delivered to the client 14.

The middle tier is populated with incidents that have been assigned a level of scoring that indicates that customer 14 must be immediately notified, with detailed information routed to the customer 14 for their own team to manage. On an incident report or list, incidents assigned to the middle tier may be represented in yellow or another appropriate color and are thus occasionally referred to herein as "Yellow zone" incidents.

The third or upper tier is populated with incidents that have been assigned a level of scoring that indicates that addressing the incident is highly urgent and sensitive. Incidents assigned to the upper tier should be immediately expedited to a customer team for response. On an incident report or list, incidents assigned to the upper tier may be represented in red or another appropriate color and are thus occasionally referred to herein as "Red zone" incidents.

In one specific embodiment of the disclosed systems and methods, within each established boundary of scoring and sentiment, the protocols for managing responses are the same for every customer 14. Every incident in the red zone is expedited to the customer's specified team. Every incident in the yellow zone is routed with notification to the customer's specified internal "owner". Every incident that falls within the green zone can be managed by the operator of the online conversations monitoring system 12.

The flexibility of the framework comes into play with the setting of scoring thresholds and handling of positive and negative incidents. A customer 14 can establish scoring thresholds according to their own preference. In one embodiment, these preferences may be entered utilizing a response configuration page 1700, as shown, for example, in FIG. 17, of a GUI generated by the online conversations monitoring system. They may decide, for example, that incidents are never to be assigned to the bottom level so that no incidents can be managed by the operator of the online conversations monitoring system 12, or that they want a wider band in the middle of notification, and a smaller band for expediting. Additionally, the customer 14 may have one set of rules for handling positive comments, and another set of rules for negative comments. For example, a customer 14 may stipulate that positive incidents in the green zone may be managed by the operator of the online conversations monitoring system 12, but that no green zone exists for negative incidents, and any negative incident is to be routed with notification.

At the outset of each customer engagement, the customer's own business rules will establish the scoring and sentiment thresholds. Once those thresholds are established, rules of protocol take over, and should eliminate any confusion over how an incident should be logistically managed. The operator of the online conversations monitoring system 12 in partnership with the customers 14 may continuously adjust the scoring thresholds to ensure the most effective response process.

In one specific embodiment of the disclosed systems and methods, the way scored incidents are handled internally is universally applied to all customers. Bottom tier (green zone) incidents are managed by the operator of the online conversations monitoring system, only by the account director assigned to the account, or a designated and previously approved alternate—either another account director, or analyst. This protocol is due to the sensitivity and liability of acting as a communications agent for the customer.

Clients 14 have the option to enable an open communication channel direct from the operator of the online conversations monitoring system 12 to the public for green Zone incidents as a designated representative. Alternatively, the operator of the online conversations monitoring system 12 may route responses through an approval cycle with the customer 14. Often, for green zone negative items, no response is better than a response from a representative having no power to bind the customer 14. Thus, in one embodiment of the disclosed system, the default action for green zone negative incidents may be to not respond to the incident.

Customers 14 may also define special rules for green zone responses, including certain response styles, certain rules (such as limiting the number of responses to an incident), resources such as special contact numbers and expediting options for customer service, and special offers.

Middle tier (yellow zone) incidents must be scored by the operator of the social reputation management system 12 and routed to the customer team for response management. As soon as yellow zone incidents arise, the analyst will have an opportunity to quickly review the incident and raise or reduce the score according to an analyst rule set. Thus, in one embodiment of the disclosed systems and methods there is a period of programmatic delay that allows for alerts to move through the internal analyst scoring system before an item shows up on customer's incident list. This delay is offset by the added reliability that may be placed on scores assigned to incidents when the incident has been reviewed by an analyst. Although in some embodiments of the disclosed systems and methods programmatic scoring is implemented to provide an indication of the sensitivity of an incident, programmatic scoring is often not sufficient to provide a reliable indication of the sensitivity of an incident. Therefore, one embodiment of the disclosed systems and methods has analysts review and adjust the initial automated store for an incident before notifications are issued. To ensure that delays resulting from analyst review and adjustment of programmatic scoring are minimized, one embodiment of the disclosed systems and methods utilizes internal controls that monitor 1) time from incident posting to arrival in the system; 2) time from incident arrival to analyst scoring; and, 3) time from analyst scoring to client notification.

One embodiment of the disclosed systems and methods may implement programmatic capability to set permissions for a user's ability to raise and reduce scores, configurable by zone. For example, a rule may be established that only an account director can raise a score into the Red Zone, or reduce a score out of the Red Zone which may be implemented by software requiring a user to have appropriate authentication in order to make such changes.

One embodiment of the disclosed systems and methods require that the privilege to adjust scores into or out of the red zone are earned privileges that are audited. A review may be made of all instances of raised and reduced scores as part of a performance review. Incidents involving particular influencers, key words, or sources may be specially flagged for faster processing.

In one embodiment of the disclosed systems and methods, the process of analyst scoring may involve consultation with an account director before notification is sent. The consultation with the account director, allows the account director to provide his or her expert analysis of the incident and response strategy. In order to minimize lag time between incident arrival and customer notification, internal notification for incident logging is implemented in some embodiments of the disclosed systems and methods. In such embodiments, each level of incident may have a time associated with acknowledgement of the incident by the analyst team, and processing time before notification is routed to the customer. For example, in one embodiment, the time associated with acknowledgement for green zone incidents is eight hours, for yellow zone incidents is three hours, and for red zone incidents is one hour or less.

In one embodiment of the disclosed systems and methods, as incidents arrive, notification begins by routing the incident to the assigned analyst team. If a team member does not acknowledge receipt of an incident, there may be a failsafe notification process that ensures someone picks up and processes the incident. The failsafe notification process facilitates timely reporting of incidents to customers, as the failure of an analyst to process an incident should not prevent customer notification. In one embodiment, green level incidents are routed to a certain level of virtual agent, and can be pooled, such that failsafe notification would happen much more fluidly. In this case, the virtual agents wouldn't be assigned to a customer, but would pull incidents within a certain range out of the pool and onto their desktop for processing.

In one embodiment of the disclosed systems and methods, red zone incidents, because they are the most serious incidents, have their own protocol for management and response. Any incident that is logged programmatically (via the initial automated scoring) as a red zone incident launches a protocol that ensures a senior analyst and account executive are notified immediately. An internal review and analysis of the issue immediately precedes client notification, and triggers a client notification protocol that ensures the incident is immediately expedited. Typically, red zone incidents will be routed not just to a single customer owner, but to a customer response team, triggering direct communication between the operator of the online conversations monitoring system's account team and the client team.

In one embodiment of the disclosed systems and methods, within the Red Zone, there is an additional sub-zone (crisis zone) at the highest end of the scoring system, with a threshold defined by the customer. Incidents scoring within this crisis zone are deemed the most sensitive of incidents, and require the additional immediate notification of a corporate executive of the operator of the online conversations monitoring system. Typically crisis zone incidents will trigger a Crisis Response team involving not only the customer's designated response team, but often tying in a third party partner such as a public relations team. The disclosed systems and methods may implement a special crisis response protocol both internally and on the customer side, designating first, second and third tier contacts, and determining a response process that ensures rapid and effective resolution of the issue, especially ensuring the prevention of analysis paralysis that prevents timely response.

In one embodiment of the disclosed systems and methods, when a prospective customer has expressed an interest in an initial social media audit, the account executive assigns an analyst team to develop a social media audit to demonstrate the value proposition and power of the online conversations monitoring system 12. The audit includes the development of an initial Incident Search Profile, which details the keywords, issues and scope of an incident search, and the sources and tools included in the search—i.e.: how incidents relevant to the prospective customer will be identified and tracked. The profile is developed with input from the prospect. The profile may be implemented and tested by the analyst team to gather a cycle of incidents to populate an incident list. Incidents are scored and analyzed for recommended response, just as they would be for a regular customer, and the results are presented to the prospect in a meeting with the account director and account executive.

Once a prospect becomes a customer 14, a rapid cycle of service work plans are triggered to set up the online conversations monitoring system service. In one embodiment of the disclosed systems and methods, the service work plans are completed in an on-site workshop. The on-site work shop may result in one, or more of the following, either alone or in combination: completing an Incident Search Profile to establish the scope and focus of search terms, resources to be profiled, products included and competitive set; calibrating the customer's response framework by establishing the scoring thresholds for each response zone; defining special rules of engagement, including designation of incidents that can be managed by the operator of the online conversations monitoring system, and how, and also including any special response rules, resources, or messaging strategies to be used.

Establishing the Response Protocols, including first, second and third tier contacts for issues in all zones, and across business product lines and lines of business may be implemented utilizing a customer configurable page generated by the online conversations monitoring system and accessible via a network connection by a customer for display on a web browser or other application so that users can continually keep the contact list up to date. One example of such a customer configurable page is a response configuration page 1700, as shown, for example, in FIG. 17, of a GUI generated by the online conversations monitoring system 12. In one embodiment basic social media apps may be tied to customer configurable page to facilitate team dialog and sharing. In one embodiment the work plan may also entail a special workshop to help establish a customer response team, crisis response team and protocol.

In one embodiment of the disclosed systems and methods, once an incident search profile is established for a customer 14, the search profile will guide a daily search of media sources 14 on the Web for matching incidents. This daily search may be automated utilizing standard search and indexing systems, or third party tools and data, e.g. FirstRain™, Gigablast™, to allow the daily search to be continuous in nature. Matching incidents may first be scored programmatically according to an incident scoring algorithm prior to delivery into an analyst scoring queue. The analyst scoring cue may be viewable only by analysts of the operator of the online conversations monitoring system 12. The queue may present the incidents in a manner similar to the incident list 210, but may include only items that have not yet passed through analyst scoring.

In one embodiment of the disclosed systems and methods, data analysts are responsible for monitoring the analyst scoring queue for their entities or customers, and monitoring the various search tools used to fill the pipeline. Data analysts may also be responsible for continually tuning and extending the incident search profile to improve the search results in an effort to ensure that all incidents of interest to the entity or customer are stored in the pipeline.

In one embodiment of the disclosed systems and methods, media analysts are responsible for monitoring the analyst scoring queue for their entities or customers, and monitoring the industry media to match any issues against news items for the day, watching for items that have not made it into the pipeline and for new media sources not currently profiled. When industry issues or incidents are identified that are not in the pipeline, media analysts are responsible for teaming with the data analysts to ensure they can be captured in the future. When new sources are discovered, media analysts are responsible for adding them to a growing profile of sources and influencers. These profiles are viewable to the entity or customer, and can be augmented by the entity or customer. These profiles may also be added where appropriate to an internal industry source database that will be leveraged by analysts to develop industry intelligence beyond the entity customer.

In one embodiment of the disclosed systems and methods, as items arrive in the response pipeline, data and media analysts are jointly responsible for applying a set of rules (the Analyst Scorecard) to complete the scoring of each and every incident, or of incidents defined by particular scoring parameters (e.g. human-scoring may be limited to incidents scoring above a minimum threshold to reduce labor costs). The incidents may be divided up among the team's analysts based on score and seniority, with data analysts scoring green zone incidents and media analysts scoring yellow zone incidents. In one embodiment of the disclosed systems and methods, red zone incidents may be scored only by the account director. Analysts complete the scoring process by indicating a response recommendation to the customer 14 (e.g. ignore, watch, respond), and if warranted, adding a note to the customer 14 about response strategy. The higher the score, the more emphasis will be placed on providing a strategic recommendation. When incidents have passed through the analyst scoring process, they enter the incident list 210 and customer notification is triggered.

In one embodiment of the disclosed systems and methods, there are user configurable rules for notification, including ability to determine which items trigger what kind of notification—email, text, IM and even automated phone notification of critical response incidents. Notification may be implemented utilizing a small desktop widget that has a running ticker of items, much like a stock ticker or a similar item that may be displayed on handheld devices or mobile phones. Once customer notification has been triggered, the account director bears responsibility for ensuring incidents are acknowledged by the assigned owner, and for following up when the response window expires. Most of the notification process, including failsafe contacts and escalation, may be programmatic, but account directors may have a dashboard displaying items that haven't been acknowledged, and may have discretion in following up personally to ensure sensitive issues are addressed in a timely manner. In one embodiment of the disclosed systems and methods, the failsafe provides flexibility of contact channel for the customer (web, phone, email, etc), but emphasizes expedited contact with a real person who can provide assistance in real time.

In one embodiment of the disclosed systems and methods, each week, the analyst team and account director review each client's incident traffic with a focus on tactical and strategic issues, including incident coverage, incident search profile tuning, client response times, and general industry incident traffic. Such review may be more or less frequent within the scope of the disclosure. Reviews may be grouped by industry to eliminate redundant discussions over industry incident traffic and response strategies. Such review may include a call with customer teams to normalize expectations and outlook for the coming week. These reviews may elicit input from the customer on upcoming events that may trigger new incidents—such as announcements, corporate and industry events, product launches, etc. The weekly process may culminate in a report delivered to the client as a Weekly Incident Review, which may be delivered and archived online.

In one embodiment of the disclosed systems and methods, the account director and account executive may meet monthly to review each customer's account. Such review may be more or less frequent within the scope of the disclosure. The Weekly Incident Reports may provide the foundation for account review, and ensure that issues raised during the month have been successfully resolved. Each month, the account executive may engage in a conference with the customer account owner, to provide a strategic overview of the incident landscape, both for the customer and the customer's industry at large.

In one embodiment of the disclosed systems and methods, each quarter, the account executive may meet with the customer account team to review the quarter and plan strategy for the coming quarter. These meetings may be founded on a high-level strategic overview of industry incidents, and may include a breakdown of industry, competitive and product line reviews.

One embodiment of the disclosed systems and methods, utilizes a browser toolbar button for submitting URLs containing a relevant incident. The function of the button can be as simple as simply submitting the current URL to the operator of the online conversations monitoring system 12 with no other interaction required. Registration of the button may tell the operator of the online conversations monitoring system 12 the source and time of the submission. This button could be provided to customer staff so that they're able to act as eyes and ears for the company when they're surfing the Web. Such browser tool bar button may be made available to confederate customers who have been identified as influencers and opinion leaders to further improve the ability of the system to automatically search appropriate media sources.

In one embodiment of the disclosed systems and methods, a desktop client is provided to allow customers to track their Response List in real time without having to pull down data through a web page—similar to a desktop stock ticker. The response list client may also be a mobile application to allow the response list to be received by other devices as well.

In one embodiment of the disclosed systems and methods, not only are incidents identified by the client 14 tracked, but the system 12 implements a search that may discover a major incident outside the area identified by the client 14. Upon identifying "new" incidents affecting an entity or customer 14, the entity or customer 14 may be notified of the incident and asked whether such incident should be added to their profile.

In one embodiment of the disclosed systems and methods, the incident collection process may be implemented manually. In such embodiment, aspects of the information management challenge, including scoring, tracking, routing and notifications, may still be automated. In one embodiment of the disclosed systems and methods, manual incident collection is streamlined by storing customized queries for each search index, so that analysts can simply run the queries rather than reforming them each time. In one embodiment of the disclosed systems and methods, at least portions of the incident collection process are implemented utilizing automation. Such automated incident collection may be implemented utilizing $3^{rd}$-party licenses of web crawling, indexing, searching and syndication systems. Part of the challenge in incident collection is that sources of social media incidents are by no means standard, and therefore not universally searchable (Facebook™, for example, is not fully searchable with standard automated tools such as web crawlers)). New social networking sites, forums, review sites, etc. come online daily, and are essentially off the radar, i.e. not fully searchable with standard automated tools such as web crawlers. Thus, in one embodiment of the disclosed systems and methods, humans will be required to scan the Web for new off the radar conversations.

In one embodiment of the disclosed systems and methods, the operator of the online conversations monitoring system 12 conducts the search based on keywords and keyword phrases. This search may be conducted using existing or subsequently developed search technology to automatically discover secondary search terms and affinity keyword phrases. Upon completion of the initial scan on any new search, each subsequent search may be limited to whatever minimal increment of time the target search index allows. In that way, each search will turn up only the newest query results to push into the pipeline. Query returns may be added to a raw pipeline, along with other targeted data feeds like RSS subscriptions. Basic natural language processing techniques may be utilized to automatically scan for duplicates in the raw pipeline. Appropriate rule sets are utilized to determine whether duplicates should be eliminated or grouped. One example of a rule set would state that where the duplicates originate from the same source all but one are eliminated from the pipeline, but in cases where the duplicates are spanning multiple sources, they are grouped since conversations can span locations as well.

In one embodiment of the system, incidents gathered by way of broad search queries will be processed by Natural Language Processing keyword filters, and automatically matched to established keyword topics created for each customer.

When the pipeline is populated with incidents, each incident is then scored. In one embodiment of the disclosed systems and methods, a first automated scoring process is performed programmatically. The first scoring process incorporates a standardized composite ranking that aggregates external ranking systems into a composite score for the source domain of each incident. Such external rankings may be normalized to an appropriate scale on a quintile curve, in one example, a one hundred point scale. Among current well known external ranking systems that may be utilized are Google Page Rank™, Technorati™, Alexa™ and Compete™. New or additional external ranking systems may be utilized with the systems ranking normalized in the manner described above. Utilizing this first automated scoring process, an initial score provides a first level of prioritization.

In one embodiment of the disclosed systems and methods, a second automated scoring process examines inbound links for each incident, and whenever possible, the number of comments or reviews associated with each incident. Based on the inbound links and the number of comments or reviews the initial score may be adjusted upwardly or downwardly to provide an automated score so that incidents can be distributed to an appropriate analyst for further scoring. Thus, an initial prioritization of incidents based on the influence of the source and the activity on the specific incident is automatically established. Since incidents are gathered based on queries developed by keywords associated with specific topics, some basic information for organizing the incidents is already available.

In one embodiment of the disclosed systems and methods, incidents will move into the Analyst Scoring process following the initial automated scoring. Natural Language processing may be utilized to gather information about keyword density, and sensitivity around certain indicator words or phrases that might indicate a competitive situation, an emerging crisis, or a customer support issue. This will help prioritize incidents for analyst attention. An analyst reviews incidents that score high during the initial technical scoring process.

In one embodiment of the disclosed systems and methods, Natural Language Processing may be used to scan incidents for screen names of post authors and commenters. A database of authors and commenters may be maintained that tracks frequency of dialog, span of sources where they are active, keywords associated with their posts, and the average score of incidents in which they participated. These scores over time will also add to the scoring of incidents in the raw pipeline—when an author appears who is commonly associated with sensitive incidents, the prioritization of the new incident may be increased.

In one embodiment of the system, analysts may establish a folder where incidents can be collected and analyzed by Natural Language Processing to automatically exclude similar incidents in future scans, or to automatically target similar incidents in future scans. For example, classified advertisements may be collected to help the Natural Language Processing system identify and filter out classified advertisements from the incident pipeline in the future.

In one embodiment of the disclosed systems and methods, the scoring process includes two stages, the initial source scoring algorithm and the incident scoring process. The initial source scoring algorithm relies on composite scores and external data to populate and prioritize the raw incident pipeline. The incident scoring process relies on natural language processing and human review and analysis to further prioritize and rank incidents for engagement and response.

Figure 17:
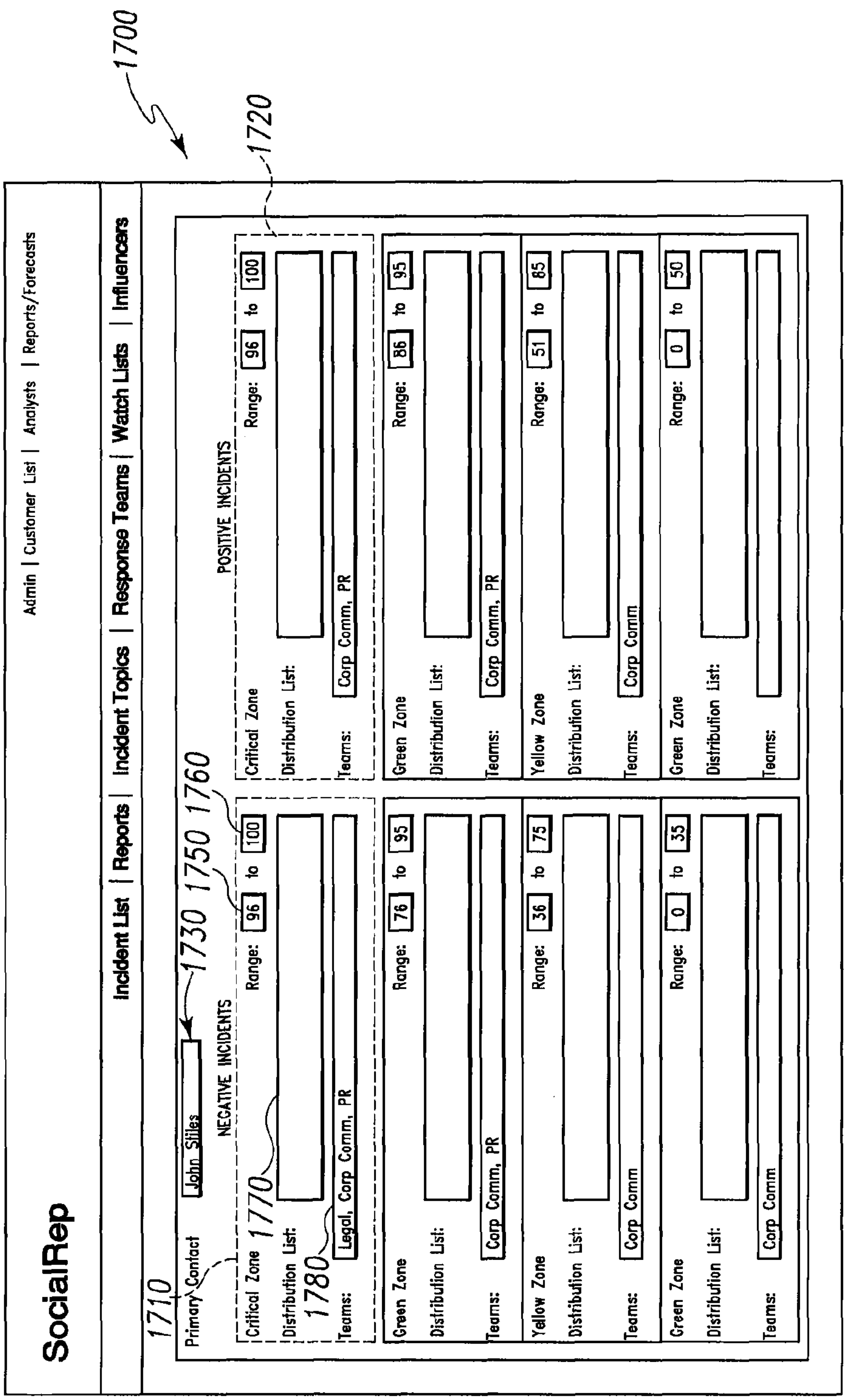
FIG. 17 is a screen shot of a response configuration page of a graphical user interface generated by the online conversations monitoring system.
Figure 19:
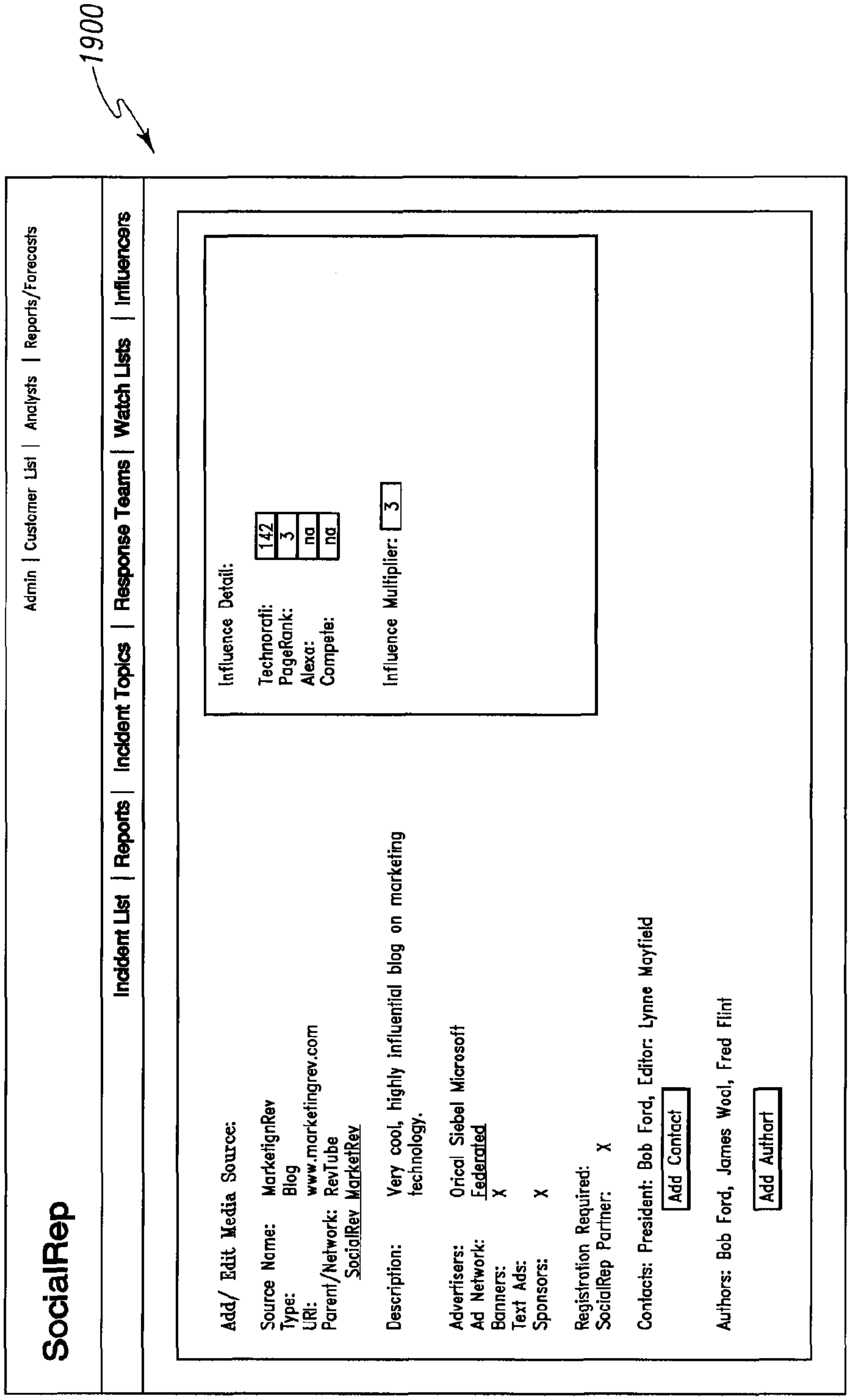
FIG. 19 is a screen shot of a source detail page of a graphical user interface generated by the online conversations monitoring system.
Figure 20:
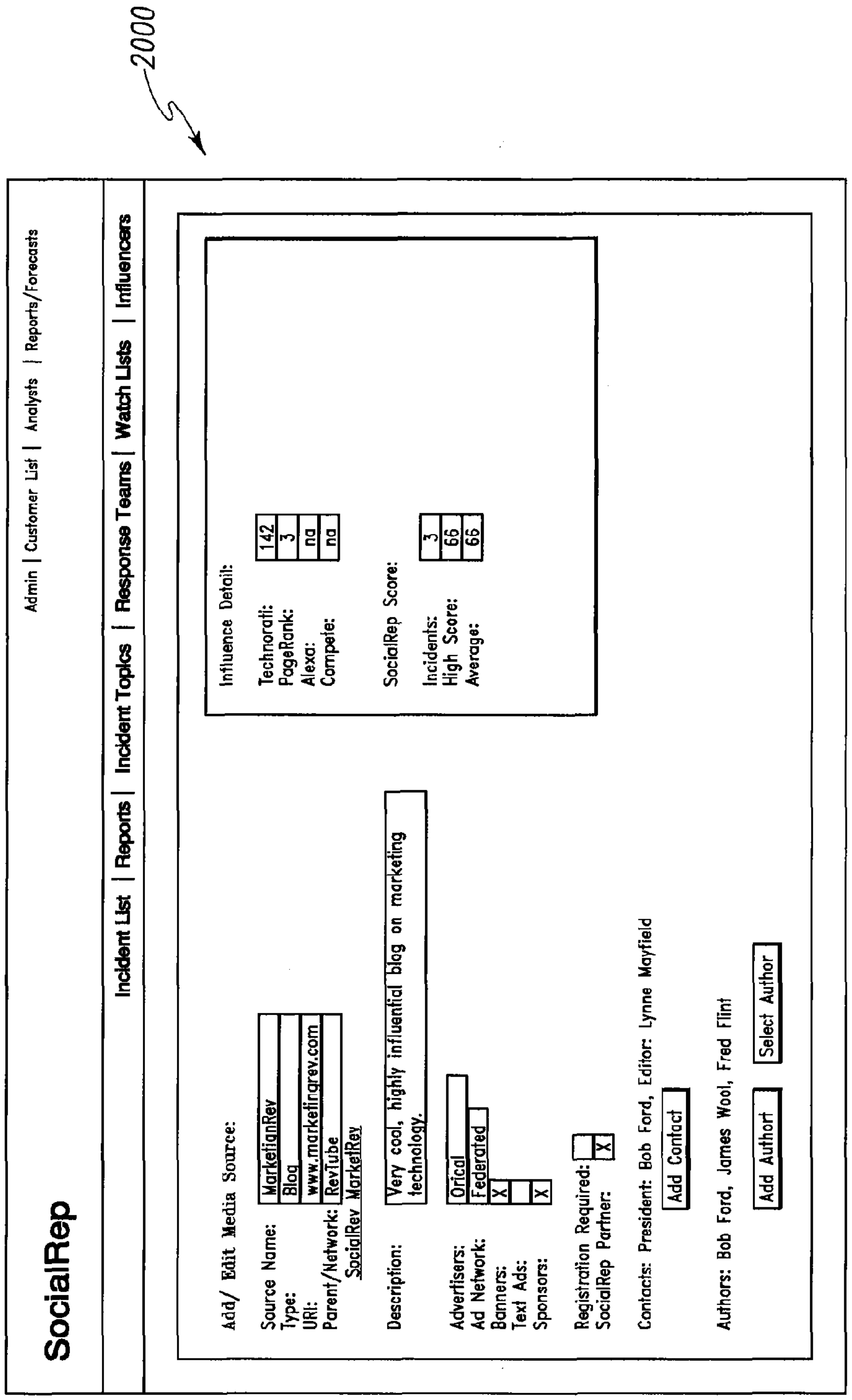
FIG. 20 is a screen shot of an Add/Edit source page of a graphical user interface generated by the online conversations monitoring system.
Figure 21:
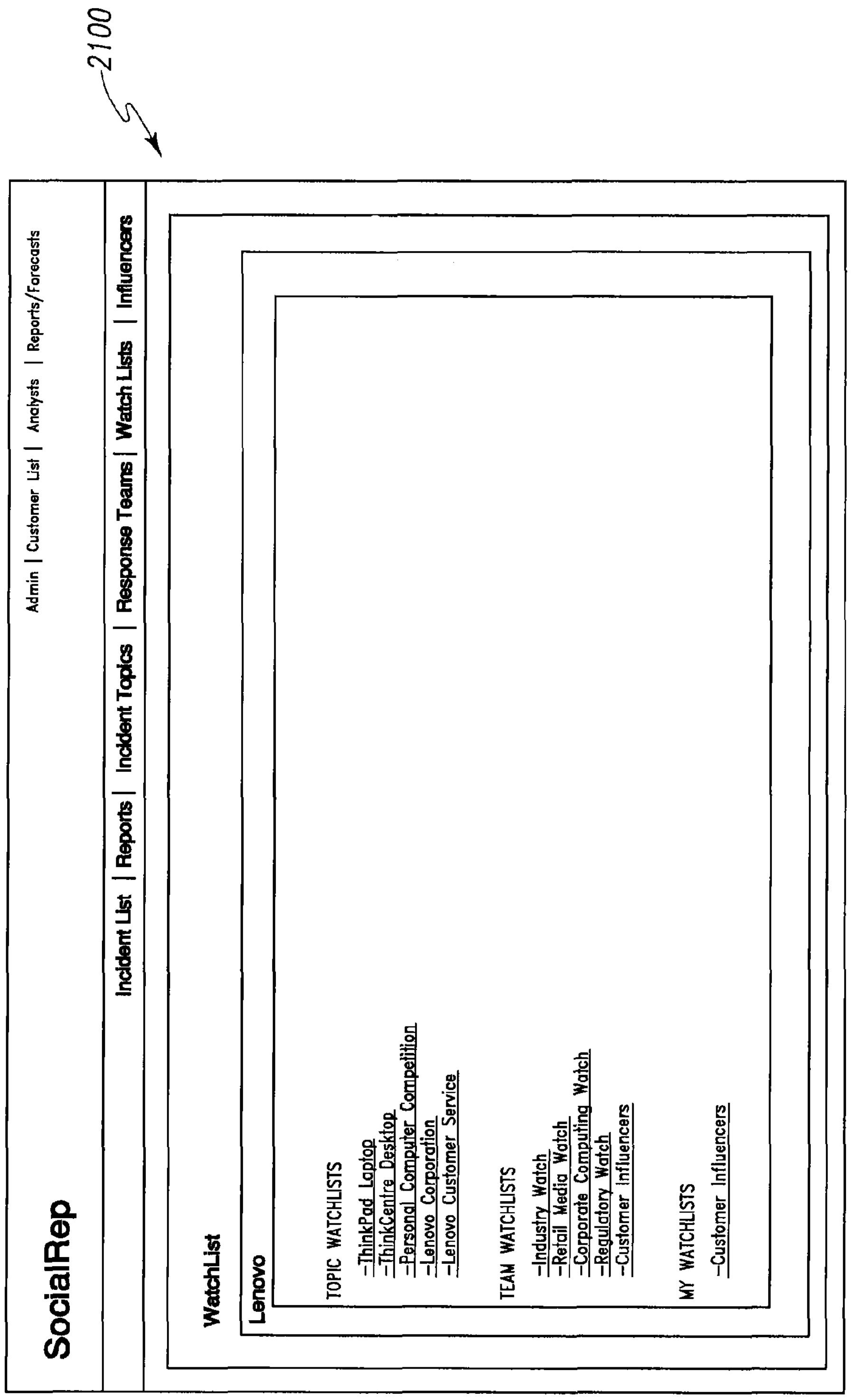
FIG. 21 is a screen shot of a watch list page of a graphical user interface generated by the online conversations monitoring system.
Figure 22:
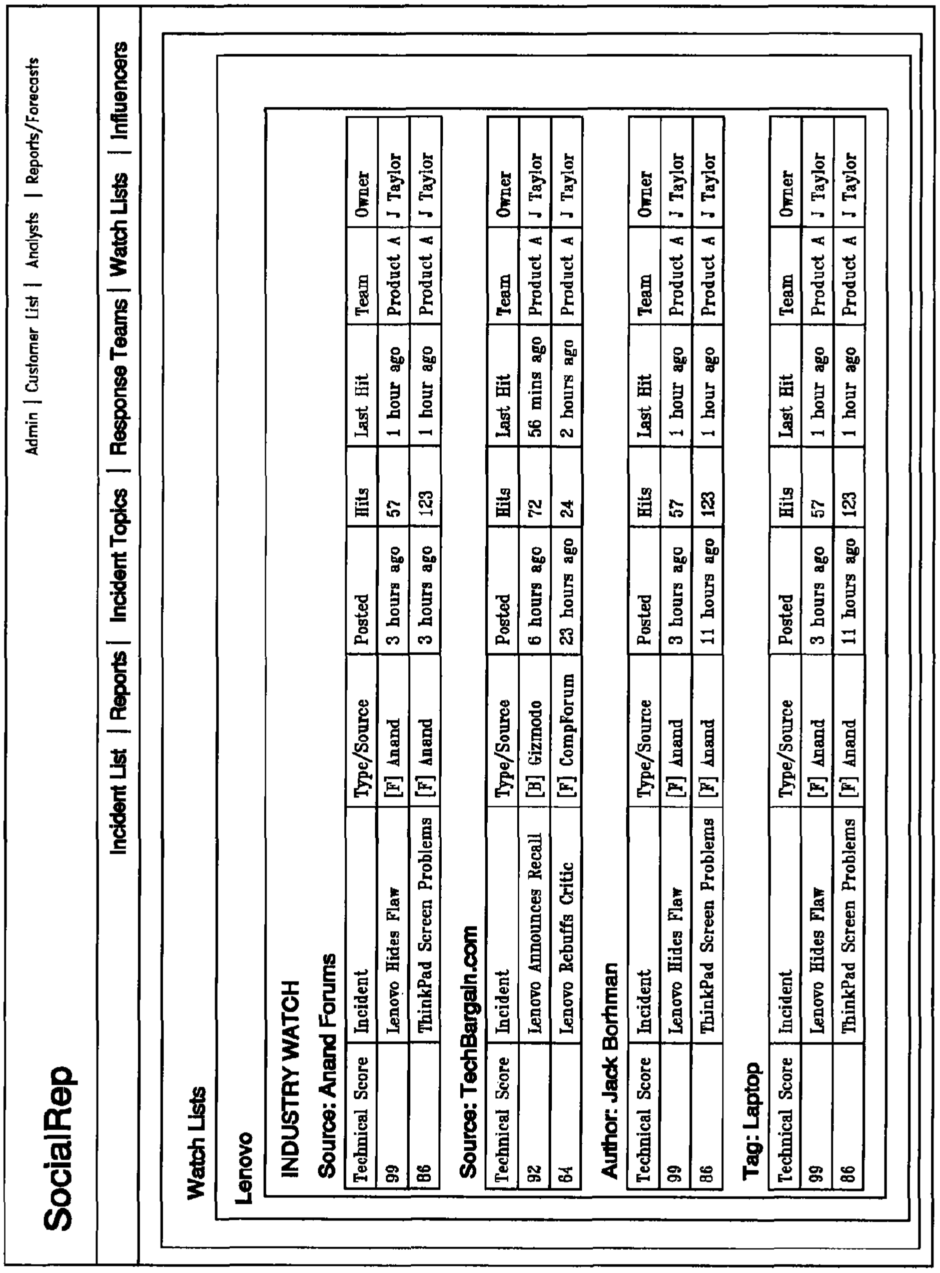
FIG. 22 is a screen shot of a Watch list detail page of a graphical user interface generated by the online conversations monitoring system.
Figure 23:
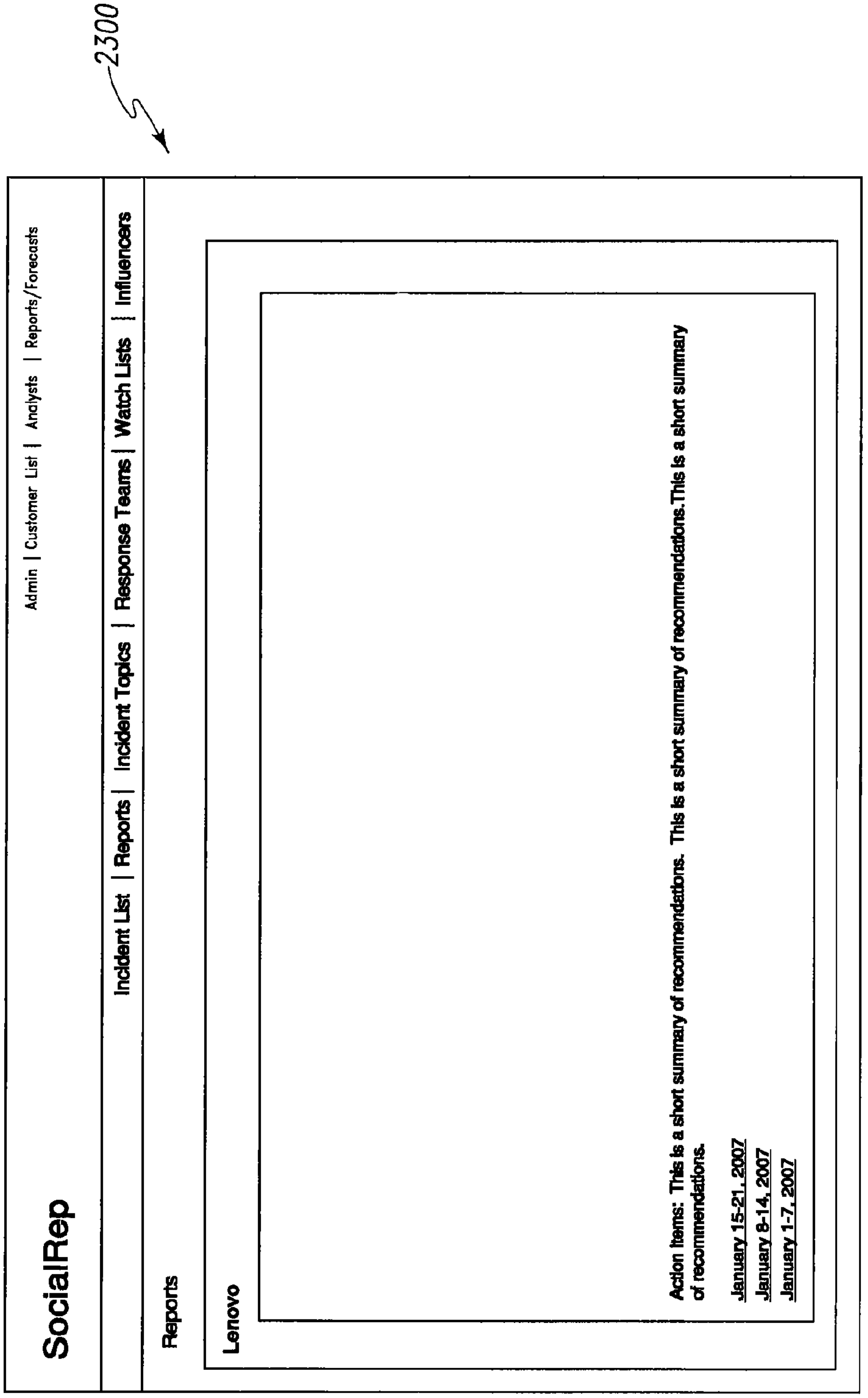
FIG. 23 is a screen shot of an add/edit Watch list page of a graphical user interface generated by the online conversations monitoring system.
Figure 24:
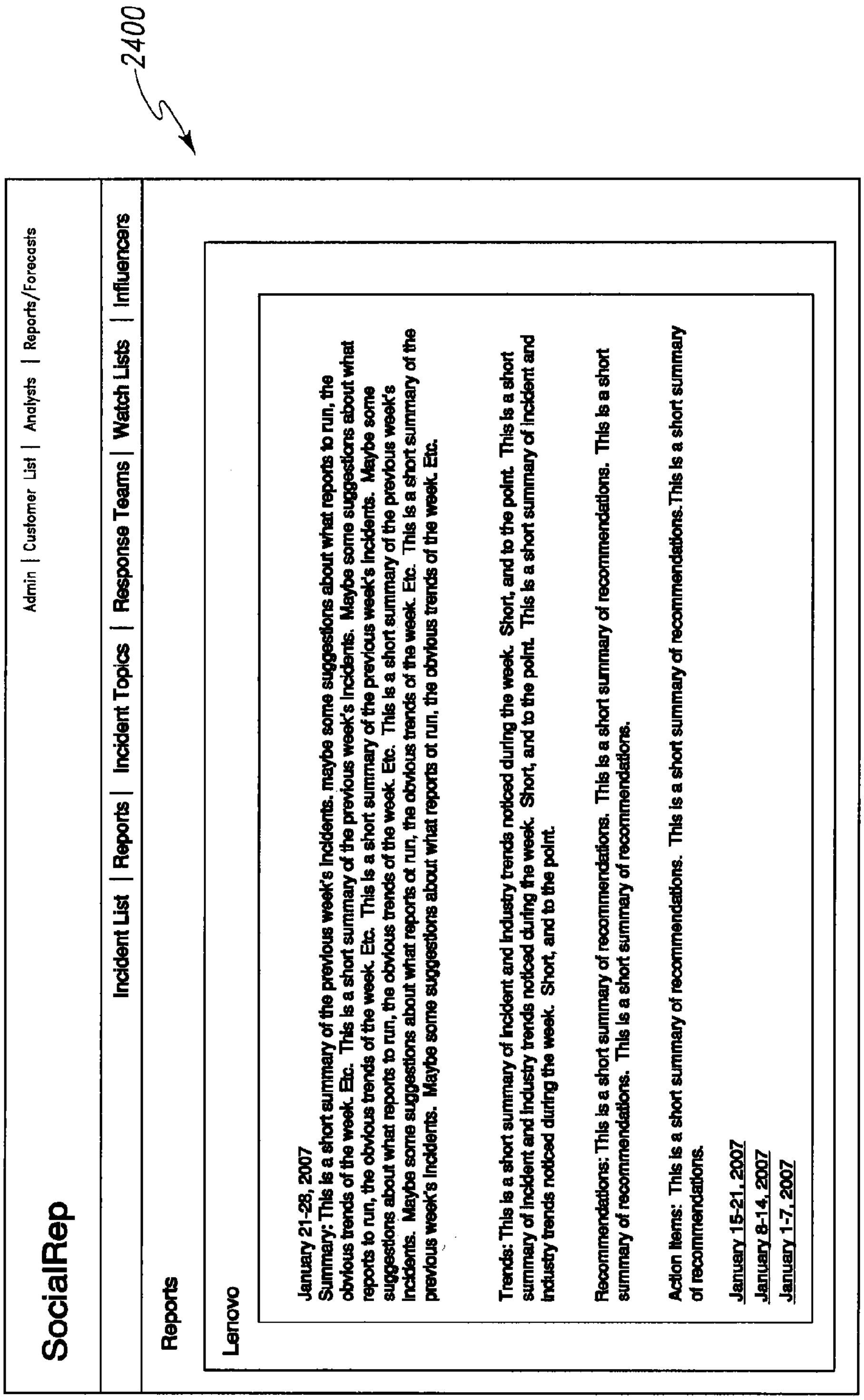
FIG. 24 is a screen shot of a Reports page of a graphical user interface generated by the online conversations monitoring system.

Following scoring, in one embodiment of the disclosed systems and methods, an incident table 210 is generated for display via a web browser or other application accessible via a web enabled device. Customers 14 accessing the online conversations monitoring system 12 may also be provided with a screen, such as, for example, a response configuration screen 1700, as shown in FIG. 17, that allows them to establish their own prioritization thresholds according to the scoring system, and to establish their own workgroups and notification for different scoring groups. For example, one customer with a very high sensitivity for all incidents might set a very low threshold for what is considered a "red alert" score, while another customer will set the threshold much higher. Every scoring "zone" may be configurable by the customer, but the actual score that is generated by the online conversations monitoring system will be determined by the scoring system being implemented and thus is fixed.

Additionally, customers 14 accessing the online conversations monitoring system 12 website may, after proper authentication, be presented with an incident table 210. Incident table 210 may be a graphical user interface that may be drilled down into by appropriate interaction by the customer as described below.

The GUI presented to the customer 14 does not provide a view into the raw incident pipeline, but through appropriate interaction may allow a customer 14 to view the incident pipeline of incidents that have been fully scored. Depending on how they want the application configured with administrative privileges, clients may or may not have the ability to manage incident data directly. Some will want that capability, others will want it fully managed. The ability to manage incident data directly may be enabled or disabled upon request, depending on the degree to which customers want to function as analysts.

The incident pipeline is the stored current and relevant incidents for each customer. The incident pipeline is utilized to populate the incident list 210, as shown, for example, in FIG. 2. This is the view that most customer users will access each day, in order to keep their finger on the pulse of social media dialog affecting their market. At a glance, users can easily see the number of incidents they need to focus on, as determined by each incident's score, topic, sentiment, timeliness and any relevant alerts. The view shown in FIG. 2 of the incident table is only an exemplary view of one embodiment as even the illustrated embodiment can be customized according to user permissions, and can be filtered according to the user's particular concerns, filtering certain types of incidents to the top for faster analysis. Incidents can also be grouped into defined categories by a customer-side account administrator or by an analyst.

The incident table 210 presenting the incident pipeline represents a culmination of processes and activities of the online conversations monitoring system 12 that work to discover, catalog, score, prioritize and analyze incidents. For most customers, the incident table 210 will be a major component of an incident pipeline GUI 300, as shown, for example, in FIG. 3. The incident pipeline GUI 300 will be the first view of incidents in the system—though some advanced customer users will also get involved in the preceding processes and activities. Once a customer has accessed the incident pipeline GUI 300 the customer may take ownership of coordinating response to incidents listed therein. Nevertheless, the online conversations monitoring system 12 may be involved in response activities as an agent of the customer.

Upon accessing the incident pipeline GUI 300, users are able to view and sort an incident list with currently open and unprocessed incidents. As shown, for example in FIG. 2, the incident list 210 presented in the incident pipeline GUI 300 may display: the Incident Score (which may be color coded for quick read); an incident title for each incident, the source of the incident and the source's type—whether blog, forum, review, news site, etc.; the incident's sentiment, positive or negative; when the incident was first posted online, and how many responses it's had; to whom the incident has been assigned; a recommended response tactic; and an indication of whether the incident has been acknowledged by the assigned owner for response.

Figure 4:
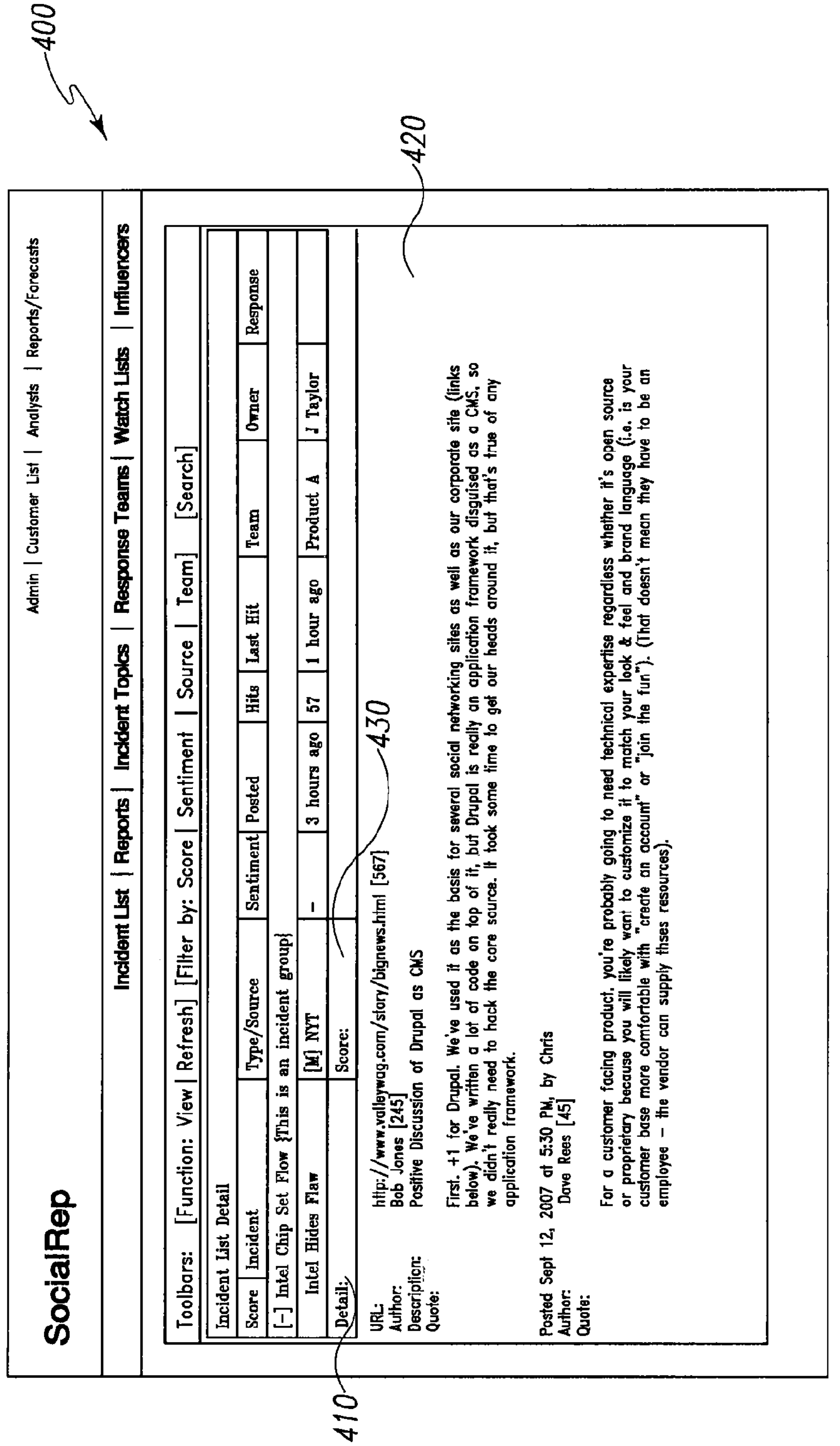
FIG. 4 is an incidents detail page accessible by clicking on an incident in the incident list of the GUI of FIG. 2 showing details regarding the incident clicked upon in a window.

The incident pipeline GUI 300 allows users 14 with required permissions to group incidents into logical categories for easier information management. Additionally, users 14 can select various filters from the toolbar 310 to shape their view of the incident list 210, including filters by score, sentiment, team and source. Finally, users can view more details about individual incidents by clicking on the incident to view it's details page. Clicking on an incident directs the browser to a incidents detail page screen, as shown, for example, in FIG. 4, that provides details of the incident.

The incident details page 400 is where analysts and customer-side communications managers can access and update ongoing details related to a particular incident, including information about the incident content, participants, analyst insights and incident scoring. Users can click on the "Details" tab 410 to view the incident's source URL, Author, a short description, quotes and outtakes from the source, and an ongoing history of analyst comments and incident updates in a window 420 of t incidents detail page 400. Authorized users are able to add information to the Incident history, in the same way comments are added to an ordinary blog post. In one embodiment, of the disclosed systems and methods, separate history and detail tabs are presented to the user.

Figure 5:
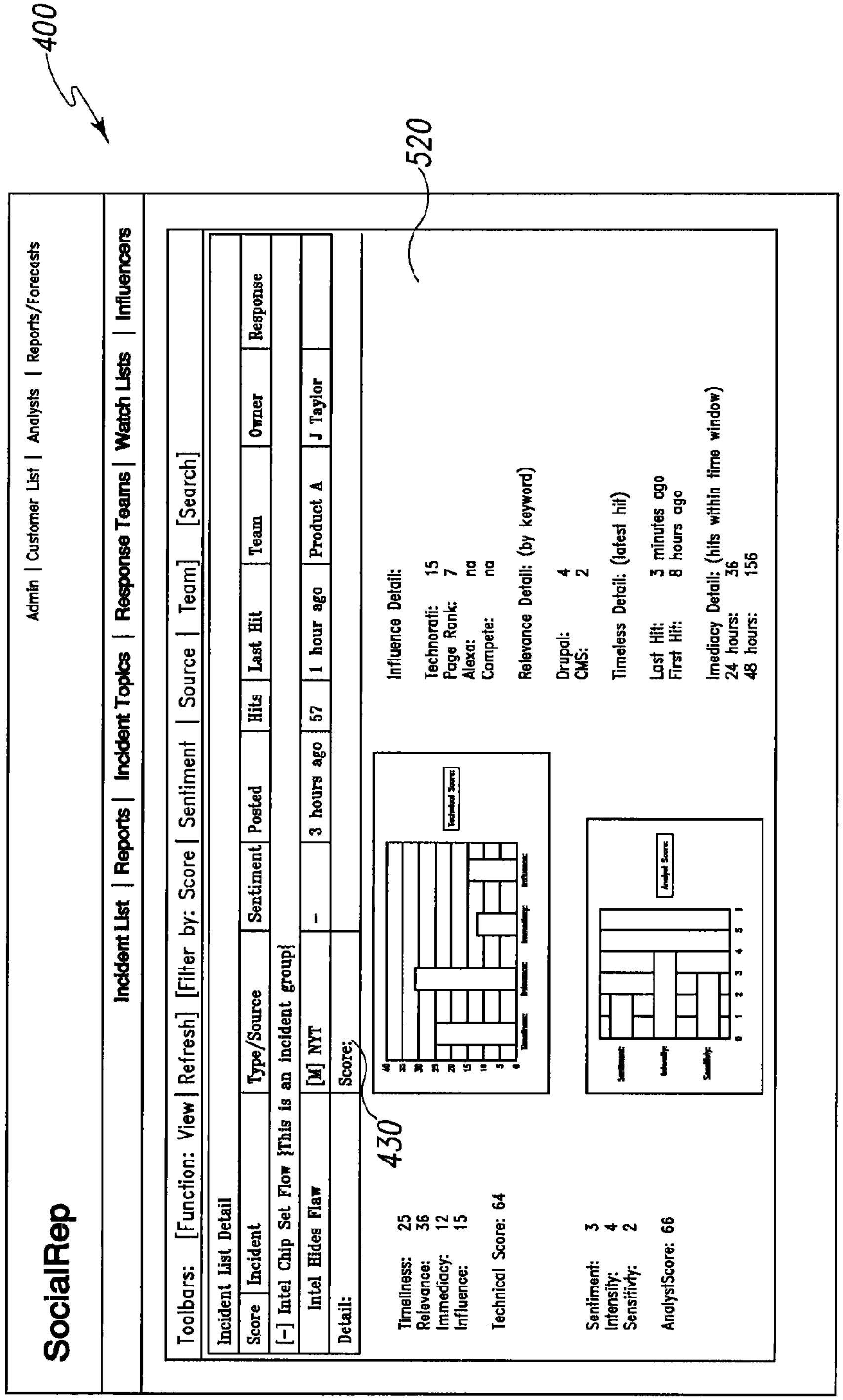
FIG. 5 is the incident detail page of FIG. 4 displaying the scoring details regarding the incident as a result of a user clicking on the scoring tab of the incident detail page.

By clicking on the Score Tab 430, users are able to view the scoring details of each incident in a window 520 of the incident details page 400, as shown, for example, in FIG. 5. The score details may include each of the individual components that make up the source and incident scores. Users can click on the "Score" tab to view the incident's aggregate score and each of the underlying composite scores. Authorized users can click on an edit button (Not shown in FIG. 5 as FIG. 5 represents a customer interface, but available on the GUI presented to analysts) in order to change or update an incidents component scores.

In one embodiment of the disclosed systems and methods, incidents are collected into the online conversations monitoring system 12 through a process that begins with the creation of content topics, for which specific search queries for various search engines, aggregators and indexes are developed and maintained. These queries are matched to a web crawler and index to continuously generate search results. When an incident is discovered among the search results, it is added to the system and stored in memory for retrieval and for scoring, analysis and response routing.

Figure 6:
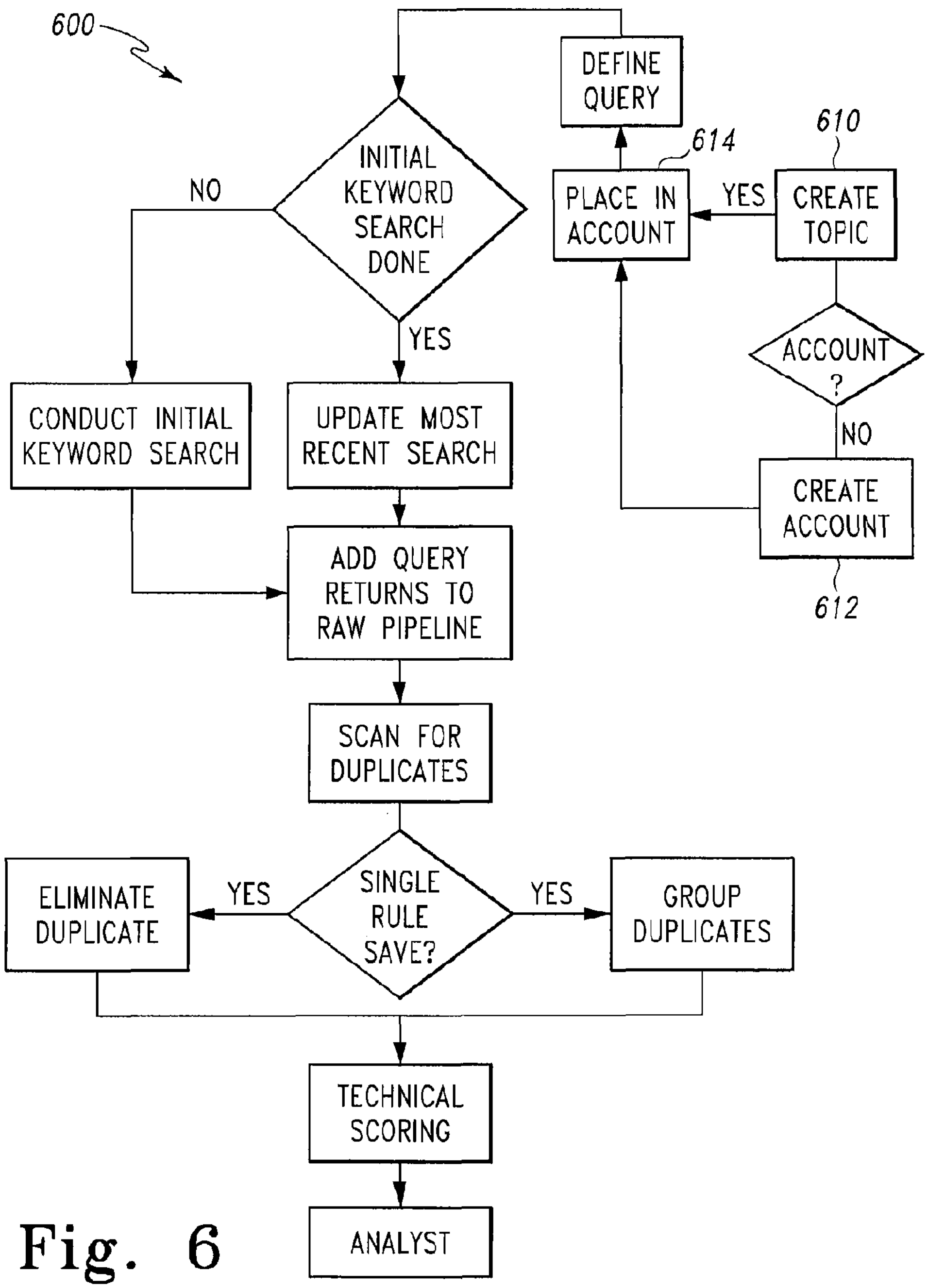
FIG. 6 is a flow diagram of a method of tracking social reputation.

As shown for example, in FIG. 6, in one embodiment of the method of tracking social reputation 600, the first step 610 in finding relevant incidents on the Web is to create a topic. If an account does not yet exist for a customer then a customer account is created 612 and the topic created in step 610 may be placed in the newly created or a previously existing customer account in step 614. Thus, each customer account may have several topics associated therewith, within which several sub-topic groups may be created in order to sensibly order information. For each topic, one or more queries are defined in step 616 for use in searching media content to find incidents related to the topic. The topics and queries are stored in memory in a linked fashion. As queries are added to each topic, they appear in their respective group, along with top-level information data linked to the query that will help users determine which queries are returning useful results. Among the types of top level information data that may be stored in memory and linked to the query are the amount of time the query has been monitored, the number of incidents generated by that query, and/or the average relevance score of incidents filed under that query. Topics, queries and top level information data may be stored in a database or other data structure within the scope of the disclosure. The remainder of the searching and scoring method is shown in block diagram form in FIG. 6.

Figure 7:
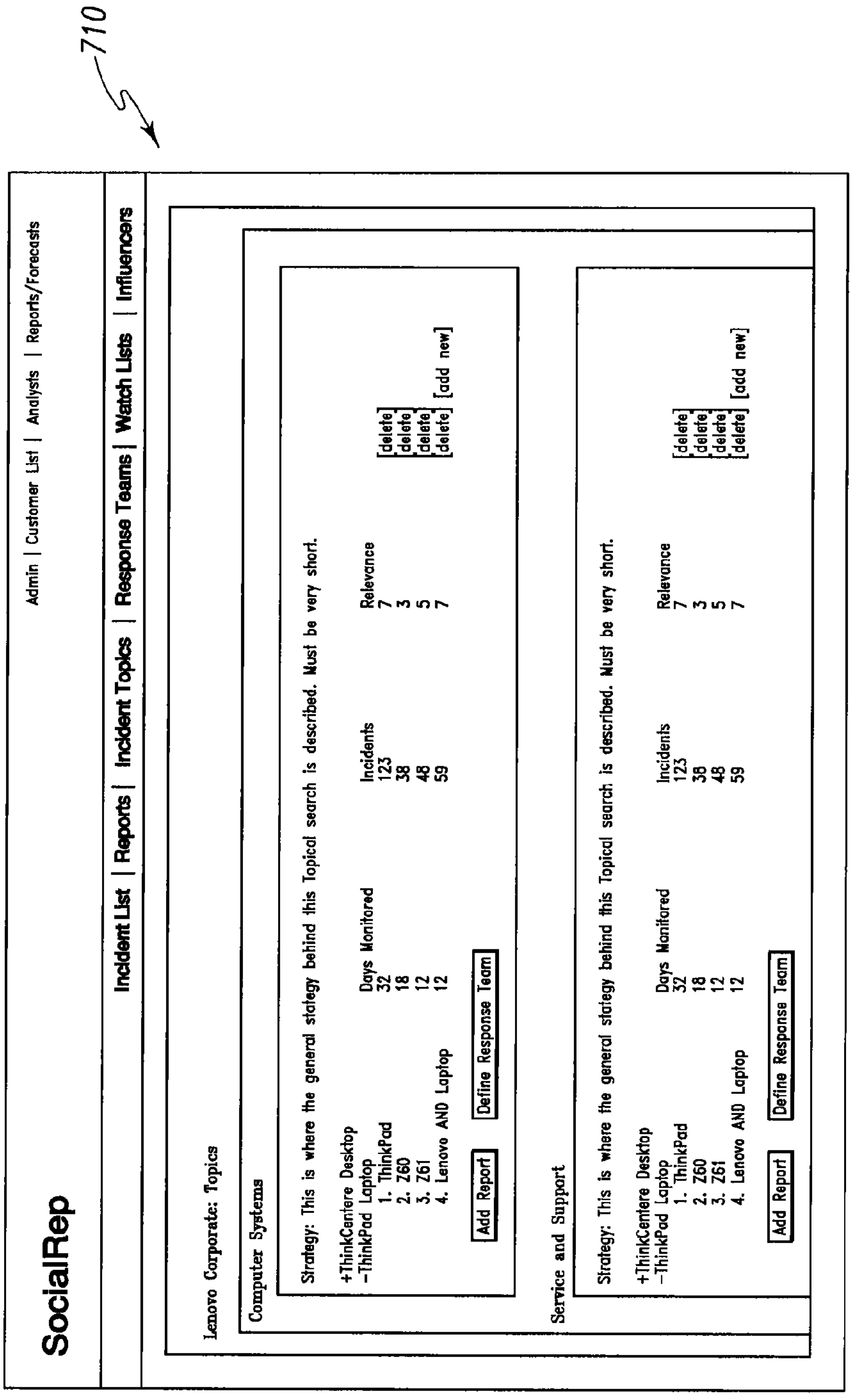
FIG. 7 is a screen shot of a page of a graphical user interface generated by the online conversations monitoring system to facilitate adding topics and queries to memory.

FIG. 7 shows one example of a graphical user interface 710 generated by the online conversations monitoring system 12 to facilitate adding topics and queries to memory. An authorized user, interacting with GUI 710 can add topics and queries to memory, generate reports from data stored in memory and create or modify information regarding response teams. Users interacting with GUI 710 can easily view an individual customers Topic list, and drill down to view sub-topics and queries, including top-level information about those queries. Users interacting with GUI 710 can add Topics to the topic list for the user. Users interacting with GUI 710 can delete and/or initiate the addition of query entries linked to topics shown on this page. Users interacting with GUI 710 can initiate a weekly per-topic Report from this screen, to summarize weekly issues in an incident Topic group. Users interacting with GUI 710 can modify the Topic's response profile, including customizing the response configuration and response team for each topic.

Once a Topic has been created, users can begin adding queries to drive the search for relevant incidents. Queries are developed specifically for one or more "Indexes", meaning search engines, content aggregators, RSS feeds, or other sources where social media incidents can be found. These indexes may also include partnerships with companies like BuzzLogic™ or Biz360™. Any external source for gathering aggregate social media incidents may be considered an Index within the scope of the disclosure.

Figure 9:
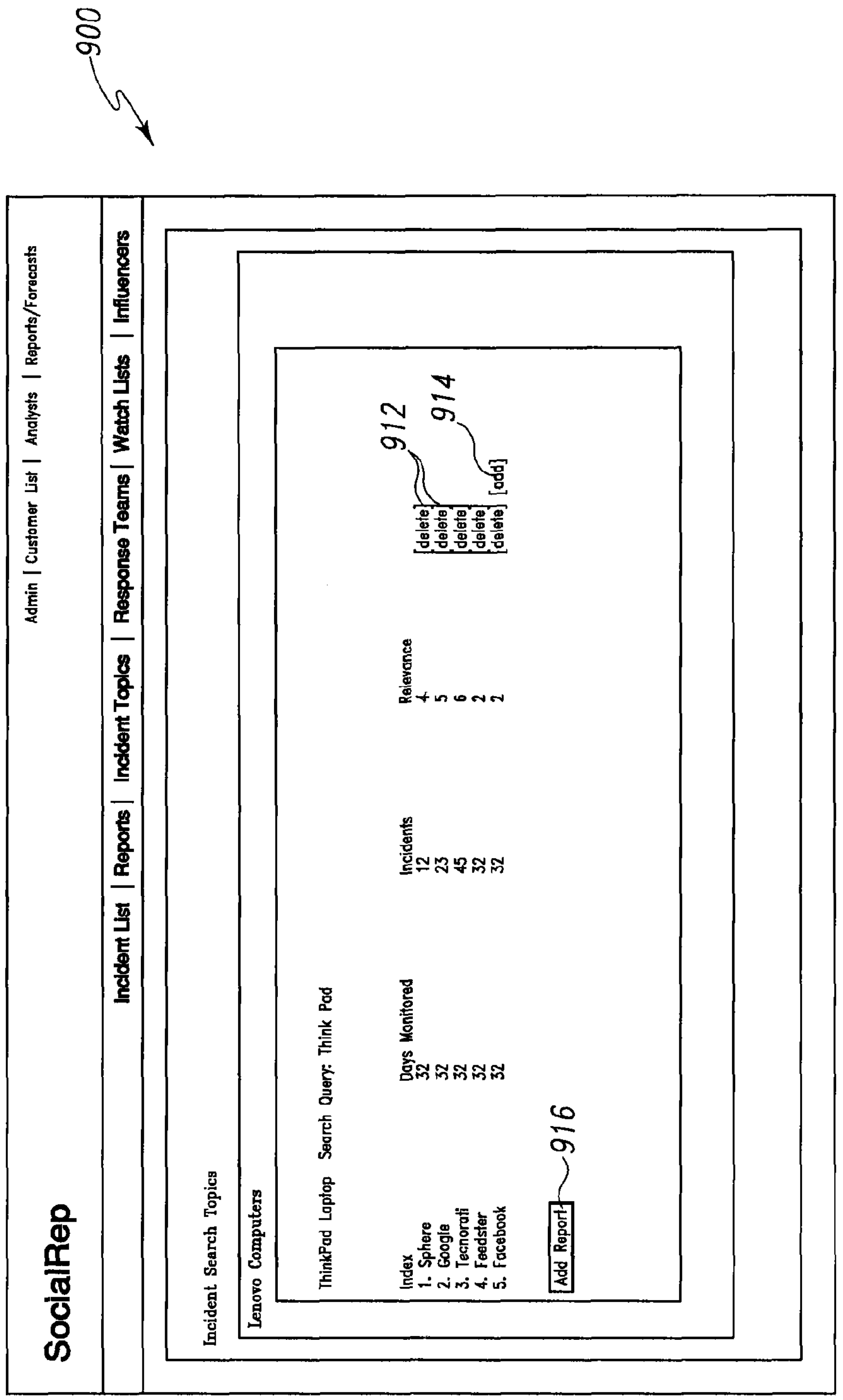
FIG. 9 is a screen shot of a view topics screen of a graphical user interface generated by the online conversations monitoring system.
Figure 10:
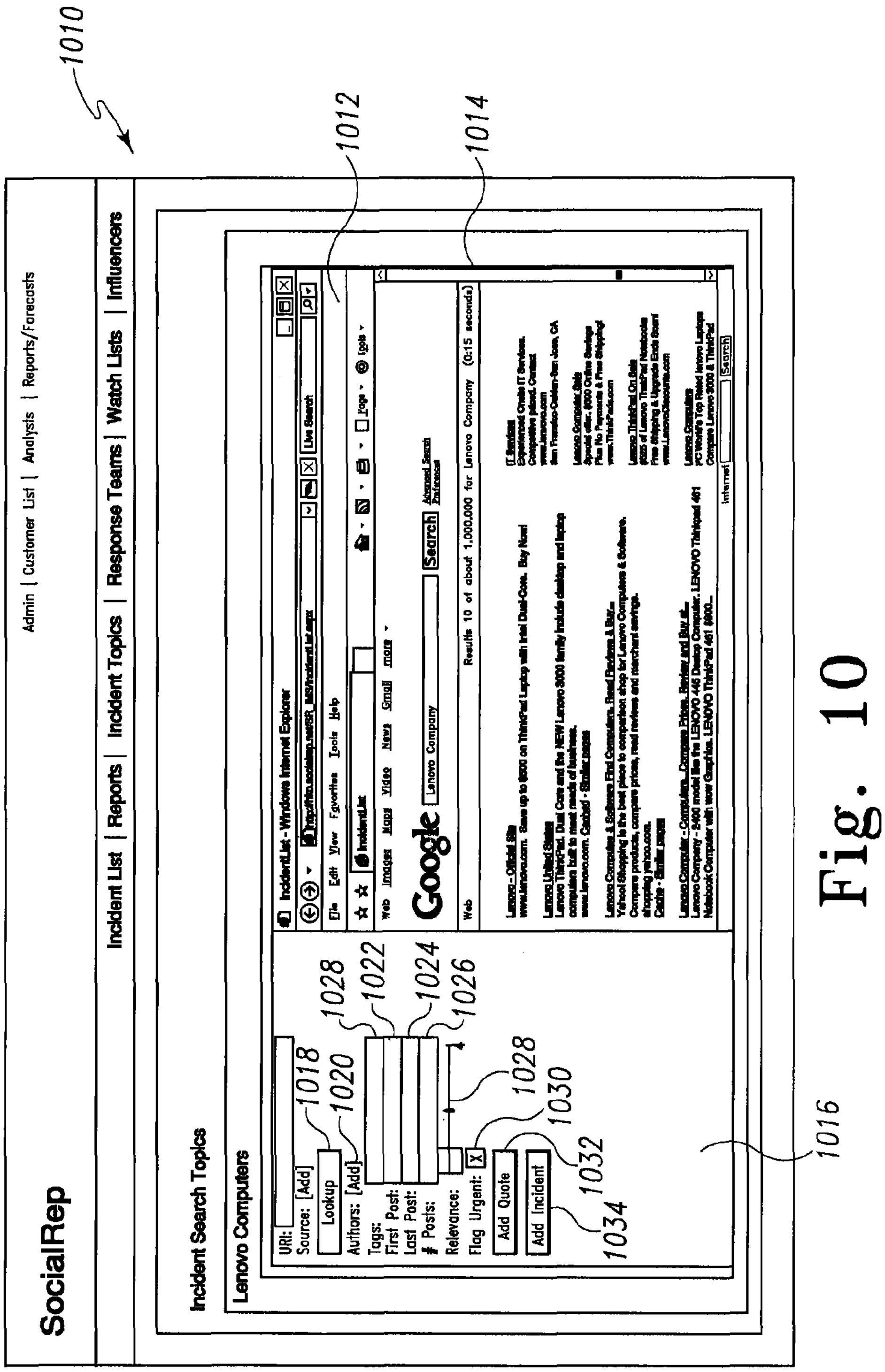
FIG. 10 is a screen shot of an Add Incident page of a graphical user interface generated by the online conversations monitoring system.

As shown, for example, in FIG. 9, the view topics screen includes many items with which a user can interact. Users can easily view the queries arrayed under each Topic, and listed according to the index for which the query was created. Users can review top-level performance metrics for each query, including the number of days the query has been run, the number of incidents collected under that query, and the average relevance score for those incidents. Additional metrics and scores may be added as appropriate. Users can delete queries from this screen by clicking on a delete button 912. Additionally, by clicking on the add button 914 the user can launch the screen 810 for adding a new query. Users can also initiate a weekly per-topic report from this screen to summarize weekly issues in an incident Topic group, by clicking on the add report button 916.

Figure 8:
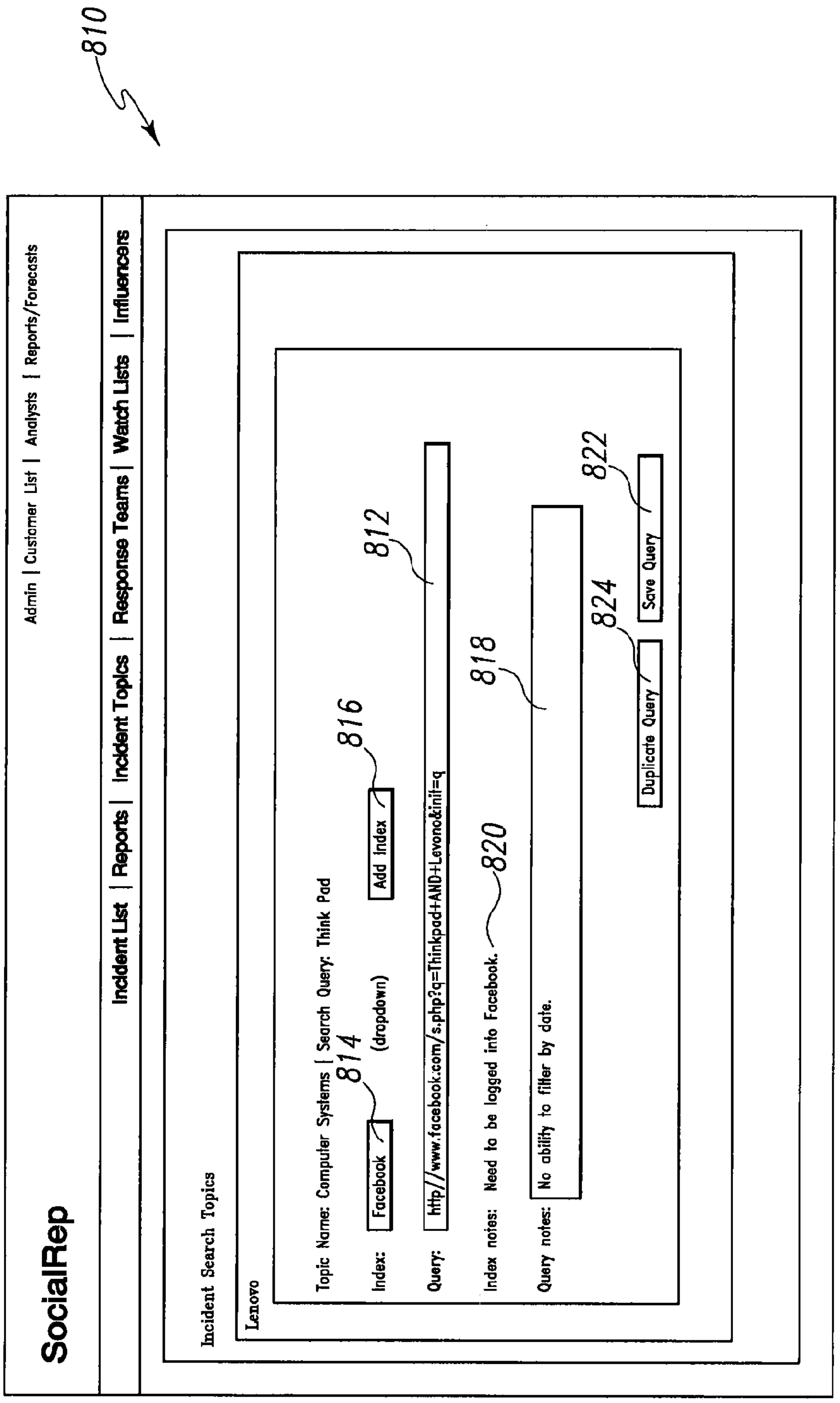
FIG. 8 is a screen shot of an add query screen of a graphical user interface generated by the online conversations monitoring system.

In some embodiments of the disclosed system and methods, searches are conducted manually. During a manual search, a user navigates to the Index online, uses the Indexes own interface to create an effective query. In one embodiment of the disclosed systems and methods, the system generates a GUI with which the user interacts which GUI presents an add query screen 810, a shown, for example, in FIG. 8. A user, after having formed a query using an index's interface, may copy that query to memory of the online conversations monitoring system 12 by pasting the resulting copied query URL into the query box 812 of the add query screen 810. The add query screen 810 of the GUI thus serves as a way to easily incorporate any media type as an incident source, including blogs, forums, wikis and social networks.

In order for a query to be added, the user first has to select an Index, typically by clicking on an index name in a prior screen of the GUI, such as, for example, a view topics screen 900, for which to create the query, and to add that Index, by filling in an index name in text box 814 and clicking on the add index button 816 if it doesn't already exist. The Index is simply added to the database as a name for the query, the base URL, and any information that would aid users in creating effective queries. Additional information can be added optionally about the organization that operates the index, including contact and business information in the query notes text box 818.

On this screen 810, the user can Select An Index from a dropdown menu, or add an index if the desired index doesn't yet exist. After tuning the query on the native Index site, the user adds the query string URL into the database by copying and pasting or typing the query into the query text box 812. Notes about optimal use of the selected index may be included in the index notes section 820 to aid query creation. Notes about the specific query being entered into the Topic, that might help in the development of future queries, may be entered in the Query notes text box 818. For a new query, the user can save the query by clicking on the Save Query button 822. To use the query as the basis for a new query, the user can "Duplicate Query" to save it as a new query by clicking on the Duplicate Query button 824.

Once an index has been created or selected, the user can add any number of queries, defined according to one or more indexes. These queries are then run on a daily basis repeatedly to locate and collect relevant incidents. It's important to understand that queries cannot be modified, as any modification would nullify the ongoing performance metrics of the query. Instead, queries can be deleted and replaced. In one embodiment, queries may be duplicated for modification, and queries that are no longer considered effective enough to run every day, but may be desirable to run again in the future, may be archived.

Once a topic and a set of search queries has been created, users can launch the queries to search for incidents online by navigating to the Add Incident page 1010. Utilizing the Add Incident page 1010, a user can capture incidents and store pertinent information relative to the incident in the memory of the online conversations monitoring system 12. The query launches a new window or browser 1012, in one specific example utilizing an IFRAME 1014 that facilitates simultaneous Web navigation and simplified data collection.

Utilizing the new window, the user can navigate the selected index and find relevant incidents. Once the user finds an incident they want to capture, they use the capture frame 1016 to input the required data. In order to add an incident into the memory of the online conversations monitoring system 12, the incident source (website, blog, forum etc.) must already exist. The user can do a quick lookup by clicking on the lookup button 1018 on the domain to find and select the correct source, or to add the source if necessary. Once the incident source is captured, the user adds additional data, including the incident author by clicking the author add button 1020, date of original post in the first post text box 1022 and last post in the last post text box 1024, total number of comments in the # posts text box 1026, and any relevant keyword tags in the tags text box 1028. The user measures relevance not simply by keyword density (which would rate coupons and "deals" as highly relevant), but by cognitive relevance to the search query using a relevancy slider bar 1028. In one specific embodiment, the relevancy of an incident based on keyword density may be automated utilizing Natural Language Programming algorithms to search within an incident for keywords. The user can flag a particularly relevant or sensitive incident to expedite notification of the analyst assigned to the account by checking the flag urgency check box 1030. The user can add a particularly relevant outtake or quote from the incident to the record to aid in analysis by clicking the add quote button 1032. When the user has completed data entry, they click on the add incident button 1034 to save the incident into the memory of the online conversations monitoring system 12.

When an incident has been added into the memory of the online conversations monitoring system 12, it appears in the analyst's pipeline, and notification is sent to the analyst assigned to that incident's account for scoring to be completed. In one embodiment of the disclosed systems and methods, the scoring process may be manual, while in other embodiments of the certain scoring components may be automated. The scoring of an incident based on technical and analyst data, or respectively, "objective" and "subjective" metrics.

The objective metrics may include one or more of the following metrics, alone or in combination: influence; relevance; timeliness; immediacy; activity, engagement, unique visitors, page views, momentum and longevity. The influence metric may incorporate a number of external traffic and influence metrics, such as Technorati™, Google PageRank™, Alexa™, Compete™, etc. New influence metrics may be continuously added to the system and normalized into a composite score. The relevance metric may be implemented through an automated count of keyword density as judged against the initiating query. The timeliness metric may be measured by the time of the last comment or post. The immediacy metric may be measured by the number of comments or posts within a predetermined time frame, such as, for example, the preceding twelve, twenty-four or thirty-six hours. The longevity metric may be measured by the time lapse between the first post and the last.

Figure 11:
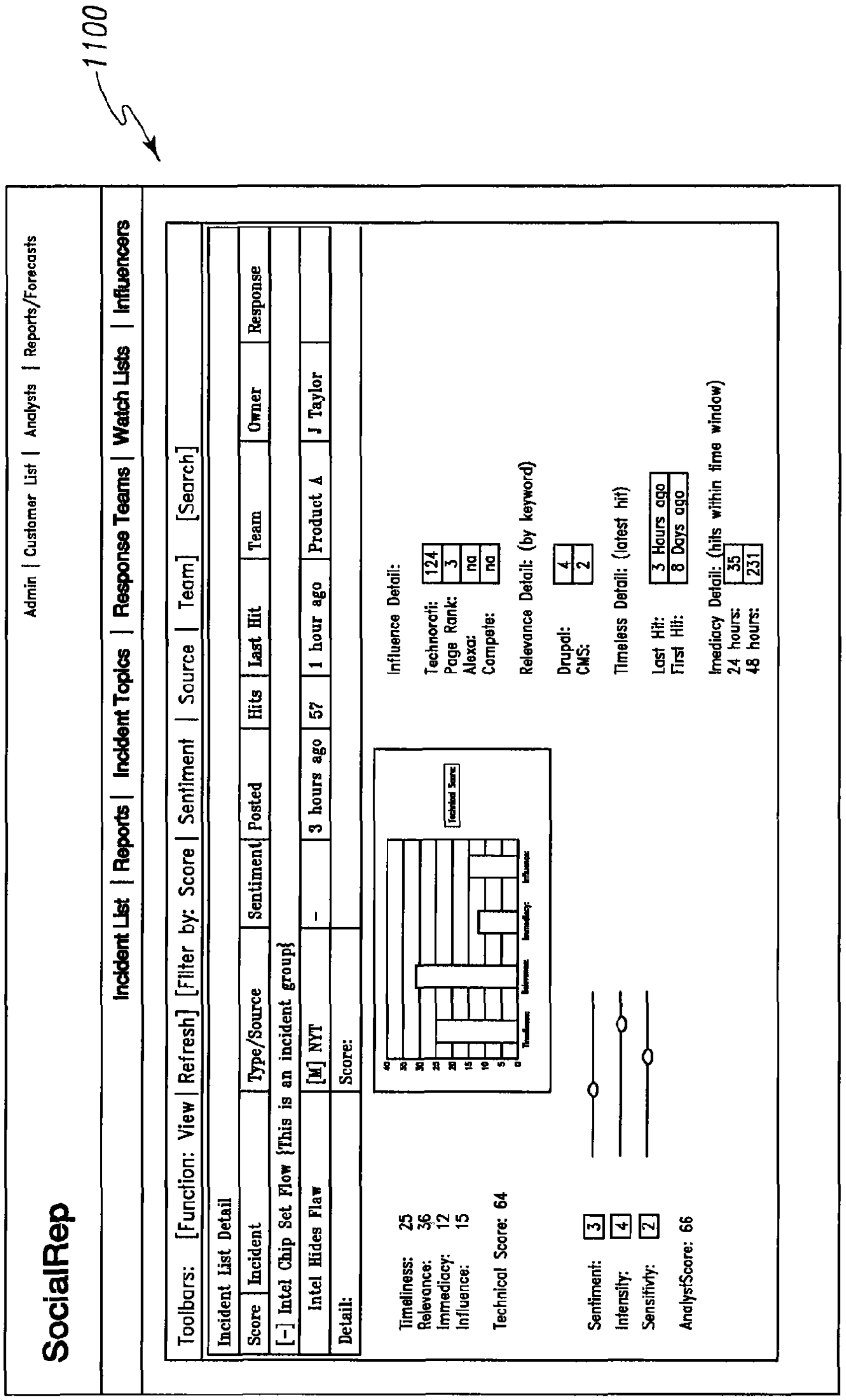
FIG. 11 is a screen shot of an incident scoring page of a graphical user interface generated by the online conversations monitoring system.

The subjective metrics may include one or more of the following metrics: sentiment; tone; mood; intensity; and sensitivity. The sentiment metric may be measured along a five point continuum from negative to positive or in the event of incidents including both sentiments may include a negative and positive slider. The intensity metric may be measured on a five point continuum from mild to intense, reflecting the level of passion in the discussion. The sensitivity metric may be measured on a five point continuum from mild to extreme, reflecting the potential to impact the perception of the customer's business, products, or brand. The tone metric may be based along a five point continuum from negative to positive, reflecting the emotional content of the discussion. The mood metric may be based along a five point continuum from negative to positive, reflecting the affective atmosphere of the discussion. In one embodiment of the disclosed systems and methods, the online conversations monitoring system 12 may generate a GUI having an incident scoring page 1100, as shown, for example, in FIG. 11 to facilitate scoring incidents. On the incident scoring page 1100, a user may add or view incident technical scores. Influence measures are attached to the SOURCE, and not the incident, so those scores are only viewed here, and may be updated. Other technical scores are added manually. Using the slider bars, the analyst provides their subjective measure of the incident's Sentiment, Intensity and Sensitivity. While only a single slider bar is shown for entering the sentiment score, it is within the scope of the disclosure for both a positive and a negative sentiment slider bar to be presented so that incidents including both positive an negative sentiment may be scored.

In one embodiment of the disclosed systems and methods, incident scoring is a complex set of processes including two different scoring methods, two different scoring objects (targets), and a long list of direct analytics and derivations.

There are two methods of scoring: programmatic and analytic. Programmatic scoring is accomplished by computer data processing, in which various technologies and strategies are used to parse content and its source. Analytic scoring requires a trained human analyst to review content and parse meaning. While programmatic parsing is very reliable for objective scoring measures—such as keyword density, incoming links, number of posts, etc.—it is much less reliable for subjective scoring measures, such as sentiment and sensitivity. There are substantial nuances in language that prevent reliable interpretation by programmatic means. For this reason, one embodiment of the disclosed systems and methods relies on a balance of programmatic and analytic scoring processes. Programmatic scoring is used as the first stage of incident processing, providing an early prioritization of incidents. Prioritized incidents are then passed along to analysts for further scoring and prioritization, ensuring that incidents have been accurately interpreted before being logged in the online conversations monitoring system for trend analysis and response.

There are two scoring objects: the incident; and the source. Source scoring looks at various measurements of the incident source domain—the web site, social network or forum where an incident occurs. These measurements are the best indicator of the potential influence an incident might have, based on available historic measurements of traffic, visitor activity, incoming links and associated trends. The scoring of the incident source is largely programmatic, drawing from existing web analytics data sources, can be rapidly calculated, and comprises the primary step in prioritizing incidents.

Incident Scoring looks at various specific measurements of incident content, in order to understand its relevance and meaning to the customer, including the importance of the content relative to the defined topic, the intensity of the dialog and its sentiment, and how the conversation is trending. Some of the incident scoring measurements are programmatic—including measurements of time and activity—but the most critical measurements are analytic, helping to parse the subjective meaning and sensitivity of the incident.

From all of the scores that are gathered, a set of composite scores and analytics are gathered that are used to prioritize incidents for timely response, and to track relevant trends over time.

In one embodiment of the disclosed systems and methods, every incident in the system receives a Composite Score comprising a number of subsidiary scores. The Composite Score provides a simplified way for users to immediately understand the significance of an incident in the pipeline, without having to dive into the details of the subsidiary scores, although those scores are available for review at any time.

The composite score is comprised of two major categories of scoring. The first category is Source Scoring which audits the venue in which the incident takes place, typically but not always focusing on the source domain. Source Scoring provides a strong indication of an incident's potential exposure and influence. Its measures are largely objective, meaning they are suitable for programmatic audits, and because they are tied to a persistent presence (i.e.: a domain rather than a transient incident), they can be stored and updated periodically, rather than newly scored for each and every incident. This provides a rapid measure for initial scoring and pipeline prioritization.

The second category is Incident Scoring which audits the actual incident itself, measuring the relevance and sensitivity of the incident to the customer's business operations and objectives. Incident Scoring is often an analytic activity, thus, in one embodiment of the disclosed systems and methods, trained analysts perform incident scoring. However, it is within the scope of the disclosure for incident scoring to be implemented, at least in part, utilizing progressive Natural Language Processing or some other programmatic process.

Beyond the composite score, one embodiment of the disclosed systems and methods includes a number of additional Score Amplifiers, which add weight to the composite score and trigger specific flags and alerts. The score amplifiers include a few programmatic scores, such as the number of posts in an incident thread, but also include a number of analytic scores that may require human involvement. It is within the scope of the disclosure for some of these analytic scores, including sentiment and relevance, to be aided by Natural Language Processing to pre-screen and prioritize incidents for analyst intervention, but actual meaning and impact on the customer's reputation and business objectives may not be relegated to programmatic scoring.

In one embodiment of the disclosed systems and methods, the Source Scores are comprised of three measures, which are gathered and stored with each source, and periodically updated. Such updating may occur on a weekly, monthly, quarterly, yearly or other basis within the scope of the disclosure. These measures largely align with publicly available domain-based metrics, including those available from major web analytics vendors, including reach, influence and engagement. Reach is a measure of the total potential audience for an incident, typically represented as a monthly measure in Web analytics under the label "unique visitors" or simply "uniques". Influence is a measure of the relative influence an incident source is likely to carry with its visitors. This is a composite of "Backlinks"—the links to a web site discovered by querying major search engines—along with various rankings such as Google PageRank™ and Technorati™ Authority rank for blogs, and Del.icio.us bookmarks. Engagement is a composite measure of direct participation with an incident source, typically represented as monthly measures in Web analytics under the label "average stay" and "average page views per visit".

Some vendors have alternate measures, such as Compete™'s visitor Attention and Velocity measures. These measures represent a particular site's average stay and page views metrics against the total averages of all Web sites in Compete™'s panel, and the changes in that measure day-to-day. It is within the scope of the disclosure for such proprietary measures or alternative measures to be included in Source Scoring.

For some source types, such as social networks, forums, virtual worlds and dark nets, domain based scores are not relevant. The vast traffic of a domain like Facebook™, for example, has no bearing on the relative reach, influence or engagement of any individual group that exists within Facebook™. In these cases, a senior analyst must document Alternate Scores based on any available metrics within the source, in one embodiment of the disclosed systems and methods. Using Facebook™ as an example, an alternate Reach score can be calculated by the relative size of a group in which a conversation takes place. Similar alternate scores can be created for influence and activity within the scope of the disclosure.

One challenge with aggregating individual scores is ascribing a relative weight to each score, determining the combinatory value of the scores, and determining the aggregate value of the resulting Source Score as part of the overall Composite score. Each individual score has no direct correlation or predictive value to the others; any one score may be high, while the others are low. Additionally, one very high score should trigger prioritization for review, even while the other scores are low. For this reason, a simple division of Composite Value for each score is not useful. If, for example, Reach is only 33% of the Source Score, a very high Reach value alone could never trigger review if the other scores are low. Instead, in one embodiment of the disclosed systems and methods another scheme is utilized for calculating the Source Score.

In one specific embodiment of the disclosed systems and methods, the first step in calculating the source score is converting external metrics into a normalized value. This conversion calculator functions similarly to the Dow Jones Industrial average, in which external metrics can be combined, with periodic additions or replacements, but always result in a final score that has an equivalent scale to all previous scores.

In one embodiment, all external scores are normalized to a 100 point scale, with 100 at the top of the scale. Reach, Influence and Engagement will each be scored individually from external sources and converted to the 100 point scale. The result will be three component scores from 1 to 100, for example: R=72; I=34; and E=21. In one embodiment these three component scores are then weighted to give the highest component score the highest weight and the lowest component score the lowest weight with each of the weighted component scores then added together to give a composite source score. By sufficiently weighting the highest score, this scheme ensures that a single high score will trip the prioritization flag for analysts, while also ensuring that a combination of upper-mid level scores across two or more items also raises the score above the measure of the primary score.

In one embodiment the highest score is weighted to ensure that the composite score is never substantially below the highest component score and the highest and middle component scores are weighted so that when the highest component score is only in the upper-middle range, if the second highest component score is also in the upper-middle range, the composite score should rise to the upper range. But if the second score is lower-middle or below, the composite score should not raise more than incrementally above the first score.

In one embodiment of the disclosed systems and methods, the Incident Score is comprised of two measures, relevance and sensitivity, that determine the relative importance of the incident. Relevance is the degree to which the incident matches the Topic. In one embodiment, the relevance metric is measured on a 5-point Likert scale. Sensitivity is the degree to which the incident may influence readers' opinions, attitudes and behaviors toward the company. In one embodiment, the sensitivity metric is measured on a 5-point Likert scale. The relevance and sensitivity scores may be determined by analysts. However, it is within the scope of the disclosure that the relevance and sensitivity scores be determined utilizing Natural Language Processing techniques that apply statistical analysis to help determine and measure relevance. Natural Language Processing techniques, such as Topic Modeling, may increase the potential to identify sensitive issues from incidents, and to apply the resulting model to discover conforming incidents.

In one embodiment of the disclosed systems and methods, calculating the incident score requires first converting the component score values, Relevance and Sensitivity, into a normalized score that can be merged, and then rolled into the total Composite Score. Relevance and sensitivity are not correlative—one can be high and the other low—but they are related in the way they impact the total Incident Score. For that reason, they are grouped in the algorithm. The presence of a high score for either measure should trigger a high score for the measure as whole.

In one embodiment of the disclosed systems and methods, Relevance and Sensitivity are measured on a 100-point scale. When scored utilizing a 5 point Likert scale each position may be give an value between 0 and one hundred each value being evenly divisible by 20 points. In one embodiment of a Relevance/Sensitivity sub-algorithm, there are two value positions, which are filled consecutively beginning with the higher of the two relevance and sensitivity values. Each position is weighted to provide a composite Relevance/Sensitivity (RS) Score. Unlike the above described Source Score algorithm, the RS Score can be lower than the highest component score. If for example, an incident has very high topical relevance, but very low sensitivity, the RS Score should be lower than the high relevance score. And vice versa.

In one embodiment of the disclosed systems and methods, the Incident Score is comprised of three measures, relevance, sensitivity and Competitiveness, that determine the relative importance of the incident. Relevance is the degree to which the incident matches the Topic. In one embodiment, the relevance metric is measured on a 5-point Likert scale. In another embodiment, the relevance metric is measured on a 100% scale. Sensitivity is the degree to which the incident may influence readers' opinions, attitudes and behaviors toward the company. In one embodiment, the sensitivity metric is measured on a 5-point Likert scale. In another embodiment, sensitivity metric is measured on a 100% scale. Competitiveness is the degree to which entity brand names, competitor brand names, or some combination thereof is present in a media incident. In one embodiment, the competitiveness metric is measured on a 5-point Likert scale. In another embodiment, the competitiveness metric is measured on a 100% scale. The relevance, sensitivity and competitiveness scores may be determined by analysts. However, it is within the scope of the disclosure that the relevance, sensitivity and competitiveness scores be determined utilizing Natural Language Processing techniques that apply statistical analysis to help determine and measure relevance, sensitivity and competitiveness. Natural Language Processing techniques, such as Topic Modeling, may increase the potential to identify sensitive issues from incidents, and to apply the resulting model to discover conforming incidents.

In one embodiment of the disclosed systems and methods, calculating the incident score requires first converting the component score values, Relevance, Sensitivity and Competitiveness, into a normalized score that can be merged, and then rolled into the total Composite Score. Relevance, sensitivity and competitiveness are not correlative—one can be high and others low—but they are related in the way they impact the total Incident Score. For that reason, they are grouped in the algorithm. The presence of a high score for one measure should trigger a high score for the measure as whole.

In one embodiment of the disclosed systems and methods, Relevance, Sensitivity and competitiveness are measured on a 100-point scale. When scored utilizing a 5 point Likert scale each position may be give an value between 0 and one hundred each value being evenly divisible by 20 points. In one embodiment of a Relevance/Sensitivity/Competitiveness sub-algorithm, there are three value positions, which are filled consecutively beginning with the higher of the three relevance, sensitivity and competitiveness values. Each position is weighted to provide a composite Relevance/Sensitivity/Competitiveness (RSC) Score. Unlike the above described Source Score algorithm, the RSC Score can be lower than the highest component score. If for example, an incident has very high topical relevance, but very low sensitivity and or competitiveness, the RSC Score should be lower than the high relevance score.

In one embodiment of the disclosed systems and methods, a total Composite Score is a calculated utilizing the Source composite and Incident composite scores to provide a single measure for prioritization. Taken individually, the Source Score and the Incident Scores have limited value. A Source Score is only a calculation of potential for an incident to reach a large, active audience in an influential way. But if the incident has very low relevance or sensitivity (or competitiveness when that metric is utilized in determining the incident score), that potential isn't realized. Similarly, a very highly relevant or sensitive (or competitive when the competitiveness metric is utilized in determining the incident score) incident carried on a source with very low reach, activity or influence is not as likely to reach its full potential. However, whenever a Source or an Incident score is very high, it should rise to a level of prioritized awareness so that analysts and corporate representatives can address it appropriately.

For these reasons, the Composite Score is calculated with the same methodology as the RS or RSC score. The two values are weighed, the higher score is calculated at a higher percent of its full value and added to the lower score which is calculated at a lower percent of its full value.

One embodiment of the disclosed systems and methods utilize score amplifiers to enhance composite scores or trigger flags. Score Amplifiers are comprised of two groups of measures, including Contextual Amplifiers which measure incident content, and Engagement Amplifiers, which measure incident activity. In one embodiment, the contextual amplifiers require analyst processing, while the engagement amplifiers, are programmatically processed. Amplifiers may be used to trigger incident flags and alerts as well as, or in replacement of, their role as score enhancers. For example, a threshold may be set for a certain level of Activity, and when this threshold is passed an alert is processed. The use of amplifiers as flags and alert triggers is supported by application functionality that enables amplifier configuration.

In one embodiment of the disclosed systems and methods, score amplifiers may include direct sentiment, broad sentiment, competitiveness and authority scores. In another embodiment of the disclosed systems and methods, wherein competitiveness is a component of the incident score, competitiveness is not utilized as a score amplifier. The score amplifiers do not contribute directly to the composite score, but amplify the score and trigger alerts based on content meaning and implication. These score amplifiers may also be key components for filtering and trend analysis.

Direct Sentiment is the degree to which an incident is deemed supporting or detracting for the customer specifically. In one embodiment, this is an analyst applied metric, however, it is within the scope of the disclosure to apply NLP techniques to pre-screen direct sentiment, but it may not be relied on to definitively determine direct sentiment. Direct Sentiment, in one embodiment, is measured on two, separate, 0-3 point scales, one for supporting sentiment, one for detracting sentiment.

Broad Sentiment is the degree to which an incident is deemed supporting or detracting for the industry at large (assumed neutral, unless specifically measured by analyst). Broad Sentiment, in one embodiment, is measured on two, separate, 0-3 point scales, one for supporting sentiment, one for detracting sentiment.

Competitiveness is the degree to which competitors are directly referenced or compared in an incident. Competitiveness, in one embodiment is measured on a simple 5-point scale, with one pole meaning discussion focuses on a competitor, and the other meaning discussion focuses on the client. In one embodiment, Competitiveness is determined by analysts, however, it is within the scope of the disclosure for Natural Language Processing techniques to programmatically apply statistical analysis to help determine and measure competitiveness.

Authority is the relative influence taken either from an author or from an incident's on-site rating (such as an Amazon review helpfulness rating).

In one embodiment of the disclosed systems and methods, Engagement Amplifiers may include timeliness, activity, momentum and duration. The engagement amplifiers to not contribute directly to the composite score, but amplify the score and trigger alerts based on the timeliness and intensity of engagement. These are also key components for filtering and trend analysis.

Timeliness is time elapsed between the last active posting date and the current date. This measure is important for determining whether an incident is current or not—meaning it's displayed in the current pipeline. Activity is the number of posts made to an incident. Momentum is the number of posts made within specified windows of time, and whether that number is increasing or decreasing. Duration is the time elapsed between the last active posting date and the original posting date. This measure is important for determining the longevity of an incident. Some incidents will have low momentum, but long duration, and therefore need to be tracked especially for search engine optimization ("SEO") implications.

In one embodiment of the disclosed systems and methods, Source scores are entered by an analyst any time a new source is added to the online conversations monitoring system. The primary method for calculating influence is by comparing backlinks, or the number of links to a Website counted by a search engine. Backlinks are a common measure of a Website's influence, as they indicate that others have found the Website valuable enough to provide a link to it on their own site. For the purposes of contributing to a Source's influence score, backlinks are measured by entering the host domain URL into a series of search engines (i.e.: www.socialrep.com) using their "link" search operators. In cases of forums or social networks that are hosted as sub- or virtual-domains, the root domain is used (i.e.: forums.socialrep.com). Among the search engines, or indexes, which may be utilized by the online conversations monitoring system that include a backlinks measure are Google™, Ask™, Yahoo™ and Live™.

Additional indexes that license one of these search technologies, such as AltaVista™ or Lycos™ or other new indexes may be used within the scope of the disclosure, but each index should be properly benchmarked.

In one embodiment, each time a new source is added to the system, the Source URL is entered into each of the indexes to get a Link Score for that index. This Link Score is stored for each of the indexes for each and every incident in the system—resulting in a score for Google™, Ask™, Yahoo™ and Live™, in one embodiment. Each source is then ranked against all the other sources in the system for the same customer, and receives a ranking based on a curve for each of the index scores, which is averaged to create a total Backlink Score. In one embodiment, a variation to this process is used for calculating Blog Backlinks, which utilizes search engine indexes that are specifically tuned for blogs. These alternate engines are Technorati™, Google Blogs™, and Ask Blogs™. Additionally, social networks such as Facebook™ and Myspace™, are not suited for backlink measurements, which apply to the entire network and not the groups within the network. In one embodiment, each social network, therefore, has a separate method for calculating influence. This is determined by the analyst team, and the score can be entered manually into the Source record.

In one embodiment, the primary method for calculating both Reach and Engagement is by accessing statistics from Web analytics providers, such as Quantcast™ and Compete™, which offer basic data on more than 1 million Websites for free. Additional providers, like Hitwise™ and Comscore™ offer proprietary data and audits and may also be used within the scope of the disclosure to aid in determining Reach and Engagement scores. The statistics for Reach are typically known as "Unique Visitors" or "Uniques", while Engagement stats are interpolated from "Average Pages Viewed per Visit" and/or "Average Stay". As with Influence, Reach and Engagement raw scores are rank ordered by percentile against all other incidents for the same customer and normalized to create a score on a 100-point scale, in one embodiment.

In circumstances where independent statistics are not available, senior analysts may seek other ways to determine a reasonable score for Reach and Engagement. This may include contacting advertising brokers that represent the source in question to request statistics, or contacting the source administrators directly to request statistics. This is appropriate for sources hosting incidents of particular relevance or sensitivity, or sources that have multiple incidents in the system, but it is not strictly required for every source in the system.

For low impact sources with no available statistics, reach and engagement scores may be left empty, and an average score will be calculated across all scored sources of the same type for that customer (i.e.: any source that has had an average calculated for reach and engagement cannot be used for calculating an average). The average is derived by first calculating two sub-scores: A) By averaging reach and engagement scores individually across all scored incidents of the same type for the same customer, and B) By averaging the relationship between reach and influence, engagement and influence, and reach and engagement for all scored incidents of the same type for the same customer. The results for A and B are then averaged to create a substitute Reach and Influence score.

In cases where multiple statistics are available for one measure—for instance, where Average Pages Viewed per Visit, and Average Stay are both available for Engagement—the multiple statistics are ranked individually, and the highest score is retained for the purpose of Source Scoring. In cases where multiple statistics comprise a single measure, those measures are calculated to create a single measure. For example, while Quantcast™ has a single measure for "Uniques", their Activity measure must be calculated from the individual statistics for "Passers-by", "Regulars", and "Addicts". These are actually derivative metrics from Page Views, which Quantcast™ does not report separately. Passers-by are visitors that only visit once in 30 days. Regulars are visitors that visit at least twice in 30 days. Addicts are visitors that visit 30 times or more in 30 days. Quantcast™ reports these metrics as a total percentage of site visitors for each 30 day segment. A total Quantcast™ Engagement Score (qeScore) is calculated as follows:

$$(\%\ \text{Passers-by}\times 1)+(\%\ \text{Regulars}\times 2)+(\%\ \text{Addicts}\times 30)=qe\text{Score}.$$

It is the qeScore that is used as the Quantcast™ entry for Engagement. The rules for normalizing each analytic measure are determined and stored as a business rule individually for each analytics source. In one embodiment, the Compete™ and Quantcast™ scores, as well as any other available analytics, are each averaged individually across all sources in for a customer, and the highest score, as a percentile ranking, is retained as the final score for that source.

In addition to the rankings calculated for each customer, an industry benchmark across customers may also be calculated in order to measure the relative influence of each customer's Source base compared to the industry average. The point of this measurement is to analyze the degree to which the company is being discussed in influential sources. Without this external measurement, the company wouldn't understand how its message is carrying compared to other companies or competitors.

Figure 12:
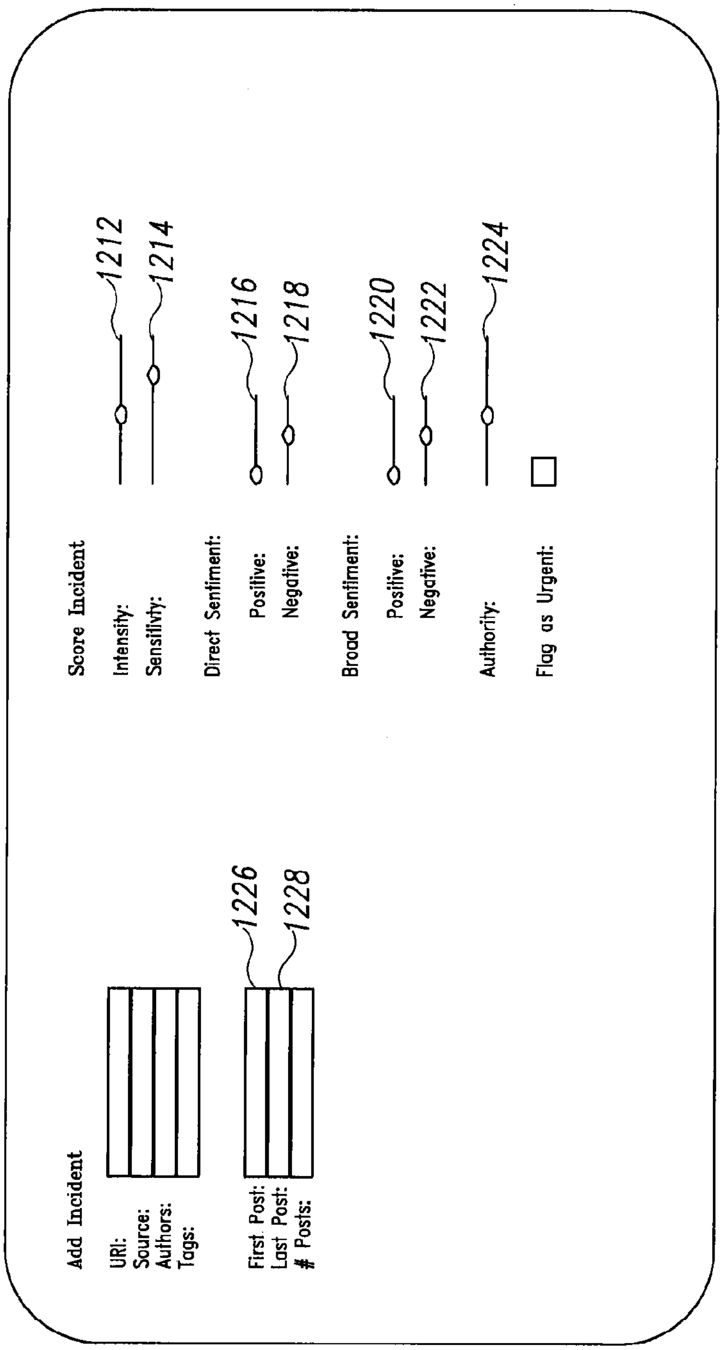
FIG. 12 is a screen shot of scoring page of a graphical user interface generated by the online conversations monitoring system.

In one embodiment, both incident measures and amplifiers are entered by a trained analyst with proper permissions to score incidents. In one embodiment such entry is accomplished utilizing a scoring GUI 1200, as shown, for example, in FIG. 12. This may be accomplished at the time an incident is originally captured, or later if the incident is captured by an agent without proper permissions. If scores are not entered at the time the incident is captured, a notification system ensures that analysts are aware the incident needs to be processed.

In some embodiments of the disclosed systems and methods, Relevance and Sensitivity (and Competitiveness where that metric is utilized in calculating an incident score) are each scored by the analyst on a five-point Likert scale. In other embodiments scoring of Relevance, Sensitivity and/or Competitiveness is automated. The illustrated scoring GUI 1200, includes a relevancy slider 1212 and a sensitivity slider 1214 to facilitate entry of the relevance and sensitivity scores, respectively utilizing the five-point Likert scale. When Competitiveness is a metric also utilized to determine an incident score, a similar competitiveness slider (not shown) may be included in scoring GUI 1200. However, it is within the scope of the disclosure for Relevance, Sensitivity and/or Competitiveness to be an automated measures conducted by Natural Language processing, which conducts a statistical analysis on individual words in the incident to measure alignment with search terms used to find the Incident (in the case of relevance), the presence of emotional words (in the case of sensitivity) or the presence of references to the entity the entity's brands, competitors and/or competitor's brands (in the case of sensitivity). In such cases an analyst could utilize the appropriate slider to modify the initial scores for these metrics where appropriate.

Score Amplifiers are used to add weight to the composite score in order to raise priority and trigger alerts. The use of amplifiers can be configured in order to support different preferences and business rules.

In one embodiment, Direct Sentiment is measured for each incident on two distinct 3-point scales. One scale measures supporting sentiment, the second scale measures detracting sentiment. Thus, the scoring GUI 1200 includes a positive direct sentiment slider 1216 and a negative direct sentiment slider 1218 to facilitate entry of the Direct Sentiment metric. In this way, both the positive and negative dialog that happens in conversation can be accounted for to avoid the false minimization of the metric by having positive and negative sentiment average out.

In one embodiment, the report of direct sentiment scoring is presented on a bar chart. First, the boundary of possible measurement looks like this:

| | | | | | |
|---|---|---|---|---|---|
| [0171] | [0172] | [0173] | [0174] | [0175] | [0176] |

To the left is the negative, or detracting sentiment, to the right, positive, or supporting sentiment.

When an analyst measures detracting and supporting sentiment on each 3-point scale, they create the domain of detracting and supporting sentiment.

| | | | | | |
|---|---|---|---|---|---|
| [0179] | [0180] | [0181] | [0182] | [0183] | [0184] |

In this case, the analyst measured detracting sentiment as 2, supporting sentiment as 3.

The program measures the domain, and then the resulting sum, and shows it to the user as relationship of sum to domain.

| | | | | | |
|---|---|---|---|---|---|
| [0187] | | | [0190] | | |

In this way, the end user can immediately tell that there's a debate going on, and it's leaning positive. If there were no debate, and the analyst only registered positive sentiment, say at a level of 2, it would look like this:

| | | | | | |
|---|---|---|---|---|---|
| [0194] | [0195] | [0196] | [0197] | [0198] | [0199] |

In one embodiment, Broad Sentiment is measured optionally for each incident on two distinct 3-point scales, in the same fashion as Direct Sentiment. Thus the scoring GUI 1200 includes a positive broad sentiment slider 1220 and a negative broad sentiment slider 1222 to facilitate entry of the broad sentiment metric. One scale measures supporting sentiment, the second scale measures detracting sentiment.

The methodology and scoring system is identical, except for the calculation of the amplifying weight. In one embodiment of the disclosed systems and methods, Broad sentiment does not amplify the composite score in its own right, but in contrast to Direct Sentiment. The greater the difference between the Broad Sentiment and Direct Sentiment scores, the higher the amplification. Simply stated, Broad Sentiment amplification is calculated as follows:

$$\text{Broad Sentiment Score} - \text{Direct Sentiment Score} = \text{Broad Sentiment Amplifier} \quad \text{i.}$$

In one embodiment, the result is recorded as a positive integer by taking the absolute value of the result of the Broad Sentiment Amplifier. The highest possible score, being 18 in one example, reflecting polar opposites between direct and broad sentiment. In a real world scenarios, this would mean a conversation has been trending highly supportive towards a specific product or brand, and high detracting towards the product category or industry, or vice versa. It is such a scenario which requires attention by a marketer.

Competitiveness is one of the simplest scores and is measured as an optional 3-point scale, where 1 is minimal discussion of competitors, and 3 is significant discussion of competitors. As an optional score, no slider is shown on the illustrated scoring page 1200, however, those skilled in the art will recognize that a competitiveness slider could easily be implemented in the score page 1200. When competitiveness is not measured, the score is zero.

Authority, like competitiveness, is measured as an optional 5-point scale and is used to capture the various types of rankings applied to an incident by readers to vote on content. In Amazon, for example, reader reviews can be ranked according to "helpfulness", while other systems may have simple "up" or "down" vote. These reader votes can be captured as an "authority" metric—meaning the relative authority of the incident within the context of its own source. Thus the scoring GUI 1200 includes an authority slider 1224 to facilitate entry of the Authority metric.

Activity is measured programmatically, or manually, as the number of posts or comments in a discussion. As an incident measure, it only has meaning relative to some recorded benchmark—100 posts on a highly trafficked retail site would have substantially different meaning than 100 posts on a light traffic engineering forum. Additionally, the benchmarks are only valid among similar types of sources—comparing blogs to blogs, forums to forums, etc. To effectively calculate an Activity measure, activity should be measured for each type of source to gain a minimum data set (30 days). Once that threshold is reached, an average activity point may be measured, along with 2 standard deviations above and below the average. These points mark out five domains of very low, low, average, high, and very high activity. These domains convert to a 5-point Likert scale whose values will be used as the score basis, in one embodiment of the disclosed systems and methods. In one embodiment, these benchmarks may be automatically calculated for each different type of source within each customer's source list (i.e.: an average activity range for blogs discussing Sony products, an average for forums, for review sites, etc.), which will be the benchmark against which activity is weighed. These benchmarks may be "borrowed" or applied as an industry benchmark across similar types of businesses when new customers are added to the system, and lack historical benchmarking data.

In one embodiment of the disclosed systems and methods, before benchmarks can be automatically calculated, Activity will be used for trend analysis of collected data, and for sorting incidents. Alternatively, a threshold value may be established for Activity which when exceeded can trigger an alert. In one embodiment, the threshold value may be set by analysts.

Momentum is a programmatically calculated score which reflects the relationship between the number of posts logged within specified windows of time. This score requires continuous updating of the incident, by means of RSS subscription or manual logging. As an incident measure, Momentum is similar to Activity in that it has little meaning without a reference point—ideally an average calculated from a body of historical data. The calculation of a Momentum score is more complex than Activity, but follows the same essential logic. In one embodiment, an average Momentum is calculated for each type of source from historical data, with 2 standard deviations above and below average demarking very low, low, average, high and very high Momentum. These domains convert to a 5-point Likert scale whose values will be used as the score basis. The actual calculation of Momentum is derived from the slope of posts over time. Since these calculations will be programmatic, the time frames can be quite fluid, rather than rigidly defined by hourly or daily increments. Like Activity, benchmarks may be "borrowed" or applied as an industry benchmark across similar types of businesses when new customers are added to the system, and lack historical benchmarking data.

In one embodiment of the disclosed systems and methods wherein benchmarks can not be automatically calculated, Momentum is used primarily for trend analysis of collected data.

Duration is a measure of nominal value for real-time incident processing, but is tremendously valuable for ongoing trend analysis, and critical for maintaining a monitor on "slow-burning" issues, especially due to their influence on SEO-driven traffic. In one embodiment, Duration is simple to calculate, it's just the time elapsed between the first post and the last active post. Thus a first post text box 1226 and a last post text box 1228 are provided on the scoring page 1200 to facilitate entry of the raw data from which Duration is calculated. Like Momentum and Activity, it is most useful as a measure when benchmarks are calculated for each source type within a customer's domain, and the process is the same. An average duration is calculated from historical values, with 2 standard deviations above and below average marking off five domains including very low, low, average, high, and very high duration. And like Activity and Momentum, benchmarks may be "borrowed" or applied as an industry benchmark across similar types of businesses when new customers are added to the system and lack historical benchmarking data.

Timeliness, strictly speaking, is not an incident measure as users would understand it. It doesn't add to the score, or function as an independent flag for incidents. Instead, Timeliness functions as an automatic priority flag by ensuring that every incident with an active post in the last 24 hours appears in the incident pipeline—either as a new incident, or as a continuing incident with new activity. Utilizing the scoring page 1200 the timeliness flag would be set if the entry in the last post text box 1228 indicates that the last post was within the previous 24 hours.

In one embodiment, in order to provide the most meaningful assessment of incident scores, Incident Activity Amplifier values (Activity, Momentum and Duration) are benchmarked both internally—against the averages of incidents already in the system for the customer—and externally—against the averages of customers in the same industry. Benchmarks are recorded at several levels to provide the most useful incident analysis.

In one embodiment, for each source stored in the memory of the online conversations monitoring system 12, an average value for each Incident Activity Amplifier is calculated, based on the values of incident data collected. In the case of the Activity measure, an average Activity benchmark directly from the source is also calculated by way of independent audit. This provides an additional valuable measure of Activity against which individual incidents can be measured.

In one embodiment, from the entire set of incident source benchmarks, a set of benchmarks for each Source Type (e.g. Forum, Blog, Social Network) is filtered and stored. This benchmark allows an additional measure of analysis across all industry categories to be provided based on the type of source where the incident occurred.

Additionally, from the entire set of incident source benchmarks, a set of benchmarks for each customer by Source Type (e.g. Forum, Blog, Social Network) is filtered and stored. These are the primary benchmarks used to provide real-time incident analysis. Whenever a new incident is logged into the system, the system can immediately weigh incident measures against the customer's own benchmarks to trigger alerts and incident flags.

In one embodiment, thirty days of incident data collection are required to enable the benchmarking system for each new customer. During this period, Sources are discovered, profiled, audited, and incidents are collected and scored. Customer benchmarks for each Source Type are calculated and stored each week to create a rolling trend line.

In addition to calculating and storing an average score for each Incident Activity Amplifier value, one embodiment of the disclosed systems and methods also scores four additional values comprising two standard deviations above and below the average score. These five scores define the ranges that determine the actual benchmarks against which all new incident scores are measured.

Any time a new incident is logged and scored, the value of each measure is weighed against the customer's relevant Source Type benchmark to determine a score value of 1 to 5. This value is used for the purpose of amplifying the Incident score and triggering flags and alerts. Beyond the real-time management of incident response processes, the incident value is also measured against industry and source benchmarks to provide additional analytical value. However, only the customer's own benchmarks are used for the purposes of score amplification and triggering alerts.

With this system, analysts and customers have access to a broad set of measures for determining the real-time implications of any new incident.

In addition to the averages and benchmarks explicitly calculated by the above disclosed algorithms, other averages and benchmarks may be made available through a performance reporting tool. Internal performance metrics will allow managers to determine the average reporting spread for analyst-recorded measures—e.g. if analysts, on average, are reporting Relevance as high. Customer-specific metrics will provide similar insights for customers—e.g., if incidents in their domain are reflecting, on average, high relevance.

Other metrics that may be utilized in embodiments of the disclosed systems and methods include Author Attitude, Technorati™ Authority and Google™'s PageRank.

Author Attitude may be measured as a 5-point Likert scale to measure the degree of support or detraction a particular author represents to the customer.

Technorati™ offers an "Authority" score for blogs. The authority score is the raw number of other blogs linking the subject blog in the past 6 months. It is not the number of links but of blogs—meaning that duplicate links from the same blog are eliminated. Currently, Technorati™'s top scoring blog has an authority rating of 24,198. The distance between current scores is described by a parabolic curve, evening out to a consistent decline in score. The Technorati™ Authority score may be normalized.

Google™'s PageRank system is a method for measuring the importance of any given Web page, and is the primary mechanism for Google™'s ordering of search results. The higher the PageRank, the higher a page will rise as a search result on Google™. PageRank is used as one small measure of the influence of a domain. It is somewhat limited in its value, as the PageRank applies to individual pages rather than the domain itself, and because it relies on inbound links, it may take time for a PageRank score to develop. But as a measure of a domain's homepage, it has some predictive value in the potential of an incident to gain an audience, especially over time, as a destination from search engine results. A PageRank, which is scored upwards on a ten point scale, can easily be normalized to a one hundred point scale by multiplying by ten.

In one embodiment of the disclosed systems and methods, the online conversations monitoring system 12 generates a GUI providing various tools for managing customer information and customizing customer configurable options. These tools may include one or more of the following, alone, or in combination: a customer list; customer detail and edit pages; and a response configuration utility. The customer list may allow executives and account directors to access multiple customer accounts. This list may also be available to customers with multiple accounts. The customer detail and edit pages may allow an authorized user to access and update customer information, including team and contact details. The response configuration utility may allow authorized users to customize a default configuration for incident response thresholds, alerts and notifications.

Figure 13:
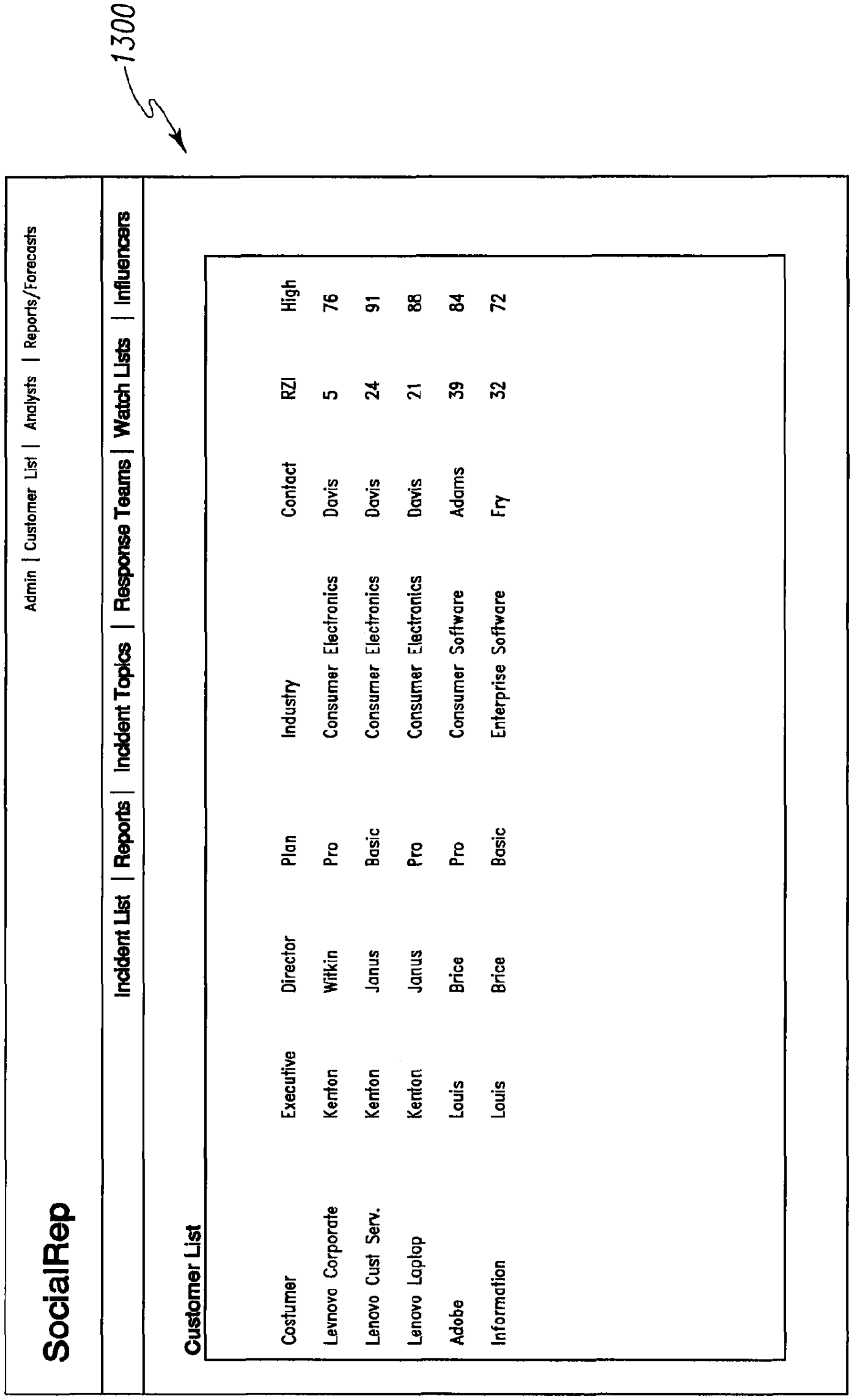
FIG. 13 is a screen shot of a customer list page of a graphical user interface generated by the online conversations monitoring system.

In one specific embodiment of the disclosed systems and methods, the customer list is a simple listing of customers in the system. The view and access to customer lists is determined by permissions. Executives can see and access all customers in the system, account directors and analysts are able to access those customers to whom they are assigned. Customers will see this page as an "Accounts" page, with a view of multiple accounts they may hold with the online conversations monitoring system. One example of a customer list page 1300 presented by a GUI is shown in FIG. 13.

The customer list page 1300 provides a high-level view that aids users in drilling down to Incident Pipelines or account details they need to access, including account managers, customer contacts, and top-level details about current incidents that may need attention. One embodiment of the customer list page may include tools for navigation to: the customer's topics, such as hyperlinked columns; the customer's pipeline; and the customer's details and response configuration pages. A user interfacing with the customer list page 1300 can see customer accounts, the account executive and director assigned to the account, the account plan, the industry category, the customer contact, the RZI Number (number of current Red Zone Incidents), and the highest score of current red zone incidents. Additionally, users can drill down to additional pages (some of which are described below) by clicking on any of these items will bring up details. For instance, clicking on the RZI number will bring up the incident pipeline, filtered for current red zone incidents.

Figure 14:
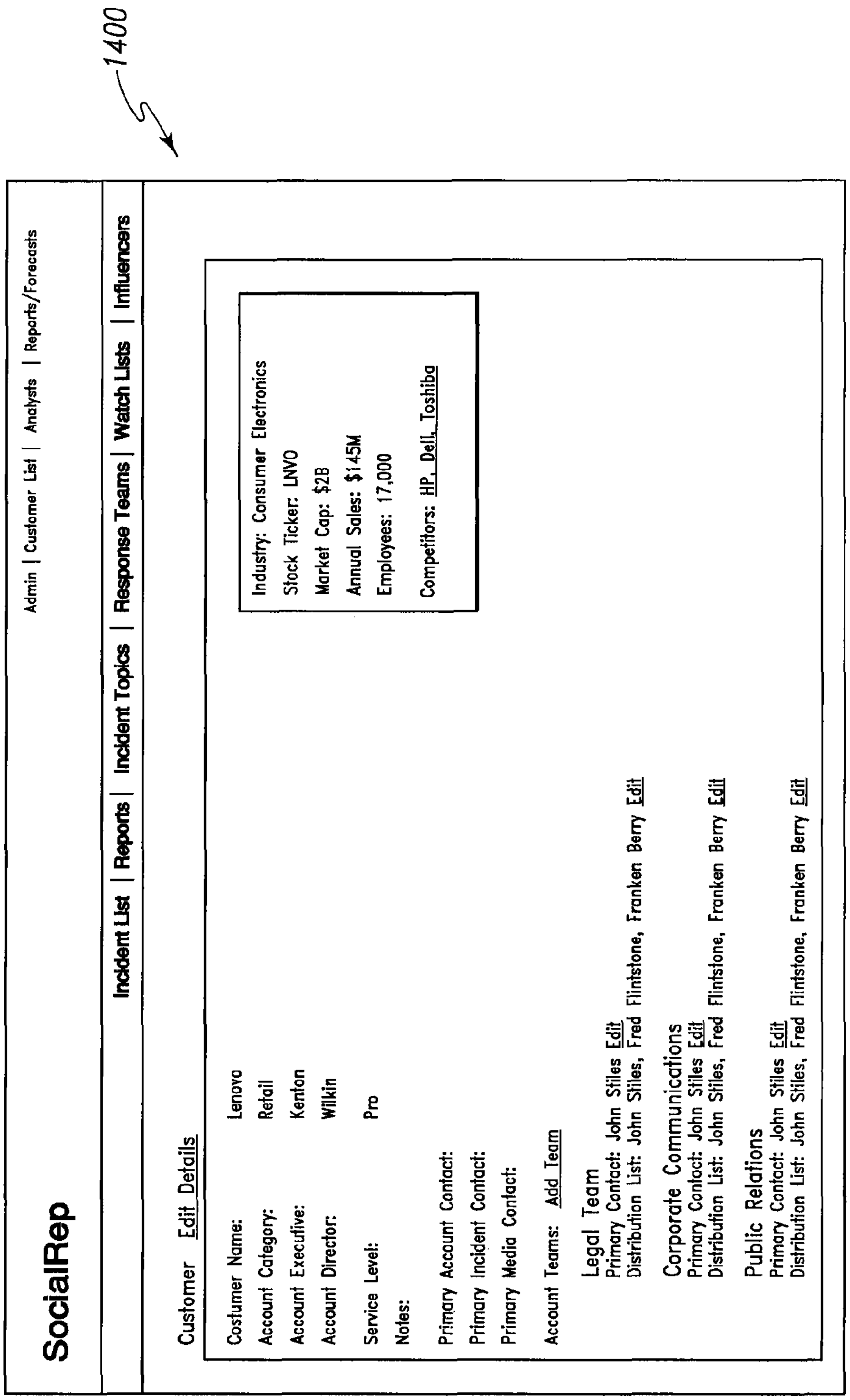
FIG. 14 is a screen shot of a customer details of a graphical user interface generated by the online conversations monitoring system.

As shown, for example, in FIG. 14, the system may generate a GUI displaying a customer details page 1400. The Customer Detail page 1400 provides a single screen from which all customer account details can be viewed and updated. Users interfacing with the customer detail page 1400 can see customer account details, including contact information and details about the customer's business that help put it in a competitive industry context. Users can also see the customer teams assigned to the account. Users with proper permissions can click on any item to edit or update the information.

Figure 15:
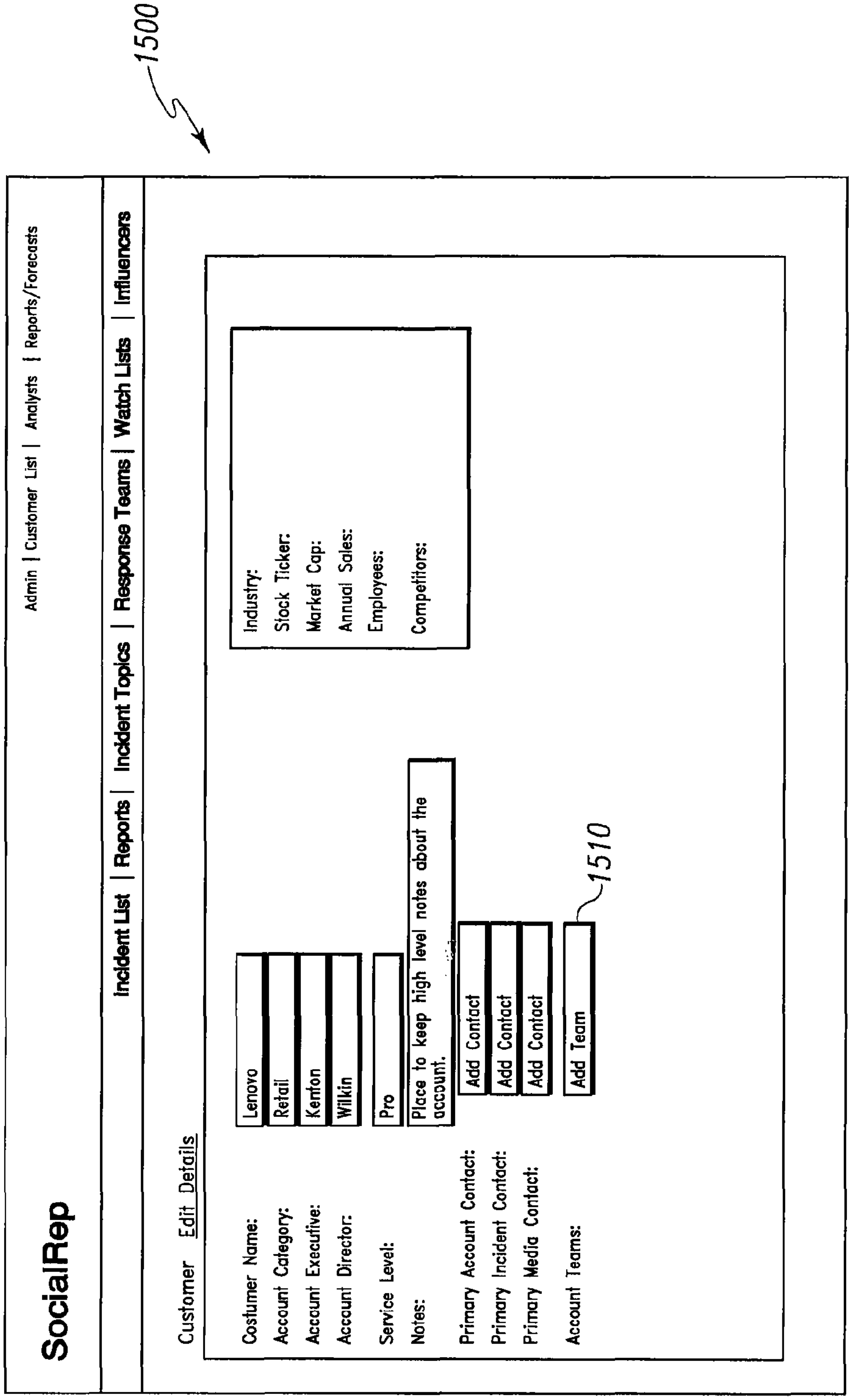
FIG. 15 is a screen shot of Add/Edit Customer page of a graphical user interface generated by the online conversations monitoring system.

As shown, for example, in FIG. 15, the Add/Edit Customer page 1500 provides a single screen where all customer information can be added. Users with proper permissions can add or edit customer account details. Users can associate contacts in the system to this account. If the contact is not in the system, it can be added from the proceeding Add Contact page. Users can associate response teams in the system to this account. If the team is not in the system, it can be added from the proceeding Add Team page 1600 which can be accessed by clicking on the Add Team button 1510.

Figure 16:
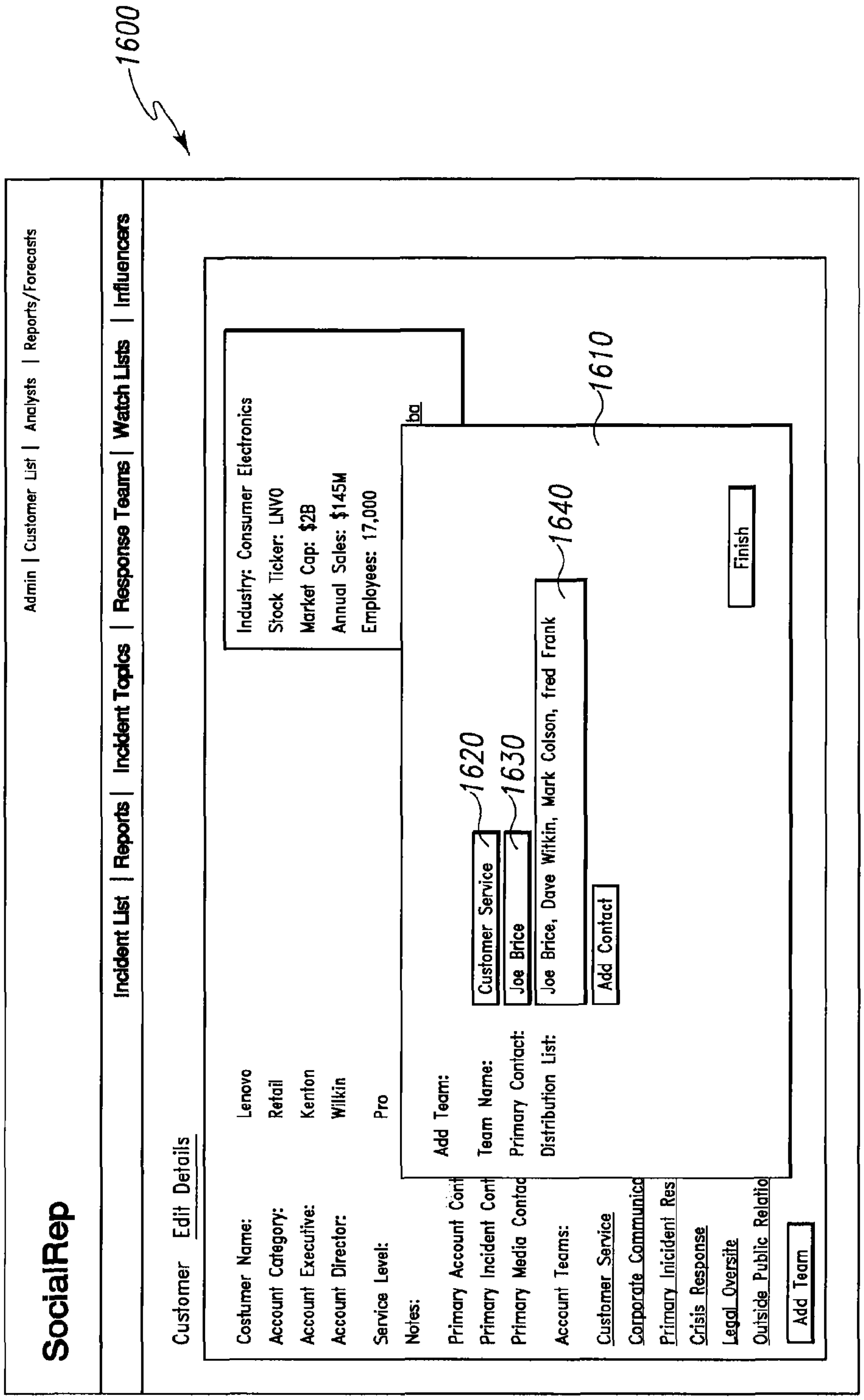
FIG. 16 is a screen shot of an Add Team page of a graphical user interface generated by the online conversations monitoring system.

As shown, for example, in FIG. 16, the Add Team page 1600, is displayed when the Add Team Button 1510 is clicked on the Add/Edit Customer page 1500. Users interfacing with the Add Team page 1600 are presented with an Add Team dialog box 1610. Users can use this dialog box 1610 to add an existing team to the account, or add a new team if it does not already exist. The team definition includes a team name which may be entered in the team name text box 1620, primary contact which may be entered in the primary contact text box 1630, and a distribution list of contacts which may be entered in the Distribution list text box 1640.

In one embodiment of the disclosed system and methods, the system 12 generates a GUI that includes a response configuration page 1700, as shown, for example, in FIG. 17. The response configuration page 1700 includes a negative sentiment pane 1710, a positive sentiment pane 1720, and a primary contact text box 1730. Each sentiment pane 1710, 1720 is further subdivided into zones, a critical, red, yellow and green zone, with each zone including a lower score text box 1750 and an upper score text box 1760, a distribution list 1770 and a teams text box 1780. A user interfacing with the response configuration page 1700 can thus enter a lower range and an upper range for each zone, the names to which alerts should be sent and the team names responsible for handling each incident that falls within each zone. In one embodiment of the disclosed systems and methods, the response configuration screen 1700 may include controls for adding teams and distribution contacts and a control for accessing a screen for customizing lists at the topic level.

As shown, for example, in FIGS. 18-24, in one embodiment of the disclosed systems and methods, the GUI generated by the system 12 includes additional pages, including, but not limited to, a source list page 1800, a source detail page 1900, an Add/Edit source page 2000, a watch list page 2100, a Watch list detail page 2200, an add/edit Watch list page 2300, and a Reports page 2400.

Figure 25A:
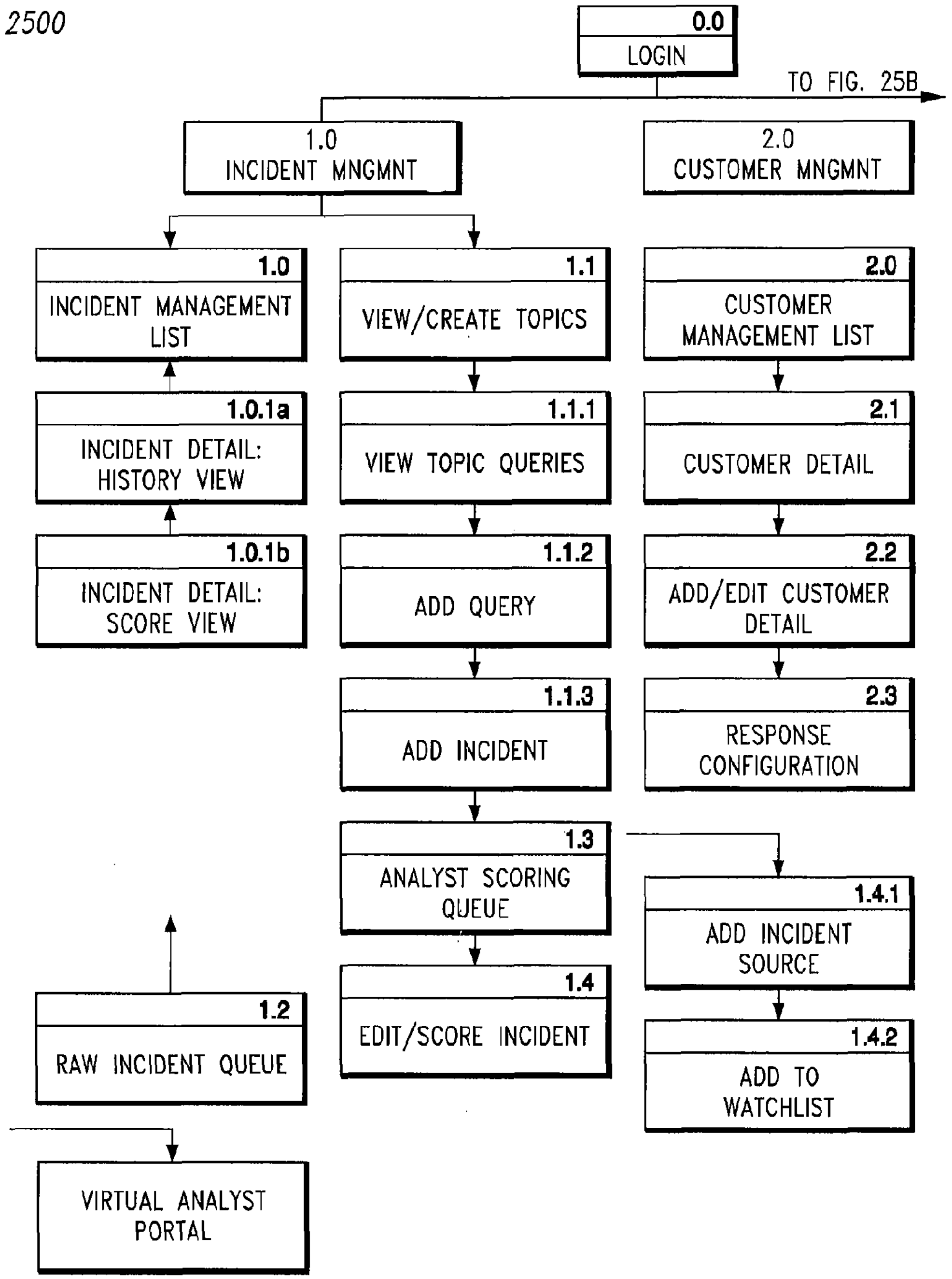
FIG. 25 is a block diagram of an application site map for one embodiment of the GUI generated by the disclosed systems and methods.
Figure 25B:
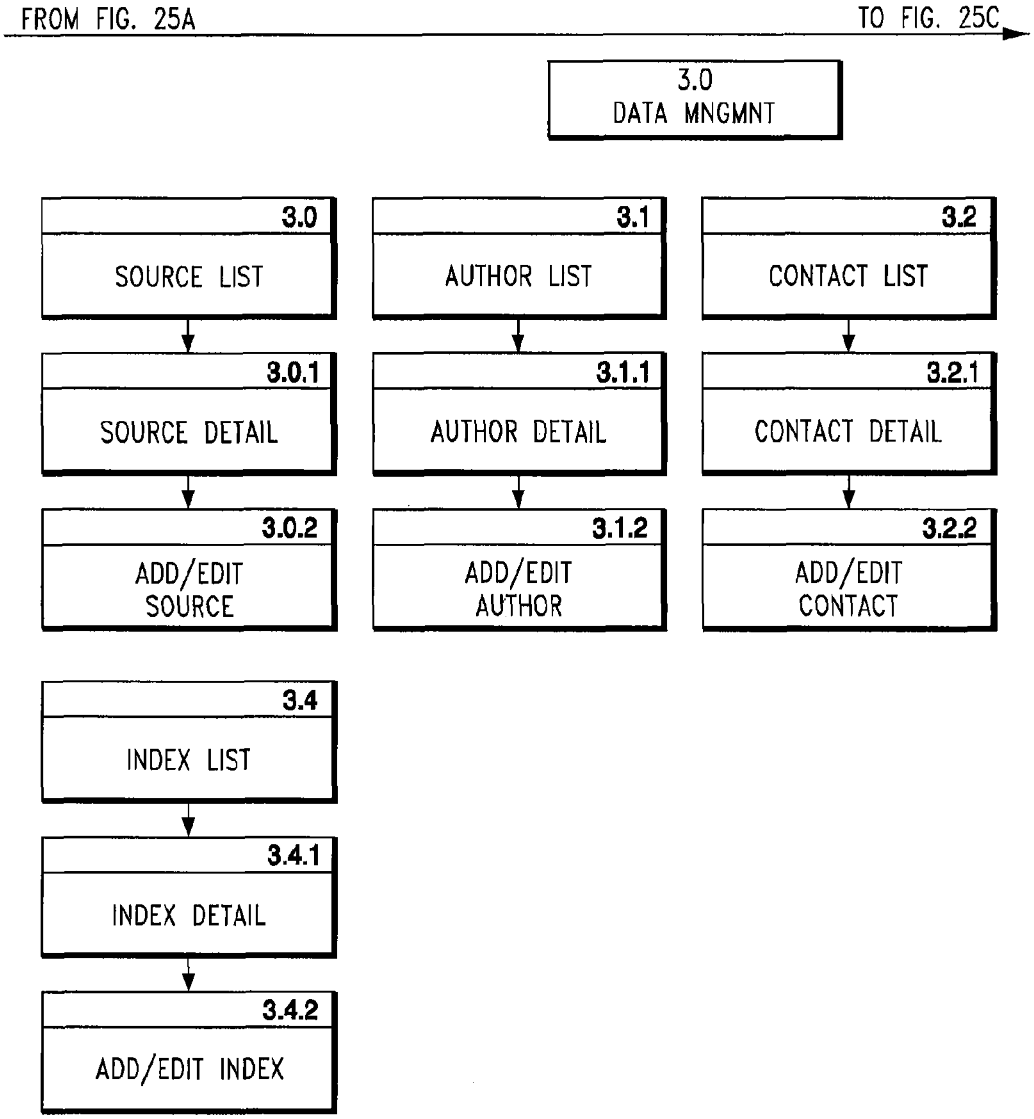
Figure 25C:
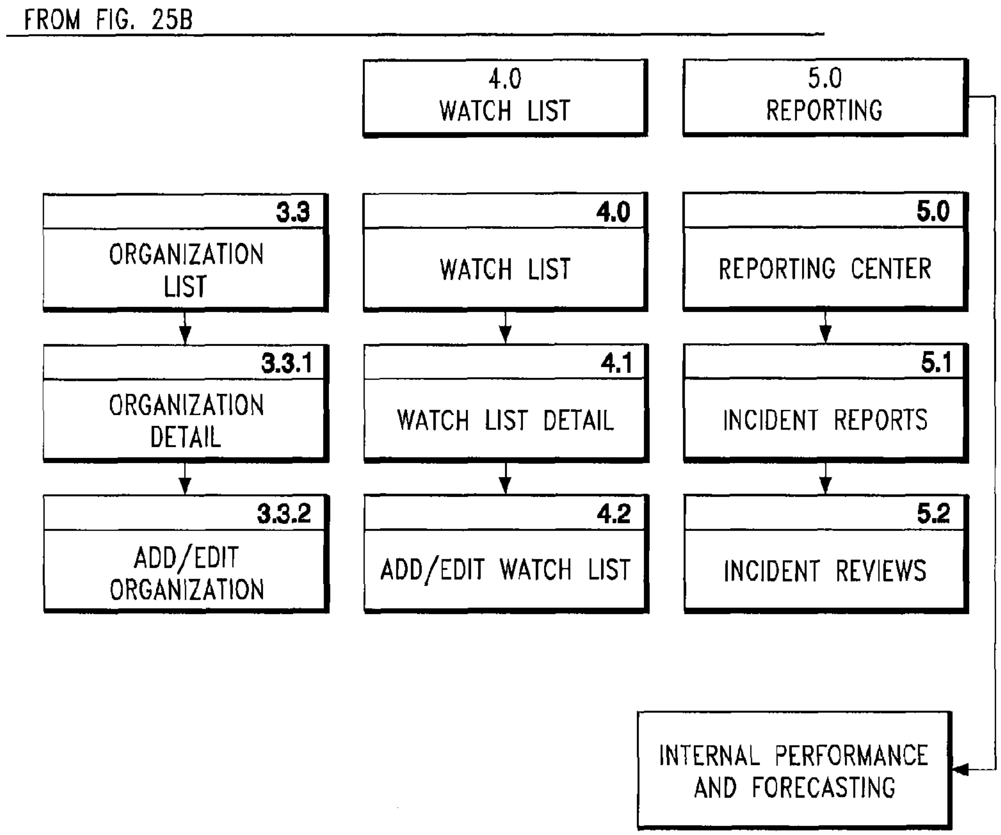
Figure 26:
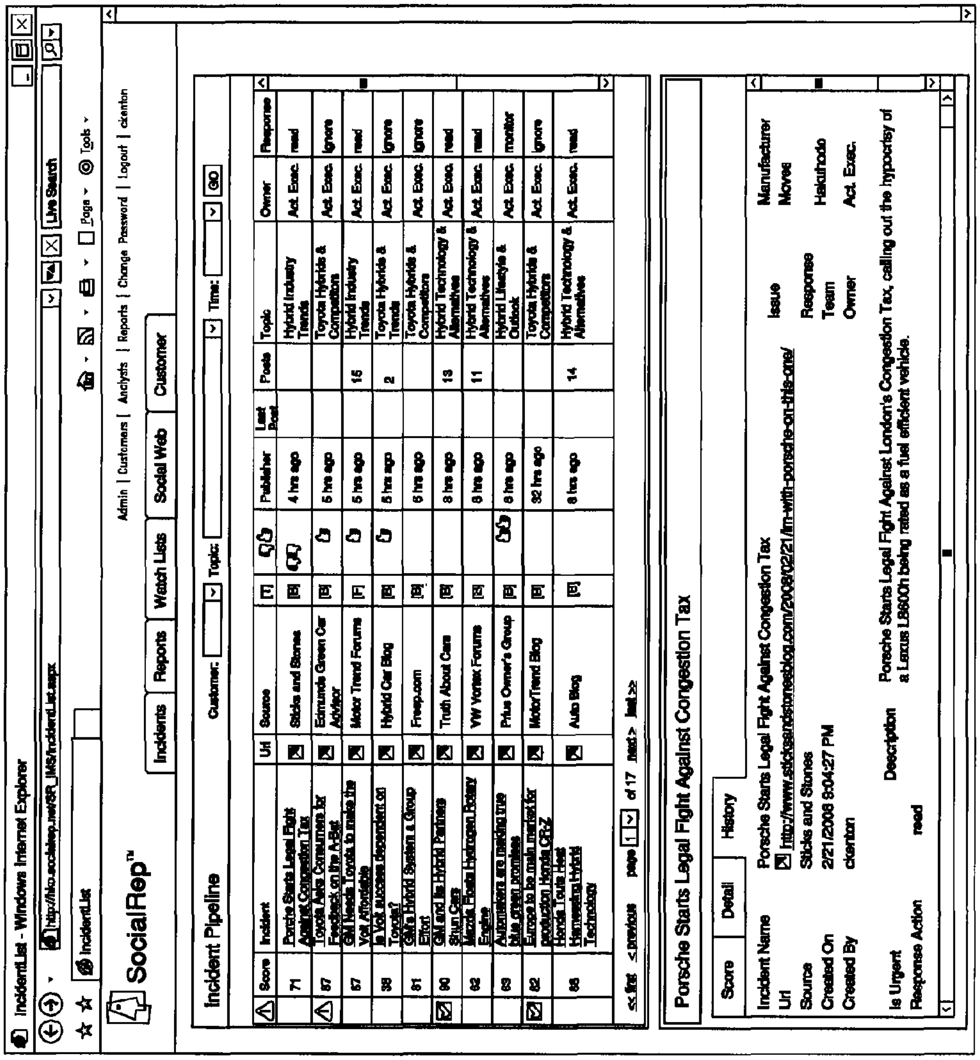
FIGS. 26-37 are screen shots of another specific embodiment of the GUI generated by the disclosed system similar to FIGS. 13-24.
Figure 27:
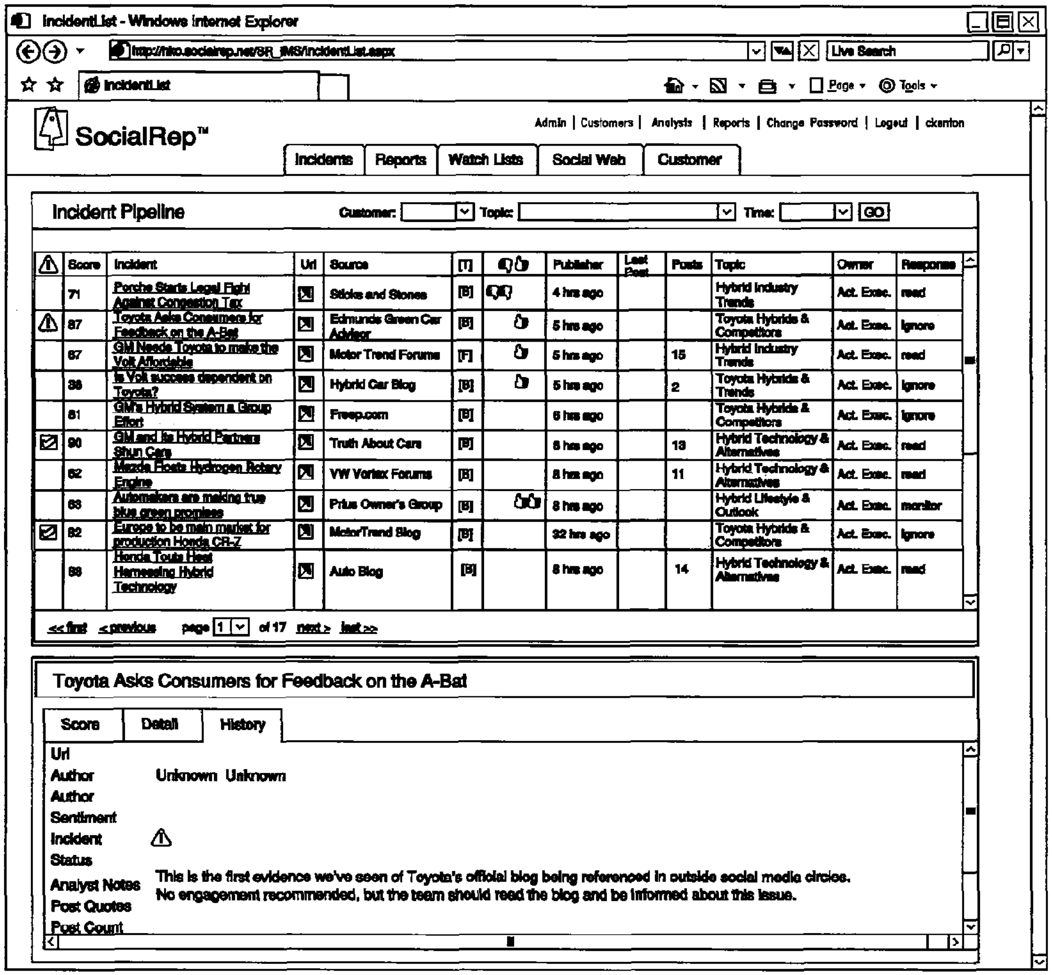
Figure 28:
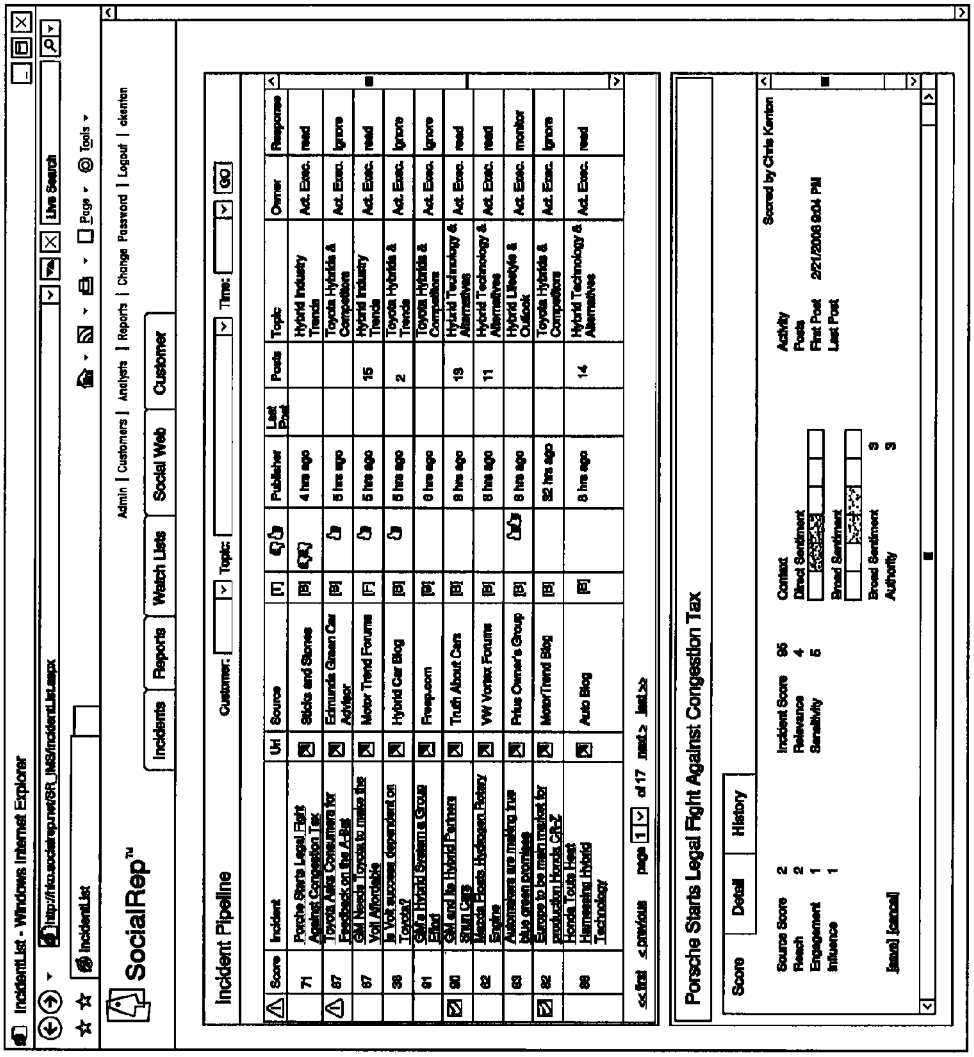
Figure 29:
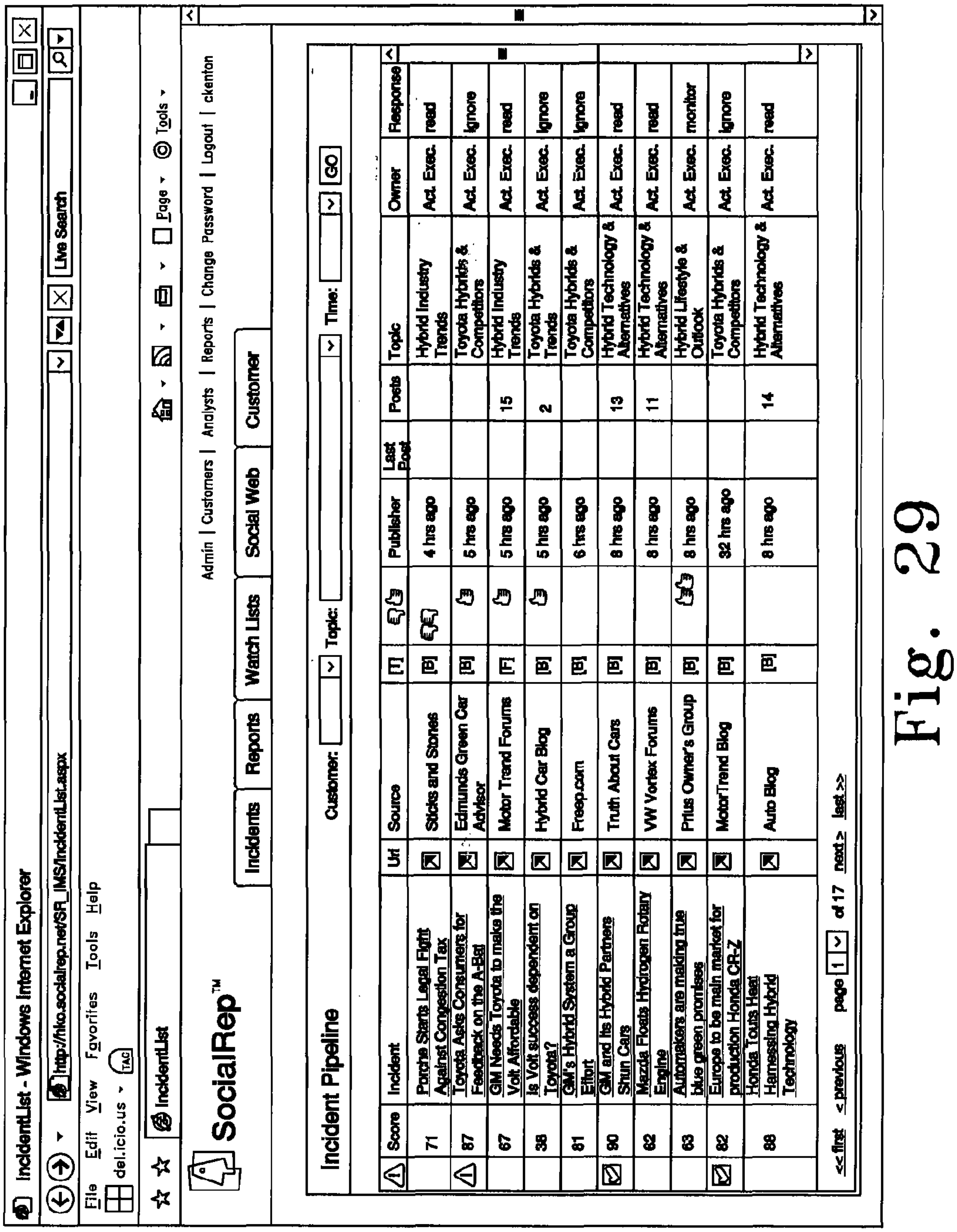
Figure 30:
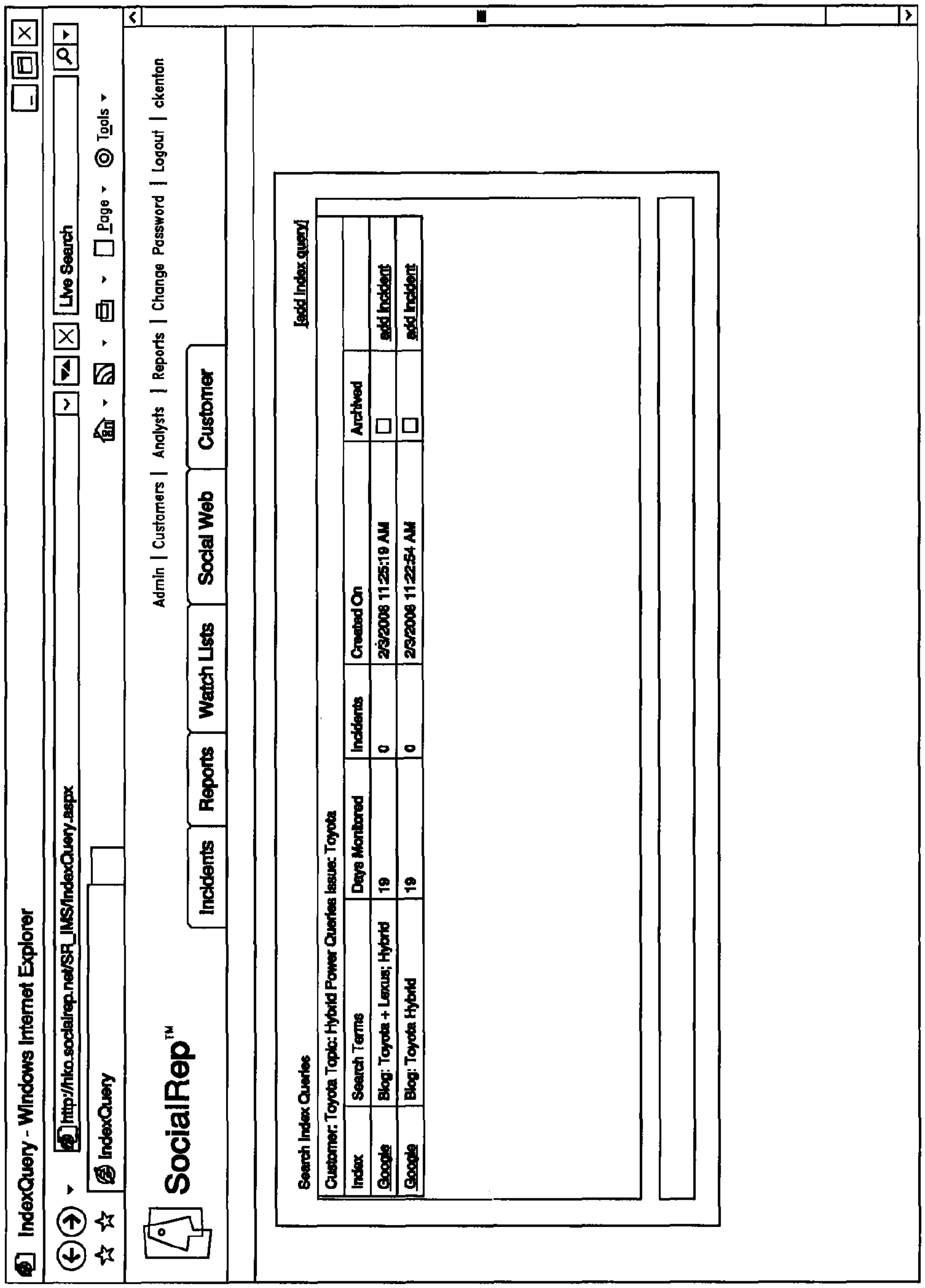
Figure 31:
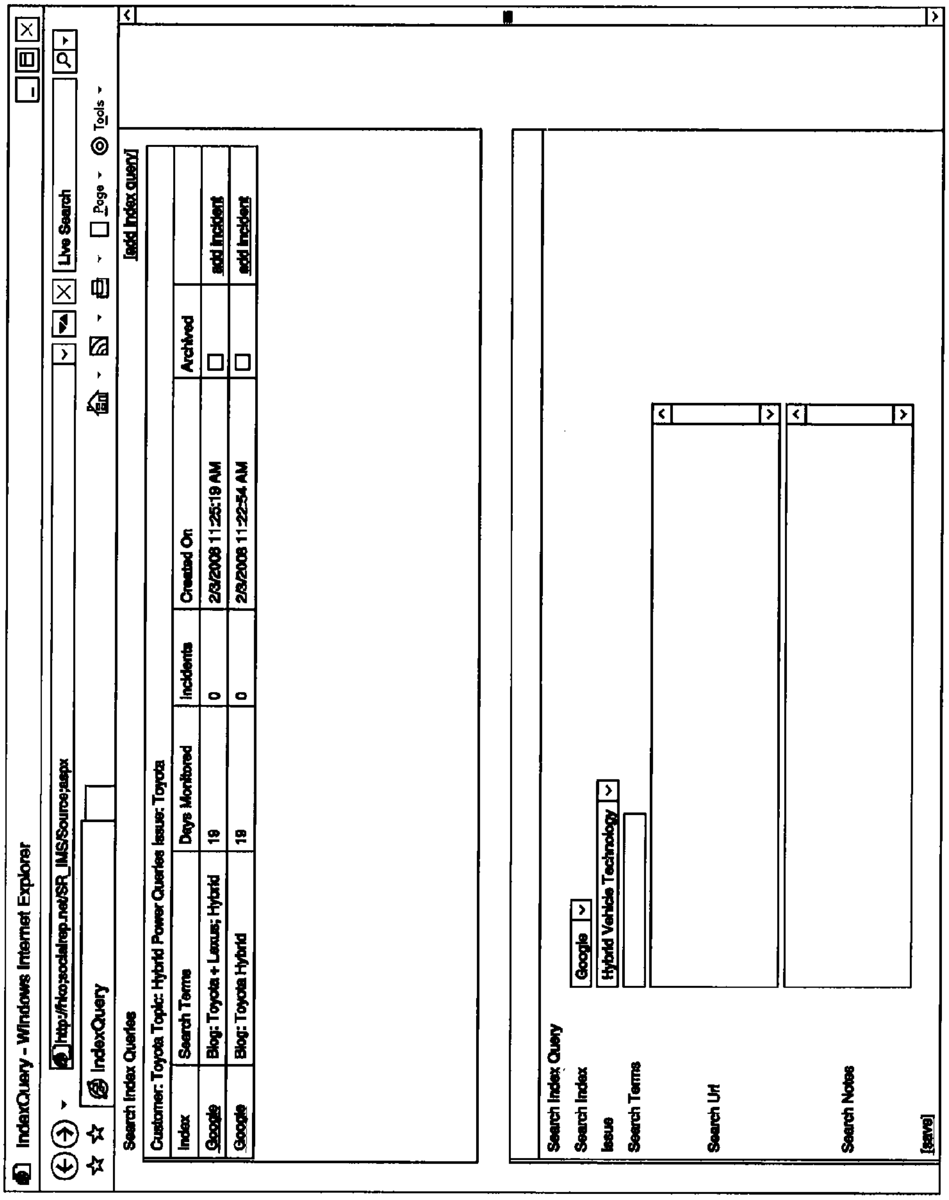
Figure 32:
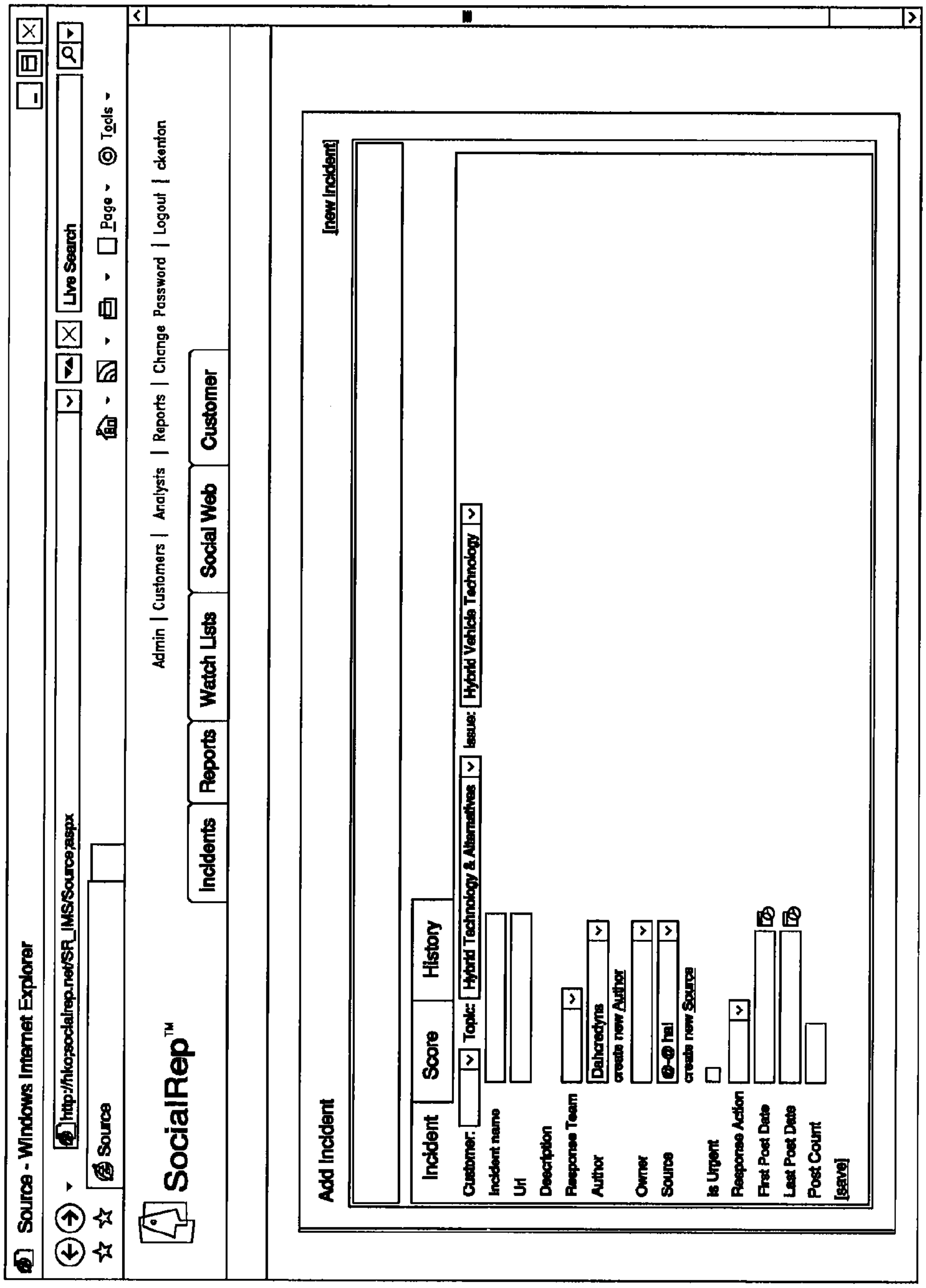
Figure 33:
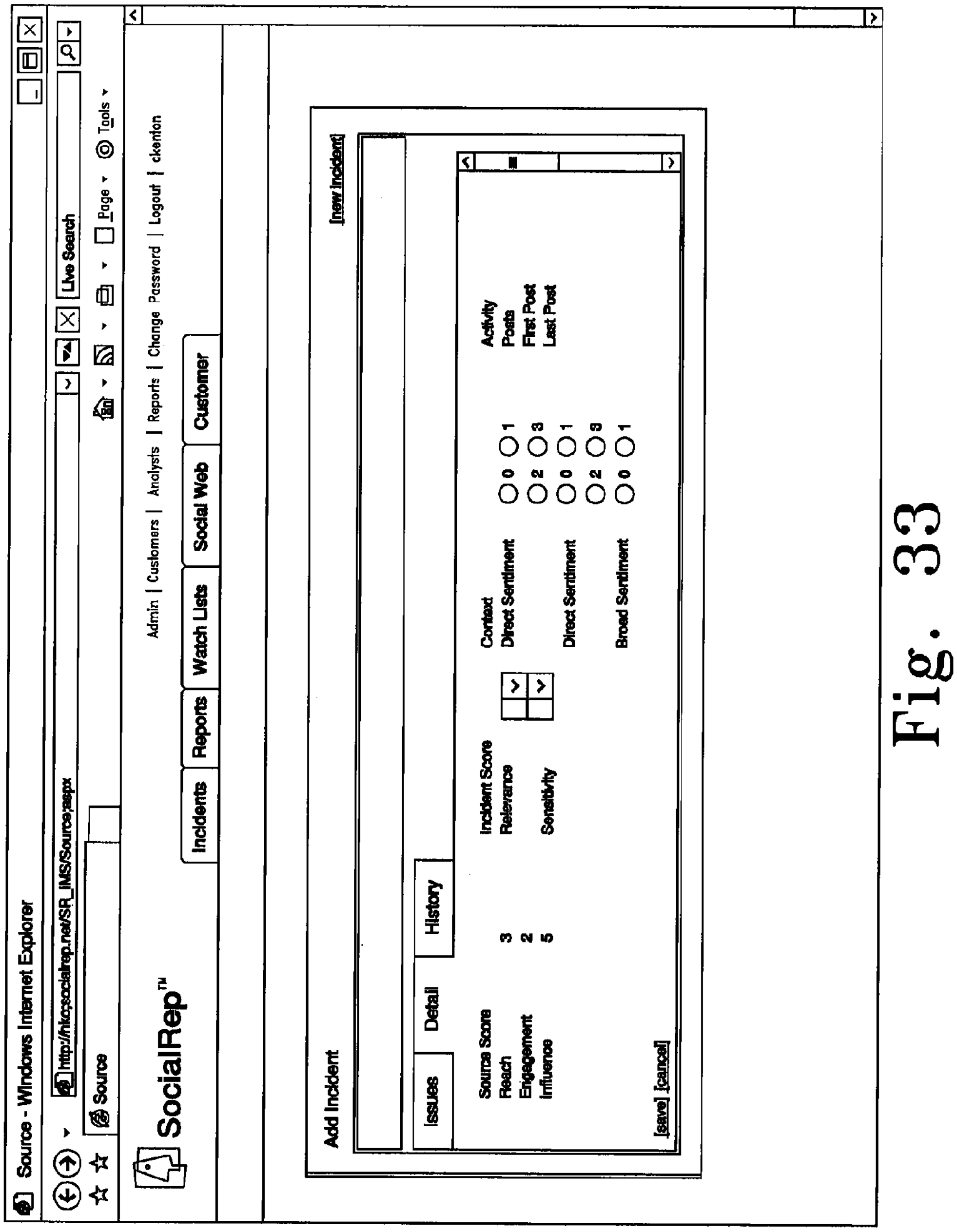
Figure 34:
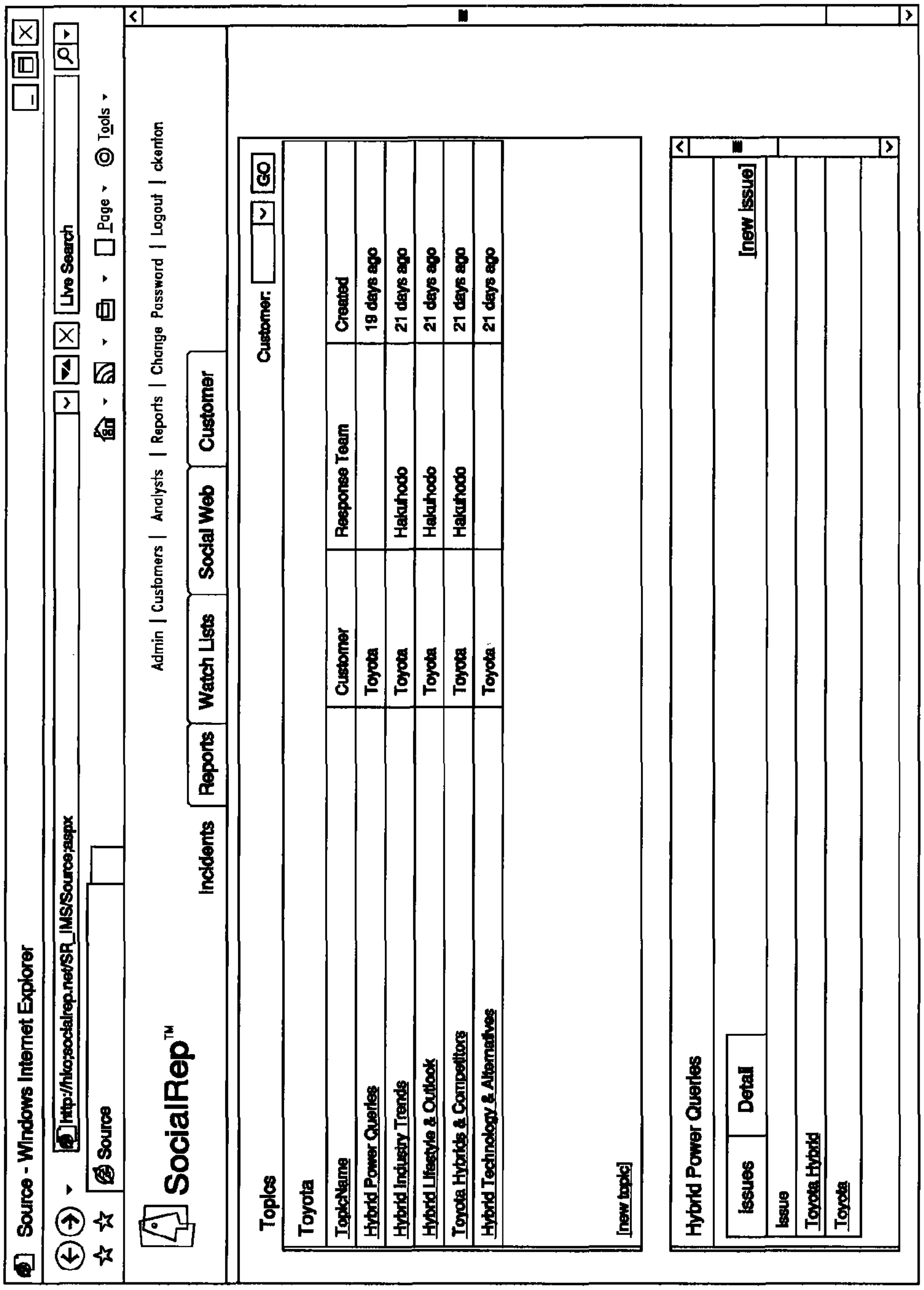
Figure 35:
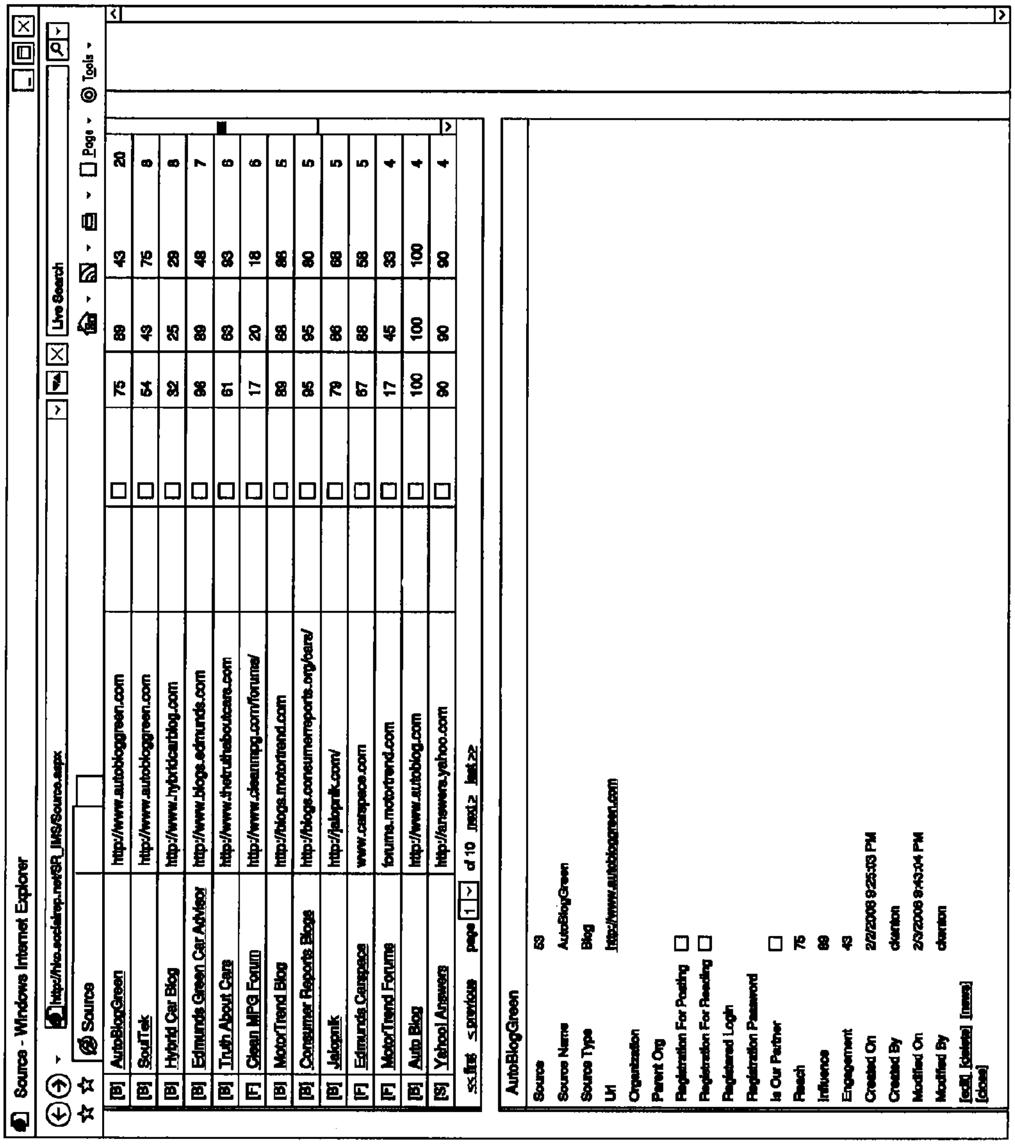
Figure 36:
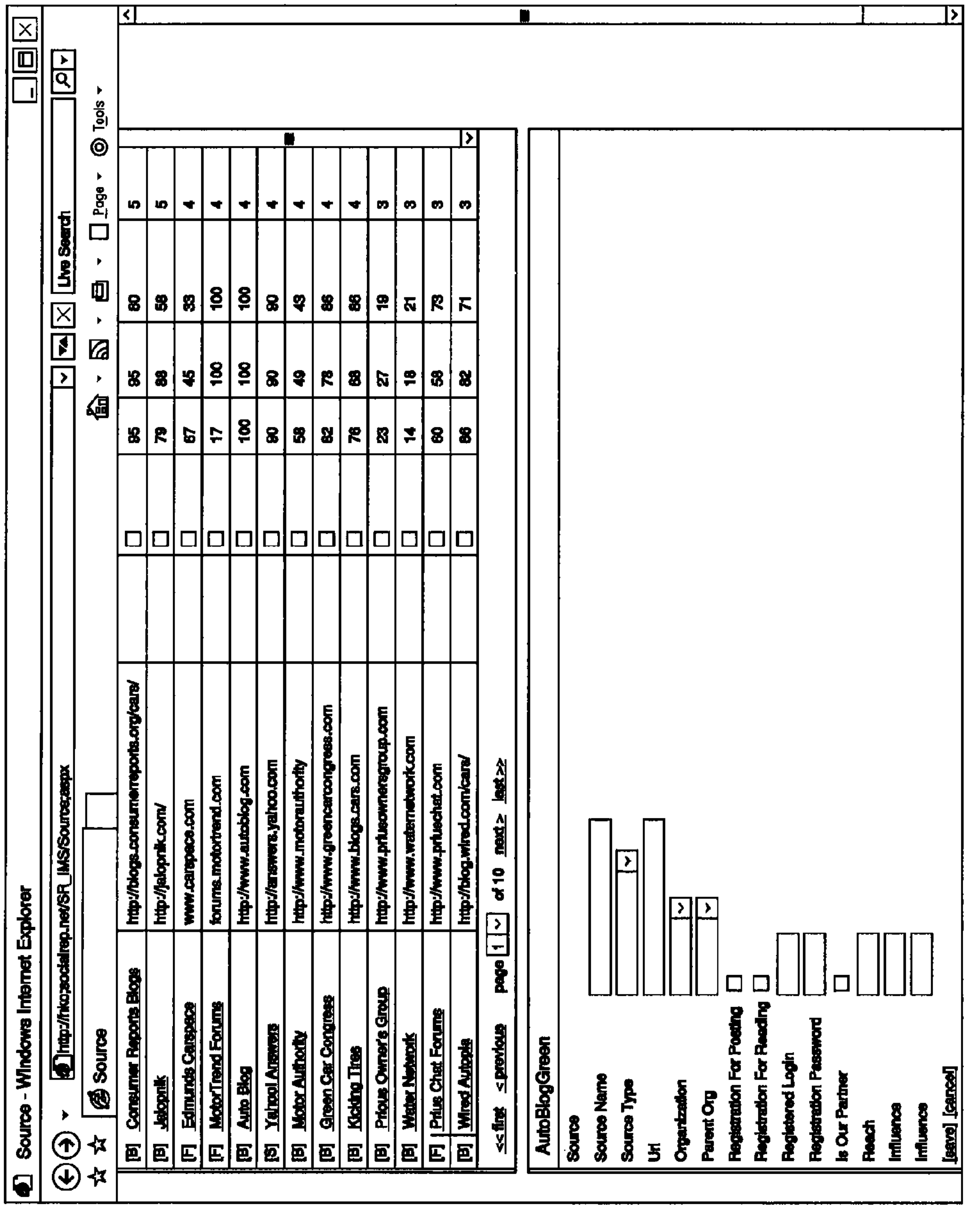
Figure 37:
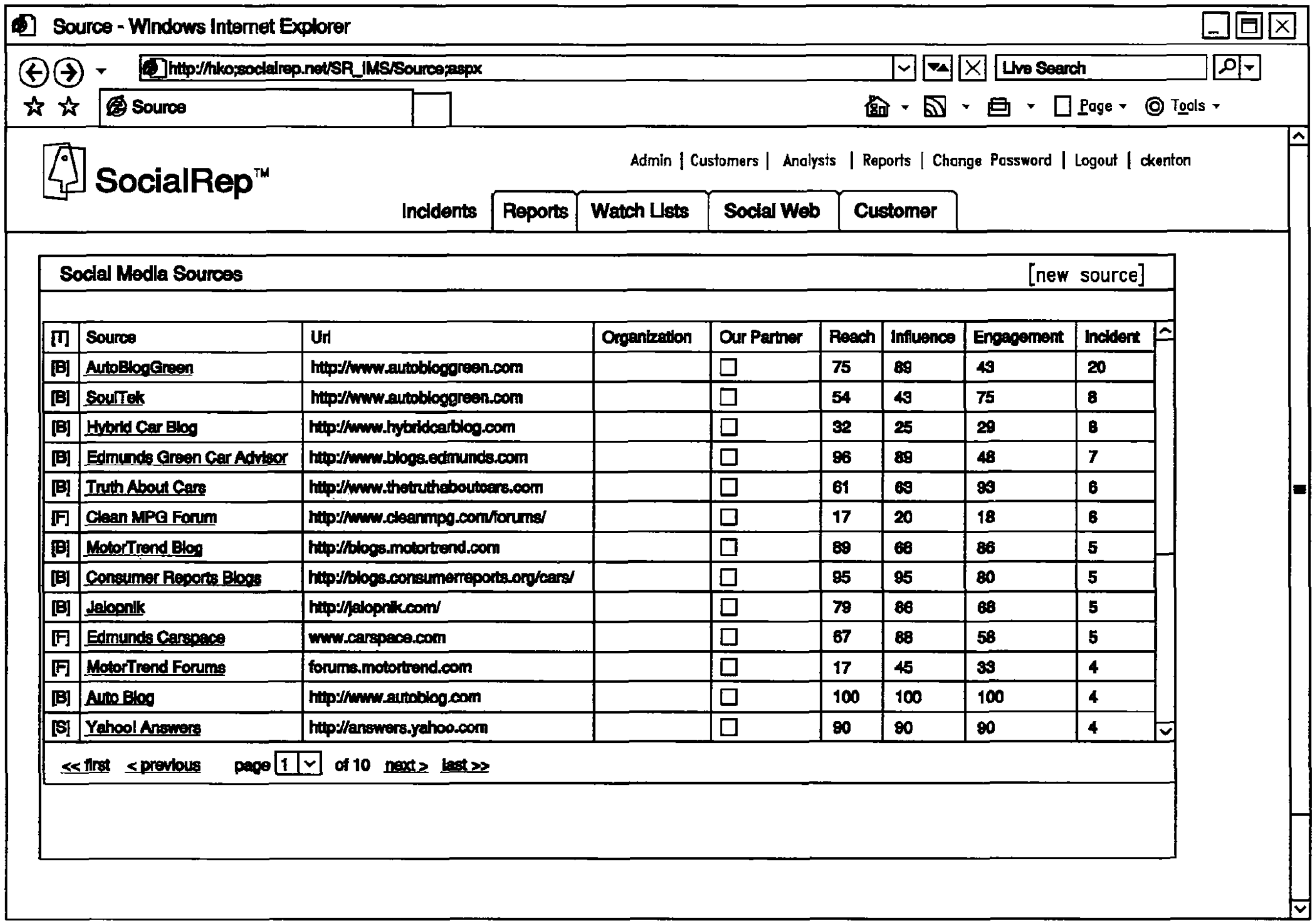

An application site map 2500 for one embodiment of the GUI generated by the disclosed systems and methods is shown in FIG. 25. It is within the scope of the disclosure for the systems and methods disclosed herein for any GUI generated by the system to exhibit a different application site map including more or fewer pages than is shown in FIG. 25.

FIGS. 26-37 are screen shots of another specific embodiment of the GUI generated by the disclosed system similar to FIGS. 13-24. The lists, buttons, tabs, icons, etc. shown therein may be active in the sense that when a user interacts therewith, a new screen, pop-up screen, window, dropdown list etc. may be presented by the GUI. Entry or designation of information on any of the screens results in such information being stored in memory by the system 12.

Figure 38:
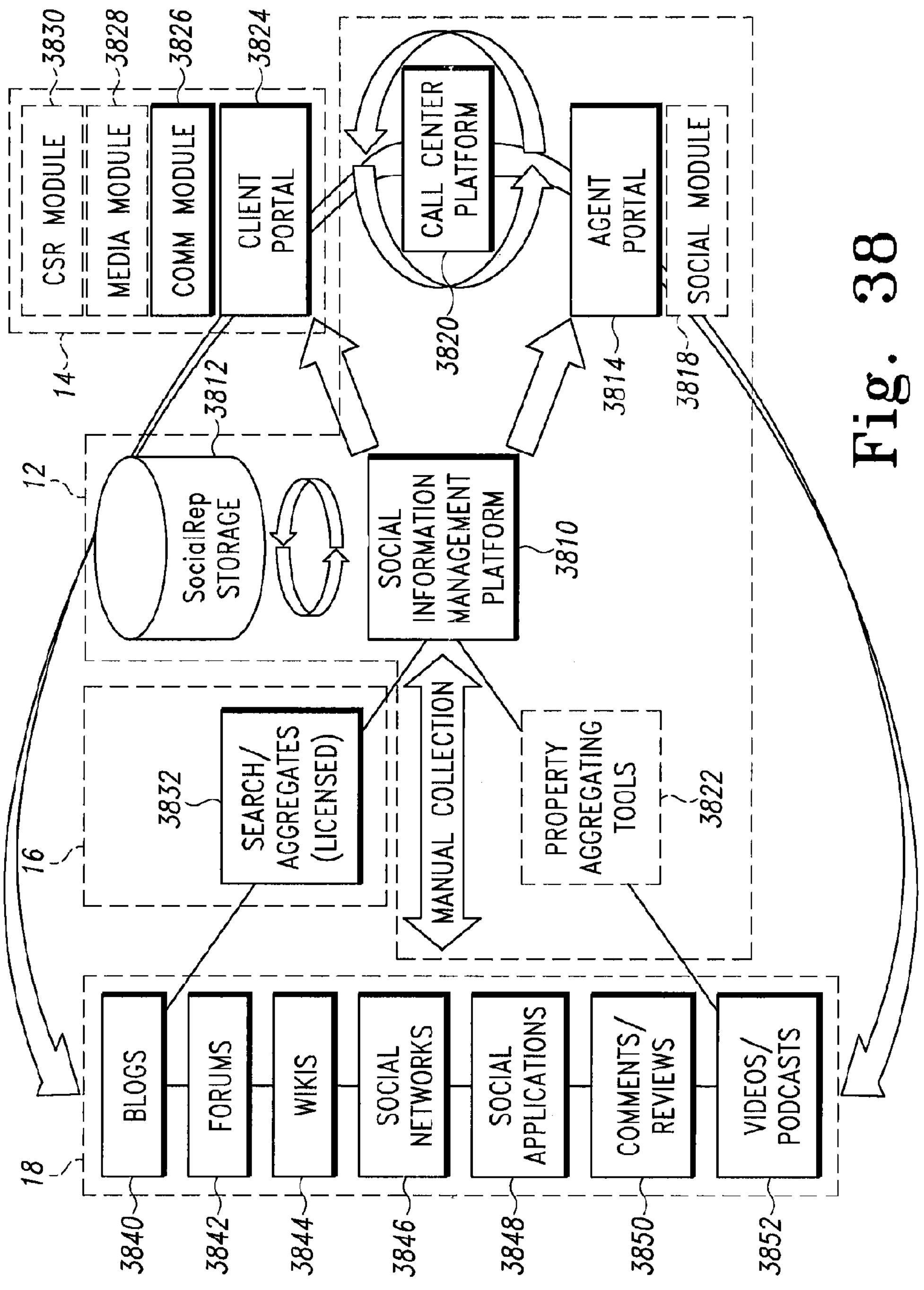
FIG. 38 is a technical diagram of one embodiment of a system for Measuring and Managing Distributed Online Conversations.

FIG. 38 is a technical diagram of one embodiment of a system for Measuring and Managing Distributed Online Conversations.

As shown, for example, in FIG. 38, a technical diagram of one implementation of a system 10 for measuring and managing distributed online conversations includes the a online conversations monitoring system 12, an entity system 14, a service provider system 16, a plurality of media source sites 18 and a network (shown as a dark triangle and various lines indicative of communication) coupling each of the systems 12, 14, 16, 18. Network 20 includes not only computer networks such as the internet and various LAN, WAN and other computer networks, but also telecommunications networks as appropriate.

The online conversations monitoring system 12 typically includes a web server illustratively implemented by the information management platform 3810 coupled to the media source sites 18 via the internet. In the illustrated embodiment, in addition to the information management platform 3810, the online conversations monitoring system includes storage 3812, an agent portal 3814, a social module 3818, a call center platform 3820 and aggregating tools 3822.

The illustrated entity system 14 is meant to be representative of multiple entity systems each of which contain similar components and software. The illustrated entity system 14 includes a client portal 3824, a communications module 3826, a media module 3828 and a CSR module 3830.

The illustrated third party system 16 includes licensed search/aggregators 3832. While the licensed search/aggregators 3832 are shown as running on a third party system, it is within the scope of the disclosure for the search/aggregators to be programs, applications, applets or other software running on the information management platform of the online conversations monitoring system 12. The search/aggregators 3832 are those types of applications developed by third parties which have been described hereinabove and similar applications currently available or hereinafter developed.

In the illustrated embodiment, the media source sites 18 include blogs 3840, forums 3842, wikis 3844, social networks, 3846, social applications 3848, comments and reviews 3850 and video pod casts 3852. Those skilled in the art will recognize that these media sources represent just a few of the types of currently existing media sources that might be monitored by the online conversations monitoring system 12 within the scope of the disclosure. It is also within the scope of the disclosure for the online conversations monitoring system to be adapted to monitor other forms of media sources that might be developed in the future.

Although the invention has been described in detail with reference to certain preferred embodiments and specific examples, variations and modifications exist within the scope and spirit of the invention as described and as defined in the following claims.

What is claimed is:

1. A system for measuring and managing distributed online conversations accessible via a network, the system comprising:

memory; and an online conversation monitoring system communicatively coupled to the network and communicatively coupled to the memory, the online conversation monitoring system being configured to:

create and manage search topics and queries;

search sites on the network utilizing the search topics and queries to identify relevant online conversations related to an entity;

capture relevant online conversations related to the entity;

store in the memory each captured relevant online conversation as a discrete incident associated with the entity to which it is relevant;

score each discrete incident according to a set of metrics;

prioritize each scored incident, wherein each scored incident is prioritized based at least in part on the score of each discrete incident and a score generated for the source on which each incident is discovered; and present a prioritized list of scored incidents to the entity to which relevant online conversation relates.

2. The system of claim 1 wherein the online conversation monitoring system is configured to identify each source on which each relevant online conversation is discovered and store an indicator of the source in the memory linked to the online conversation discovered thereon and the entity to which the online conversation is relevant.

3. The system of claim 1 wherein queries utilize keywords and the online conversation monitoring system is configured to use natural language programming to generate an automated count of keyword density as judged against the queries for each captured relevant online conversation which relevance metric is utilized in scoring the discrete incident.

4. The system of claim 1 wherein the online conversation monitoring system includes a web server configured to generate a user interface accessible via a remote device accessed by the entity and wherein a prioritized list of incidents is presented via the user interface to the entity.

5. The system of claim 1 wherein the online conversation monitoring system is configured to use topic modeling techniques of natural language programming to identify words having positive and negative emotional value within each captured relevant online conversation to generate a sensitivity metric utilized in scoring the discrete incident.

6. The system of claim 1 wherein the online conversation monitoring system is configured to weight available metrics and/or incident and source scores to create a single, composite score for prioritizing attention and/or response to incidents.

7. The system of claim 1 wherein the online conversation monitoring system is configured to adjust scores based on business rules of the entity to which to which each discrete incident relates.

8. The system of claim 1 wherein the online conversation monitoring system comprises an information management platform, an agent portal, a social module, a call center platform and aggregating tools.

9. The system of claim 1 and further comprising an entity system communicatively coupled to the online conversation monitoring system, the entity system including a client portal, a communications module and a media module, and further comprising a third party system communicatively coupled to the online conversation monitoring system, the third party system including search/aggregators running a computing device of the third party system.

10. The system of claim 1 wherein the online conversations monitoring system comprises a online conversations monitoring system with search/aggregators running thereon.

11. The system of claim 1 wherein the online conversation monitoring system is configured to generate a sentiment score with regard to each discrete incident that allows simultaneous measurement in multiple degrees of both positive and negative sentiment.

12. The system of claim 1 wherein the online conversation monitoring system is configured to present the discrete incidents relating to an entity to the entity in a prioritized list wherein the prioritized list is generated taking into consideration at personalized scoring rules generated by the entity.

13. The system of claim 12 wherein the prioritized list is presented via an interface providing the ability to sort incidents by score, source, type, sentiment, number of posts, date of posts, assigned team, recommended response or alert flags.

14. The system of claim 13 wherein the interface permits the entity to preview incident details, history and score on the same screen.

15. A method of measuring and managing distributed online conversations accessible via a network comprising:

creating search topics and queries to be utilized in searching media sites accessible via the internet to identify online conversations relating to an entity;

storing the created search topics in memory accessible by a search device coupled to the internet;

searching media sites on the internet utilizing the stored created search topics and queries to identify relevant online conversations related to the entity;

capturing relevant online conversations related to the entity discovered in the searching step;

storing in memory each captured relevant online conversation as a discrete incident associated with the entity to which it is relevant;

accessing the memory in which each captured relevant online conversation is stored to score each discrete incident according to a set of metrics;

accessing the memory in which each captured relevant online conversation is stored to prioritize each scored incident, wherein each scored incident is prioritized based at least in part on the score of each discrete incident and a score generated for the source on which each incident is discovered; and presenting a prioritized list of scored incidents to the entity to which relevant online conversation relates via a graphical user interface generated by a server communicatively coupled to the memory.

16. The method of claim 15 and further comprising scoring the sentiment of each discrete incident in a manner that allows simultaneous measurement in multiple degrees of both positive and negative sentiment.

17. The method of claim 16 and further comprising providing the entity to sort incidents on the presented prioritized list by score, source, type, sentiment, number of posts, date of posts, assigned team, recommended response, and alert flags and to preview incident details, history and score on the same screen.

* * * * *